(12) United States Patent
Nakamura et al.

(10) Patent No.: US 10,663,092 B2
(45) Date of Patent: May 26, 2020

(54) MULTILAYER TUBE

(71) Applicant: UBE INDUSTRIES, LTD., Ube-shi, Yamaguchi (JP)

(72) Inventors: Koji Nakamura, Ube (JP); Takeru Abe, Ube (JP); Hiroaki Fujii, Ube (JP)

(73) Assignee: UBE INDUSTRIES, LTD., Ube-Shi (JP)

( * ) Notice: Subject to any disclaimer, the term of this patent is extended or adjusted under 35 U.S.C. 154(b) by 433 days.

(21) Appl. No.: 15/507,611

(22) PCT Filed: Sep. 11, 2015

(86) PCT No.: PCT/JP2015/075856
§ 371 (c)(1),
(2) Date: Feb. 28, 2017

(87) PCT Pub. No.: WO2016/039445
PCT Pub. Date: Mar. 17, 2016

(65) Prior Publication Data
US 2017/0261133 A1 Sep. 14, 2017

(30) Foreign Application Priority Data

Sep. 12, 2014 (JP) .................. 2014-185784
Sep. 12, 2014 (JP) .................. 2014-185787

(51) Int. Cl.
| | | |
|---|---|---|
| B32B 1/08 | (2006.01) |
| B32B 27/30 | (2006.01) |
| F16L 11/04 | (2006.01) |
| B29C 48/09 | (2019.01) |
| B29C 48/21 | (2019.01) |
| B29C 48/00 | (2019.01) |
| B32B 27/34 | (2006.01) |
| B32B 27/32 | (2006.01) |
| C08L 77/06 | (2006.01) |
| F02M 37/00 | (2006.01) |
| C08G 69/02 | (2006.01) |
| B60K 15/01 | (2006.01) |
| B32B 27/22 | (2006.01) |
| C08L 23/00 | (2006.01) |
| B32B 27/08 | (2006.01) |
| B29K 23/00 | (2006.01) |
| B29K 79/00 | (2006.01) |
| B29L 23/00 | (2006.01) |

(52) U.S. Cl.
CPC .......... *F16L 11/045* (2013.01); *B29C 48/022* (2019.02); *B29C 48/09* (2019.02); *B29C 48/21* (2019.02); *B32B 1/08* (2013.01); *B32B 27/08* (2013.01); *B32B 27/22* (2013.01); *B32B 27/306* (2013.01); *B32B 27/308* (2013.01); *B32B 27/32* (2013.01); *B32B 27/34* (2013.01); *B60K 15/01* (2013.01); *C08G 69/02* (2013.01); *C08L 23/00* (2013.01); *C08L 77/06* (2013.01); *F02M 37/0017* (2013.01); *F16L 11/04* (2013.01); *B29K 2023/083* (2013.01); *B29K 2079/08* (2013.01); *B29L 2023/22* (2013.01); *B32B 2250/04* (2013.01); *B32B 2250/05* (2013.01); *B32B 2250/24* (2013.01); *B32B 2307/546* (2013.01); *B32B 2307/7265* (2013.01); *B32B 2597/00* (2013.01); *B32B 2605/08* (2013.01)

(58) Field of Classification Search
CPC ... B32B 1/08; B32B 2250/05; B32B 2250/24; B32B 2250/40; B32B 27/08; B32B 27/22; B32B 27/306; B32B 27/308; B32B 27/32; B32B 27/34; F16L 11/04; F16L 11/045; F16L 11/047; F16L 2011/047; F16L 11/06; F16L 11/08; F16L 11/081; F16L 11/082; F16L 11/083; F16L 11/085; F16L 11/086; F16L 11/087; F16L 11/088; F02M 37/0017; Y10T 428/1352; Y10T 428/1383; Y10T 428/1393; C08L 77/02; C08L 77/04; C08L 77/06; C08L 77/10; B60K 185/01; B60K 185/013; B60K 185/016
USPC .................. 428/36.9, 36.91, 36.92
See application file for complete search history.

(56) References Cited

U.S. PATENT DOCUMENTS

| | | | |
|---|---|---|---|
| 5,076,329 A | 12/1991 | Brunnhofer | |
| 5,554,425 A | 9/1996 | Krause et al. | |
| 6,302,153 B1 | 10/2001 | Merziger | |
| 6,376,037 B1* | 4/2002 | Montanari | ............. C08L 77/00 428/36.9 |
| 2002/0012806 A1 | 1/2002 | Flepp et al. | |

(Continued)

FOREIGN PATENT DOCUMENTS

| | | |
|---|---|---|
| JP | 3-177683 A | 8/1991 |
| JP | 2000-310365 A | 11/2000 |

(Continued)

OTHER PUBLICATIONS

International Search Report for PCT/JP2015/075856 (PCT/ISA/210) dated Nov. 24, 2015.

(Continued)

*Primary Examiner* — Lee E Sanderson
(74) *Attorney, Agent, or Firm* — Birch, Stewart, Kolasch & Birch, LLP

(57) ABSTRACT

Provided is a multilayer tube that has a layer containing an aliphatic polyamide (such as Polyamide 11 or Polyamide 12), a layer containing a Polyamide 6 composition or Polyamide 6/66/12 composition, a layer containing a saponified ethylene-vinyl acetate copolymer, and a layer containing a semi-aromatic polyamide composition that contains a semi-aromatic polyamide having a specific structure, and further has a fluorine-containing polymer in which a functional group having reactivity with an amino group is introduced into the molecular chain thereof.

16 Claims, No Drawings

(56) References Cited

U.S. PATENT DOCUMENTS

| | | | |
|---|---|---|---|
| 2002/0033197 A1 | 3/2002 | Zimmer et al. | |
| 2002/0155242 A1* | 10/2002 | Bellet | F16L 11/06 428/36.91 |
| 2004/0265527 A1 | 12/2004 | Schmitz et al. | |
| 2005/0037170 A1 | 2/2005 | Bellet et al. | |
| 2007/0148389 A1 | 6/2007 | Nishioka et al. | |
| 2009/0269532 A1 | 10/2009 | Ferreiro et al. | |
| 2010/0009107 A1* | 1/2010 | Defilippi | B32B 1/08 428/36.91 |
| 2010/0035116 A1 | 2/2010 | Cheng | |
| 2010/0136274 A1* | 6/2010 | Brule | B32B 1/08 428/36.91 |

FOREIGN PATENT DOCUMENTS

| | | |
|---|---|---|
| JP | 2002-160314 A | 6/2002 |
| JP | 2002-210904 A | 7/2002 |
| JP | 2003-21276 A | 1/2003 |
| JP | 2003-535717 A | 12/2003 |
| JP | 2015-104830 A | 6/2015 |

OTHER PUBLICATIONS

Extended European Search Report, dated Apr. 16, 2018, for European Application No. 15839705.9.
Written Opinion of the International Searching Authority for PCT/JP2015/075856 (PCT/ISA/237) dated Nov. 24, 2015.

* cited by examiner

MULTILAYER TUBE

TECHNICAL FIELD

The present invention relates to a multilayer tube.

BACKGROUND ART

In tubes used for automobile lines, the main material thereof is undergoing a change from metal to lightweight resin having superior rust resistance in response to demands for elimination of problems with rust generation that have long been caused by the use of deicing materials on roads, prevention of global warming and conservation of energy. Normally, examples of resins used for the tubes of automobile lines include polyamide-based resins, saturated polyester-based resins, polyolefin-based resins and thermoplastic polyurethane-based resins, in the case of single-layer tubes using these resins, the application range thereof had been limited due to inadequacies with respect to heat resistance, chemical resistance and the like.

In addition, in the tubes used for automobile lines, oxygen-containing gasoline blended with low boiling point alcohols such as methanol or ethanol or ethers such as ethyl-t-butyl ether (ETBE) is transported through these tubes from the viewpoint of reducing gasoline consumption and enhancing performance. Moreover, strict exhaust gas regulations have been implemented that include prevention of leakage into the atmosphere attributable to diffusion of volatile hydrocarbons and the like through the walls of these tubes used for automobile lines. In response to these strict regulations, single-layer tubes, consisting only of conventionally used polyamide-based resin, and particularly Polyamide 11 or Polyamide 12 that demonstrate superior strength, toughness, chemical resistance and flexibility, have inadequate barrier properties for the aforementioned chemicals, and require improvement particularly with respect to minimizing permeation of alcohols-containing gasoline.

A method for solving this problem has been proposed that uses a multilayer tube in which is arranged a resin demonstrating favorable resistance to chemical permeation, such as a saponified ethylene/vinyl acetate copolymer (EVOH), polymetaxylylene adipamide (Polyamide MXD6), polybutylene terephthalate (PBT), polyethylene naphthalate (PEN), polybutylene naphthalate (PBN), polyphenylene sulfide (PPS), polyvinylidene fluoride (PVDF), ethylene-tetrafluoroethylene copolymer (ETFE), ethylene-tetrafluoroethylene-hexafluoropropylene copolymer (EFEP), ethylene-chloritrifluoroethylene copolymer (ECTFE), tetrafluoroethylene-hexafluoropropylene copolymer (TFE-HFP, FEP), tetrafluoroethylene-hexafluoropropylene-vinylidene fluoride copolymer (TFE-HFP-VDF, THV), tetrafluoroethylene-hexafluoropropylene-vinylidene fluoride-perfluoro(alkylvinylether) copolymer (TFE-HFP-VDF-PAVE), tetrafluoroethylene-perfluoro(alkylvinylether) copolymer (TFE-PAVE, PFA), tetrafluoroethylene-hexafluoropropylene-perfluoro(alkylvinylether) copolymer (TFE-HFP-PAVE), or chlorotrifluoroethylene-perfluoro(alkylvinylether)-tetrafluoroethylene copolymer (CTFE-PAVE-TFE, CPT) (see, for example, U.S. Pat. No. 5,554,425).

Among these resins, a saponified ethylene-vinyl acetate copolymer (EVOH) has superior resistance to chemical permeation and superior resistance to permeation of gasoline in particular. For example, a fuel line has been proposed that is composed of an outermost layer consisting of Polyamide 12, an adhesive layer consisting of modified polyolefin, an outer layer consisting of Polyamide 6, an intermediate layer consisting of saponified ethylene-vinyl acetate copolymer (EVOH), and an innermost layer consisting of Polyamide 6 (see, for example, Japanese Unexamined Patent Publication No. H3-177683). However, in this fuel line, in the case of using Polyamide 6 for the innermost layer, resistance to sour gasoline formed by oxidation of gasoline (deteriorated fuel resistance) and resistance to calcium oxide (chemical resistance) are inferior. In addition, a multilayer composite has been proposed that is composed of an outermost layer consisting of Polyamide 12, an adhesive layer consisting of at least one type of material selected from the group consisting of Polyamide 6/12 copolymer, Polyamide 12/6 copolymer, Polyamide 612, Polyamide 610 and a mixture of Polyamide 12, Polyamide 6 and a compatibilizing agent, an intermediate layer consisting of saponified ethylene-vinyl acetate copolymer (EVOH), and an innermost layer consisting of Polyamide 6 or Polyamide 12 (see, for example, Japanese Translation of PCT International Application Publication No. 2003-535717 or Japanese Unexamined Patent Publication No. 2003-021276). Similarly, a multilayer composite has been proposed that is composed of an outermost layer consisting of Polyamide 12, an adhesive layer consisting of a mixture of Polyamide 6, Polyamide 12 and polyamine-polyamide copolymer, an intermediate layer consisting of saponified ethylene-vinyl acetate copolymer (EVOH), and an innermost layer consisting of Polyamide 6 or Polyamide 12 (see, for example, Japanese Unexamined Patent Publication No. 2002-210904). This technology proposes that having a polyamide copolymer having a specific composition ratio or a mixture consisting of Polyamide 6, Polyamide 12 and a compatibilizing agent as an adhesive layer interposed between both Polyamide 12 and saponified ethylene-vinyl acetate copolymer.

Moreover, a multilayer tube has been proposed in which is arranged a fluorine-based resin in the inner layer, a saponified ethylene-vinyl acetate copolymer on the outside thereof, and polyterephthalamide (PPA) in the outer layer (see, for example, U.S. Patent No. 2010-0035116).

PRIOR ART DOCUMENTS

Patent Documents

Patent Document 1: U.S. Pat. No. 5,554,425
Patent Document 2: Japanese Unexamined Patent Publication No. H3-177683
Patent Document 3: Japanese Translation of PCT International Application Publication No. 2003-535717
Patent Document 4: Japanese Unexamined Patent Publication No. 2003-021276
Patent Document 5: Japanese Unexamined Patent Publication No. 2002-210904
Patent Document 6: U.S. Patent No. 2010-0035116

DISCLOSURE OF THE INVENTION

Problems to be Solved by the Invention

However, in the case of using Polyamide 6 for the innermost layer, problems consisting of deteriorated fuel resistance, zinc chloride resistance and calcium chloride resistance remain unsolved. Moreover, in the case of using Polyamide 12 for the innermost layer of a fuel line, low molecular weight components such as monomers or oligomers, additives or plasticizers and the like elute into alcohol-containing gasoline due to contact with the alcohol-containing gasoline, and these end up precipitating at normal temperatures. Accordingly, there is concern over blockage within tubes used for automobile lines, filters, nozzles and other fuel line components.

In addition, the aforementioned multilayer tube is comprised of an adhesive layer consisting of Polyamide 6/12 copolymer, Polyamide 12/6 copolymer, Polyamide 612, Polyamide 610 or a mixture of Polyamide 12, Polyamide 6 and a compatibilizing agent between a layer composed of an aliphatic polyamide and a layer composed of saponified ethylene-vinyl acetate copolymer, and demonstrates adequate initial interlayer adhesion. On the other hand, these multilayer tubes are typically processed into tubes having a desired shape in a state of being subjected to bending stress due to restrictions on the layout or displacement absorption during a collision. At that time, although the tube is heated within a range from the glass transition temperature to the melting point of the constituent materials in order to facilitate thermal processing, unless the tube has adequate interlayer adhesion following heat treatment, the innermost layer separates when inserting into a joint, blockage of the line may occur, or the outermost layer may separate, thereby resulting in the problem of the tube no longer having the inherent performance of a tube with respect to pressure resistance, yield strength and the like. Consequently, there still remains room for improvement with respect to interlayer adhesion following heat treatment (durability of interlayer adhesion).

Moreover, although multilayer tubes having a saponified ethylene-vinyl acetate copolymer (EVOH) have superior permeability resistance with respect to low concentrated, alcohol-containing gasoline, they have insufficient permeability resistance with respect to highly concentrated, alcohol-containing gasoline, and therefore, further improvement is desired. As a means for solving these problems, U.S. Patent No. 2010-0035116 proposes a multilayer tube in which is arranged a fluorine-based resin in the inner layer, a saponified ethylene-vinyl acetate copolymer on the outside thereof, and polyterephthalamide (PPA) in the outer layer. However, there is no disclosure of specific technical data or technical suggestions regarding basic performance of the tube in terms of interlayer adhesion or low-temperature impact resistance.

With the foregoing in view, an object of the present invention is to provide a multilayer tube having superior chemical impermeability, interlayer adhesion and durability thereof, low-temperature impact resistance, deteriorated fuel resistance, and monomer and oligomer elution resistance.

Means for Solving the Problems

As a result of conducting extensive studies to solve the aforementioned problems, the inventors of the present invention found that a multilayer tube having a layer containing an aliphatic polyamide (such as Polyamide 11 or Polyamide 12), a layer containing a Polyamide 6 composition or Polyamide 6/66/12 composition, a layer containing a saponified ethylene-vinyl acetate copolymer, and a layer containing a semi-aromatic polyamide composition having a specific structure demonstrates superior properties such as chemical impermeability, interlayer adhesion and durability thereof, low-temperature impact resistance, deteriorated fuel resistance, and monomer and oligomer elution resistance.

Namely, one embodiment of the present invention is a multilayer tube comprising at least four layers, having a layer (a), a layer (b), a layer (c) and a layer (d); wherein, the layer (a) contains an aliphatic polyamide (A),
the layer (b) contains a Polyamide 6 composition (B1) and/or a Polyamide 6/66/12 composition (B2),
the layer (c) contains a saponified ethylene-vinyl acetate copolymer (C), and
the layer (d) contains a semi-aromatic polyamide composition (D1) or a semi-aromatic polyamide composition (D2); and,
the aliphatic polyamide (A) does not contain polycaproamide (Polyamide 6) or poly(caproamide/hexamethylene adipamide/dodecanamide) (Polyamide 6/66/12),
the Polyamide 6 composition (B1) contains 50% by mass to 98% by mass of polycaproamide (Polyamide 6), 1% by mass to 20% by mass of a plasticizer (B3), and 1% by mass to 30% by mass of an olefin polymer (B4) having a bending elastic modulus of 500 MPa or less as measured in compliance with ISO 178,
the Polyamide 6/66/12 composition (B2) contains 50% by mass to 98% by mass of a polyamide mixture containing Polyamide 6/66/12 and at least one type of polyamide selected from the group consisting of polyhexamethylene sebacamide (Polyamide 610), polyhexamethylene dodecanamide (Polyamide 612), polynonamethylene decamide (Polyamide 910), polynonamethylene dodecamide (Polyamide 912), polydecamethylene decamide (Polyamide 1010), polydecamethylene dodecamide (Polyamide 1012) and polydodecamethylene dodecamide (Polyamide 1212), 1% by mass to 20% by mass of a plasticizer (B3), and 1% by mass to 30% by mass of an olefin polymer (B4) having a bending elastic modulus of 500 MPa or less as measured in compliance with ISO 178,
the semi-aromatic polyamide composition (D1) contains a semi-aromatic polyamide (d1), and the semi-aromatic polyamide (d1) has a diamine unit containing 50 mol % or more of an aliphatic diamine unit having 9 to 13 carbon atoms based on the total number of diamine units, and a carboxylic acid unit containing 50 mol % or more of a terephthalic acid unit and/or naphthalene dicarboxylic acid unit based on the total number of carboxylic acid units, the semi-aromatic polyamide composition (D2) contains a semi-aromatic polyamide (d2), and, the semi-aromatic polyamide (d2) has a diamine unit containing 50 mol % or more of a xylylenediamine unit and/or bis(aminomethyl)naphthalene unit based on the total number of diamine units and a carboxylic acid unit containing 50 mol % or more of an aliphatic dicarboxylic acid unit having 8 to 13 carbon atoms based on the total number of dicarboxylic acid units.

The following indicates preferred embodiments of the multilayer tube. A plurality of preferred embodiments can be combined.

[1] A multilayer tube, wherein the aliphatic polyamide (A) is at least one type of homopolymer selected from the group consisting of polyundecanamide (Polyamide 11), polydodecanamide (Polyamide 12), polyhexamethylene adipamide (Polyamide 66), polyhexamethylene decamide (Polyamide 610), polyhexamethylene dodecamide (Polyamide 612), polydecamethylene decamide (Polyamide 1010), polydecamethylene dodecamide (Polyamide 1012) and polydodecamethylene dodecamide (Polyamide 1212), and/or a copolymer using a plurality of types of raw material monomers that form these.

[2] A multilayer tube, wherein, in the Polyamide 6/66/12 in the Polyamide 6/66/12 composition (B2), the mass ratio of the total number of caproamide units and hexamethylene adipamide units to the number of dodecanamide units is 81:19 percent by mass to 95:5 percent by mass based on 100% by mass of the total number of caproamide units, hexamethylene adipamide units and dodecanamide units.

[3] A multilayer tube, wherein the ethylene content of the saponified ethylene-vinyl acetate copolymer (C) is 15 mol % to 60 mol % and the degree of saponification is 90 mol % or more.

[4] A multilayer tube, wherein the layer (a) is arranged in the outermost layer and the layer (c) is arranged between the layer (a) and the layer (d).

[5] A multilayer tube, wherein the layer (b) is arranged on at least one side that contacts the layer (c).

[6] A multilayer tube, wherein an electrically conductive layer comprising the semi-aromatic polyamide composition (D) containing an electrically conductive filler is arranged in the innermost layer of the multilayer tube.

[7] A multilayer tube further having a layer (e), wherein the layer (e) contains a fluorine-containing polymer (E) in which a functional group having reactivity with an amino group is introduced into the molecular chain thereof.

[8] A multilayer tube, wherein the layer (a) is arranged in the outermost layer, and the layer (c) and the layer (d) are arranged between the layer (a) and the layer (e).

[9] A multilayer tube, wherein an electrically conductive layer comprising a fluorine-containing polymer composition containing an electrically conductive filler is arranged in the innermost layer of the multilayer tube.

[10] A multilayer tube produced by a co-extrusion processing method.

[11] A multilayer tube used as a fuel tube.

Effects of the Invention

According to the present invention, a multilayer tube can be provided that demonstrates superior chemical impermeability, interlayer adhesion and durability thereof, low-temperature impact resistance, deteriorated fuel resistance, and monomer and oligomer elution resistance.

BEST MODE FOR CARRYING OUT THE INVENTION

In the present description, in the case a plurality of substances corresponding to each component are present in a composition, the amount of each component in the composition refers to the total amount of the plurality of substances present in the composition unless specifically indicated otherwise.

As a result of having a layer containing an aliphatic polyamide, a layer containing a Polyamide 6 composition or Polyamide 6/66/12 composition, a layer containing a saponified ethylene-vinyl acetate copolymer, and a layer containing a semi-aromatic polyamide composition containing a semi-aromatic polyamide having a specific structure, the multilayer tube according to the present embodiment realizes both interlayer adhesion and chemical impermeability, and demonstrates superior low-temperature impact resistance, deteriorated fuel resistance, and monomer and oligomer elution resistance. In particular, the multilayer tube of the present embodiment is preferable for use as a fuel tube since it is able to comply with strict environmental regulations by inhibiting alcohol-mixed hydrocarbons that evaporate by passing through the tube wall. Moreover, there is little decrease in interlayer adhesive strength even after heat treatment or having contacted or been immersed in fuel for a long period of time, thereby demonstrating superior interlayer adhesion durability. Accordingly, the multilayer tube according to the present embodiment can be used in a wide range of environments, demonstrates high reliability and has extremely high utility value.

1. Layer (a)

Layer (a) of the multilayer tube contains an aliphatic polyamide (A).

[Aliphatic Polyamide (A)]

The aliphatic polyamide (A) has amide bonds (—CONH—) in the main chain thereof, and is obtained by polymerization or copolymerization according to a known method such as melt polymerization, solution polymerization or solid phase polymerization by using as raw materials aliphatic polyamide structural units in the form of a lactam, aminocarboxylic acid, aliphatic diamine or aliphatic dicarboxylic acid. However, the aliphatic polyamide (A) does not contain polycaproamide (Polyamide 6) or poly(caproamide/hexamethylene adipamide/dodecanamide) (Polyamide 6/66/12).

Examples of lactams include enantolactam, undecanelactam, dodecanelactam, α-pyrrolidone and α-piperidone. Examples of aminocarboxylic acids include 7-aminoheptanoic acid, 9-aminononaoic acid, 11-aminoundecanoic acid and 12-aminododecanoic acid. One type or two or more types thereof can be used.

Examples of aliphatic diamines include 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine and 5-methyl-1,9-nonanediamine. One type or two or more types thereof can be used.

Examples of aliphatic dicarboxylic acids include oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid and eicosanedioic acid. One type or two or more types thereof can be used.

Examples of the aliphatic polyamide (A) include homopolymers such as polyundecanamide (Polyamide 11), polydodecanamide (Polyamide 12), polyethylene adipamide (Polyamide 26), polytetramethylene succinamide (Polyamide 44), polytetramethylene glutamide (Polyamide 45), polytetramethylene adipamide (Polyamide 46), polytetramethylene suberamide (Polyamide 48), polytetramethylene azelamide (Polyamide 49), polytetramethylene sebacamide (Polyamide 410), polytetramethylene dodecamide (Polyamide 412), polypentamethylene succinamide (Polyamide 54), polypentamethylene glutamide (Polyamide 55), polypentamethylene adipamide (Polyamide 56), polypentamethylene suberamide (Polyamide 58), polypentamethylene azelamide (Polyamide 59), polypentamethylene sebacamide (Polyamide 510), polypentamethylene dodecamide (Polyamide 512), polyhexamethylene succinamide (Polyamide 64), polyhexamethylene glutamide (Polyamide 65), polyhexamethylene adipamide (Polyamide 66), polyhexamethylene suberamide (Polyamide 68), polyhexamethylene azelamide (Polyamide 69), polyhexamethylene sebacamide (Polyamide 610), polyhexamethylene dodecamide (Polyamide 612), polyhexamethylene tetradecamide (Polyamide 614), polyhexamethylene hexadecamide (Polyamide 616), polyhexamethylene octadecamide (Polyamide 618), polynonamethylene adipamide (Polyamide 96), polynonamethylene suberamide (Polyamide 98), polynonamethylene azelamide (Polyamide 99), polynonamethylene sebacamide (Polyamide 910), polynonamethylene dodecamide (Polyamide 912), polydecamethylene adipamide (Polyamide 106), polydecamethylene suberamide (Polyamide 108), polydecamethylene azelamide (Polyamide 109), polydecamethylene sebacamide (Polyamide 1010), polydecamethylene dodecamide (Polyamide 1012), polydodecamethylene adipamide (Polyamide 126), polydodecamethylene suberamide (Polyamide 128), polydodecamethylene azelamide (Polyamide 129), polydodecamethylene sebacamide (Polyamide 1210) and polydodecamethylene dodecamide (Polyamide 1212), and copolymers using a plurality of types of raw materials that form these.

Among these, at least one type of homopolymer selected from the group consisting of polyundecanamide (Polyamide 11), polydodecanamide (Polyamide 12), polyhexamethylene adipamide (Polyamide 66), polyhexamethylene decamide (Polyamide 610), polyhexamethylene dodecamide (Polyamide 612), polydecamethylene sebacamide (Polyamide 1010), polydecamethylene dodecamide (Polyamide 1012), polydodecamethylene dodecamide (Polyamide 1212), and/or copolymers using a plurality of types of raw materials that form these are preferable from the viewpoints of adequately ensuring various properties such as mechanical properties or heat resistance of the resulting multilayer tube, economy and availability.

Examples of devices used to produce the aliphatic polyamide (A) include known polyamide production devices such as batch-type reactors, single-tank and/or multi-tank continuous reactors, tubular continuous reactors and kneading reaction extruders such as single-screw kneading extruders or twin-screw kneading extruders. A known polymerization method such as melt polymerization, solution polymerization or solid phase polymerization can be used for the polymerization method, and polymerization can be carried out by repeating normal pressure, reduced pressure and increased pressure operations. These polymerization methods can be used alone or suitably used in combination.

In addition, the relative viscosity of the aliphatic polyamide (A) as measured in compliance with JIS K-6920 under conditions of 96% sulfuric acid, a polymer concentration of 1% and 25° C. is preferably 1.5 to 5.0 and more preferably 2.0 to 4.5 from the viewpoints of ensuring mechanical properties of the resulting multilayer tube and ensuring preferable processability of the multilayer tube over the proper range of viscosity when melted.

The aliphatic polyamide (A) preferably satisfies the relationship [A]>[B]+5, more preferably satisfies the relationship [A]>[B]+10, and even more preferably satisfies the relationship [A]>[B]+15, from the viewpoints of adequately ensuring interlayer adhesion of the multilayer tube and durability thereof when the concentration of terminal amino groups per g of the polyamide is defined as [A] (µeq/g) and the concentration of terminal carboxyl groups per g of the polyamide is defined as [B] (µeq/g) (to also be referred to as the terminal-modified aliphatic polyamide). Moreover, it is preferable that [A]>20, and more preferable that 30<[A]<120, from the viewpoints of melt stability of the polyamide and inhibition of the formation of gelatinous materials.

Furthermore, the concentration of terminal amino groups [A] (µeq/g) can be measured by dissolving the polyamide in a mixed solution of phenol and methanol and titrating with 0.05 N hydrochloric acid. The concentration of terminal carboxyl groups [B1] (µeq/g) can be measured by dissolving the polyamide in benzyl alcohol and titrating with a 0.05 N sodium hydroxide solution.

The terminal-modified aliphatic polyamide is produced by polymerizing or copolymerizing the aforementioned polyamide raw materials in the presence of an amine using a known method such as melt polymerization, solution polymerization or solid phase polymerization. Alternatively, terminal-modified aliphatic polyamide is produced by melt-kneading in the presence of an amine following polymerization. In this manner, although an amine can be added at an arbitrary stage during polymerization or at an arbitrary stage during melt-kneading following polymerization, when considering the interlayer adhesion of the multilayer tube, the amine is preferably added at an arbitrary stage during polymerization.

Examples of the aforementioned amines include monoamines, diamines, triamines and polyamines. In addition, carboxylic acids such as monocarboxylic acids, dicarboxylic acids or tricarboxylic acids may also be added as necessary in addition to amines provided they do not result in deviation from the ranges of the terminal group concentration conditions described above. These amines and carboxylic acids may be added simultaneously or separately. In addition, one type or two or more types of the amines and carboxylic acids exemplified below can be used.

Specific examples of monoamines added include aliphatic monoamines such as methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, octadecyleneamine, eicosylamine or docosylamine, alicyclic monoamines such as cyclohexylamine or methylcyclohexylamine, aromatic monoamines such as benzylamino or β-phenylmethylamine, symmetrical secondary amines such as N,N-dimethylamine, N,N-diethylamine, N,N-dipropylamine, N,N-dibutylamine, N,N-dihexylamine or N,N-dioctylamine, and mixed secondary amines such as N-methyl-N-ethylamine, N-methyl-N-butylamine, N-methyl-N-dodecylamine, N-methyl-N-octadecylamine, N-ethyl-N-hexadecylamine, N-ethyl-N-octadecylamine, N-propyl-N-hexadecylamine or N-propyl-N-benzylamine. One type or two or more types thereof can be used.

Specific examples of diamines added include aliphatic diamines such as 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine or 5-methyl-1,9-nonanediamine, alicyclic diamines such as 1,3-bis(aminomethyl)cyclohexane, 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl) propane, 5-amino-2,2,4-trimethyl-1-cyclopentane- methylamine, 5-amino-1,3,3-trimethylcyclohexanemethylamine, bis(aminopropyl)piperazine, bis(aminoethyl)piperazine, 2,5-bis(aminomethyl)norbornane, 2,6-bis(aminomethyl) norbornane, 3,8-bis(aminomethyl)tricyclodecane or 4,9-bis (aminomethyl)tricyclodecane, and aromatic diamines such as m-xylylenediamine or p-xylylenediamine. One type or two or more types thereof can be used.

Specific examples of triamines added include 1,2,3-triaminopropane, 1,2,3-triamino-2-methylpropane, 1,2,4-triaminobutane, 1,2,3,4-tetraminobutane, 1,3,5-tetraminocyclohexane, 1,2,4-triaminocyclohexane, 1,2,3-triaminocyclohexane, 1,2,4,5-tetraminocyclohexane, 1,3,5-triaminobenzene, 1,2,4-triaminobenzene, 1,2,3-triaminobenzene, 1,2,4,5-tetraminobenzene, 1,2,4-triaminonaphthalene, 2,5,7-triaminonaphthalene, 2,4,6-triaminopyridine, 1,2,7,8-tetraminonaphthalene and 1,4,5,8-tetraminonaphthalene. One type or two or more types thereof can be used.

The polyamines added are only required to be compounds that have a plurality of primary amino groups ($-NH_2$) and/or secondary amino groups ($-NH-$), and examples thereof include polyalkyleneimines, polyalkylene polyamines, polyvinylamines and polyallylamines. Amino groups provided with an active hydrogen serve as the reactive sites of polyamines.

Polyalkyleneimines are produced by a method in which an alkyleneimine such as ethyleneimine or propyleneimine is subjected to ionic polymerization, or a method in which an alkyloxazoline is polymerized followed by partially hydrolyzing or completely hydrolyzing the polymer. Examples of polyalkylene polyamines include diethylenetriamine, triethylenetetramine, pentaethylenehexamine and reaction products of ethylenediamine and a polyfunctional compound. Polyvinylamines are obtained by, for example, polymerizing N-vinylformamide to obtain poly(N-vinylformamide) followed by partially hydrolyzing or completely hydrolyzing the polymer with an acid such as hydrochloric acid. Polyallylamines are typically obtained by polymerizing a hydrochloride of an allylamine monomer followed by removing the hydrochloric acid. One type or two or more types thereof can be used. Among these, polyalkyleneimines are preferable.

Examples of polyalkyleneimines include homopolymers and copolymers obtained by polymerizing one type or two or more types of alkyleneimines having 2 to 8 carbon atoms, such as ethyleneimine, propyleneimine, 1,2-butyleneimine, 2,3-butyleneimine or 1,1-dimethylethyleneimine using an ordinary method. Among these, polyethyleneimine is more preferable. Polyalkyleneimines may be any of a branched polyalkyleneimine comprising a primary amine, secondary amine and tertiary amine obtained by using an alkyleneimine as raw material and subjecting to ring-opening polymerization, a linear polyalkyleneimine comprising only a primary amine and secondary amine obtained by using an alkyloxazoline as raw material and subjecting to polymerization, or a polyalkyleneimine having a three-dimensional crosslinked structure. Moreover, the polyalkyleneimine may also contain ethylenediamine, propylenediamine, diethylenetriamine, triethylenetetramine, tetraethylenepentamine, dipropylenetriamine, tripropylenetetramine, dihexamethylenetriamine, aminopropylethylenediamine or bis(aminopropylethylenediamine) and the like. In addition to a tertiary amino group, polyalkyleneimines normally have a primary amino group or secondary amino group (imino group) having an active hydrogen atom that is derived from the reactivity of active hydrogen atoms on the nitrogen atom contained therein.

There are no particular limitations on the number of nitrogen atoms in the polyalkyleneimine, and the number of nitrogen atoms is preferably 4 to 3,000, more preferably 8 to 1,500, and even more preferably 11 to 500. In addition, the number-average molecular weight of the polyalkyleneimine is preferably 100 to 20,000, more preferably 200 to 10,000, and even more preferably 500 to 8,000.

On the other hand, examples of carboxylic acids added include aliphatic monocarboxylic acids such as acetic acid, propionic acid, butyric acid, valeric acid, caproic acid, enanthic acid, caprylic acid, capric acid, pelargonic acid, undecanoic acid, lauric acid, tridecanoic acid, myristic acid, myristoleic acid, palmitic acid, stearic acid, oleic acid, linoleic acid, arachic acid, behenic acid or erucic acid, alicyclic monocarboxylic acids such as cyclohexanecarboxylic acid or methylcyclohexanecarboxylic acid, aromatic monocarboxylic acids such as benzoic acid, toluic acid, ethylbenzoic acid or phenylacetic acid, aliphatic dicarboxylic acids such as malonic acid, succinic acid, glutaric acid, adipic acid, pimelic acid, suberic acid, azelaic acid, sebacic acid, undecanedioic acid, dodecanedioic acid, hexadecanedioic acid, hexadecenedioic acid, octadecanedioic acid, octadecenedioic acid, eicosanedioic acid, eicosenedioic acid, docosanedioic acid, diglycolic acid, 2,2,4-trimethyladipic acid or 2,4,4-trimethyladipic acid, alicyclic dicarboxylic acids such as 1,3-cyclohexanedicarboxylic acid, 1,4-cyclohexanedicarboxylic acid or norbornanedicarboxylic acid, aromatic dicarboxylic acids such as terephthalic acid, isophthalic acid, phthalic acid, m-xylylenedicarboxylic acid, p-xylylenedicarboxylic acid, 1,4-naphthalenedicarboxylic acid, 2,6-naphthalenedicarboxylic acid or 2,7-naphthalenedicarboxylic acid, and tricarboxylic acids such as 1,2,4-butanetricarboxylic acid, 1,3,5-pentanetricarboxylic acid, 1,2,6-hexanetricarboxylic acid, 1,3,6-hexanetricarboxylic acid, 1,3,5-cyclohexanetricarboxylic acid or trimesic acid. One type or two or more types thereof can be used.

The amount of added amine used is suitably determined by a known method in consideration of the terminal amino group concentration, terminal carboxyl group concentration and relative viscosity of the terminal-modified aliphatic polyamide to be produced. Normally, the amount of amine added per mole of polyamide raw material (1 mole of monomer or monomer unit composing a repeating unit) is preferably 0.5 meq/mol to 20 meq/mol and more preferably 1.0 meq/mol to 10 meq/mol from the viewpoints of obtaining adequate reactivity and facilitating the production of polyamide having a desired viscosity (one equivalent (eq) of an amino group is the amount of amino group that forms an amide group by reacting at a 1:1 ratio with a carboxyl group).

In the terminal-modified aliphatic polyamide, a diamine and/or polyamine among the aforementioned examples of amines is preferably added during polymerization to satisfy the terminal group concentration conditions, and at least one type of compound selected from the group consisting of aliphatic diamines, alicyclic diamines and polyalkyleneimines is more preferably added from the viewpoint of inhibiting gelling.

In addition, the terminal-modified aliphatic polyamide is preferably also a polyamide mixture composed of two or more types of polyamides having different terminal group concentrations provided the aforementioned terminal group concentrations are satisfied. In this case, the terminal amino group concentration and terminal carboxyl group concentration of the polyamide mixture is determined by the concentration of terminal amino groups and the concentration of terminal carboxyl groups of the polyamide that compose the mixture along with the blending ratios thereof.

A plasticizer described in the sections on the Polyamide 6 composition (B1) or the Polyamide 6/66/12 composition to be subsequently described is preferably added to improve flexibility of the aliphatic polyamide (A).

The content of plasticizer is preferably 1 part by mass to 30 parts by mass and more preferably 2 parts by mass to 20 parts by mass based on 100 parts by mass of the aliphatic polyamide (A) from the viewpoint of adequately ensuring flexibility and low-temperature impact resistance of the multilayer tube.

In addition, an impact modifier is preferably added to improve low-temperature impact resistance of the aliphatic polyamide (A), and an olefin polymer is more preferably added that has a bending elastic modulus measured in compliance with ISO 178 of 500 MPa or less as described in the sections on the Polyamide 6 composition (B1) or Polyamide 6/66/12 composition (B2) to be subsequently described. The effect of improving impact resistance may be inadequate if the bending elastic modulus exceeds this value.

The content of impact modifier is preferably 1 part by mass to 35 parts by mass and more preferably 3 parts by mass to 25 parts by mass based on 100 parts by mass of the aliphatic polyamide (A) from the viewpoints of adequately ensuring mechanical strength and low-temperature impact resistance of the multilayer tube.

The aliphatic polyamide (A) may also be a mixture of the aforementioned homopolymers, a mixture of the aforementioned copolymers or a mixture of homopolymer and copolymer, or may be a mixture with another polyamide-based resin or other thermoplastic resin. The content of the aliphatic polyamide (A) in the mixture is preferably 60% by mass or more and more preferably 80% by mass or more.

Examples of other polyamide-based resins include poly(meta-xylene adipamide) (Polyamide MXD6), poly(meta-xylene terephthalamide) (Polyamide MXDT), poly(meta-xylene isophthalamide) (Polyamide MXDI), poly(meta-xylene hexahydroterephthalamide) (Polyamide MXDT(H)), poly(meta-xylene naphthalamide) (Polyamide MXDN), poly(para-xylene adipamide) (Polyamide PXD6), poly(para-xylene terephthalamide) (Polyamide PXDT), poly(para-xylene isophthalamide) (Polyamide PXDI), poly(para-xylene hexahydroterephthalamide) (Polyamide PXDT(H)), poly(para-xylene naphthalamide) (Polyamide PXDN), poly(para-phenylene terephthalamide) (Polyamide PPTA), poly(para-phenylene isophthalamide) (Polyamide PPIA), poly(meta-phenylene terephthalamide) (Polyamide PMTA), poly(meta-phenylene isophthalamide) (Polyamide PMIA), poly(2,6-naphthalenedimethylene adipamide) (Polyamide 2,6-BAN6), poly(2,6-naphthalenedimethylene terephthalamide) (Polyamide 2,6-BANT), poly(2,6-naphthalenedimethylene isophthalamide) (Polyamide 2,6-BANI), poly(2,6-naphthalenedimethylene hexahydroterephthalamide) (Polyamide 2,6-BANT(H)), poly(2,6-naphthalenedimethylene naphthalamide) (Polyamide 2,6-BANN), poly(1,3-cyclohexanedimethylene adipamide) (Polyamide 1,3-BAC6), poly(1,3-cyclohexanedimethylene suberamide) (Polyamide 1,3-BAC8), poly(1,3-cyclohexanedimethylene azelamide) (Polyamide 1,3-BAC9), poly(1,3-cyclohexanedimethylene sebacamide) (Polyamide 1,3-BAC10), poly(1,3-cyclohexanedimethylene dodecamide) (Polyamide 1,3-BAC12), poly(1,3-cyclohexanedimethylene terephthalamide) (Polyamide 1,3-BACT), poly(1,3-cyclohexanedimethylene isophthalamide) (Polyamide 1,3-BACI), poly(1,3-cyclohexanedimethylene hexahydroterephthalamide) (Polyamide 1,3-BACT(H)), poly(1,3-cyclohexanedimethylene naphthalamide) (Polyamide 1,3-BACN), poly(1,4-cyclohexanedimethylene adipamide) (Polyamide 1,4-BAC6), poly(1,4-cyclohexanedimethylene suberamide) (Polyamide 1,4-BAC8), poly(1,4-cyclohexanedimethylene azelamide) (Polyamide 1,4-BAC9), poly(1,4-cyclohexanedimethylene sebacamide) (Polyamide 1,4-BAC10), poly(1,4-cyclohexanedimethylene dodecamide) (Polyamide 1,4-BAC12), poly(1,4-cyclohexanedimethylene terephthalamide) (Polyamide 1,4-BACT), poly(1,4-cyclohexanedimethylene isophthalamide) (Polyamide 1,4-BACI), poly(1,4-cyclohexanedimethylene hexahydroterephthalamide) (Polyamide 1,4-BACT(H)), poly(1,4-cyclohexanedimethylene naphthalamide) (Polyamide 1,4-BACN), poly(4,4'-methylenebiscyclohexylene adipamide) (Polyamide PACM6), poly(4,4'-methylenebiscyclohexylene suberamide) (Polyamide PACM8), poly(4,4'-methylenebiscyclohexylene azelamide) (Polyamide PACM9), poly(4,4'-methylenebiscyclohexylene sebacamide) (Polyamide PACM10), poly(4,4'-methylenebiscyclohexylene dodecamide) (Polyamide PACM12), poly(4,4'-methylenebiscyclohexylene tetradecamide) (Polyamide PACM14), poly(4,4'-methylenebiscyclohexylene hexadecamide) (Polyamide PACM16), poly(4,4'-methylenebiscyclohexylene octadecamide) (Polyamide PACM18), poly(4,4'-methylenebiscyclohexylene terephthalamide) (Polyamide PACMT), poly(4,4'-methylenebiscyclohexylene isophthalamide) (Polyamide PACMI), poly(4,4'-methylenebiscyclohexylene hexahydroterephthalamide) (Polyamide PACMT(H)), poly(4,4'-methylenebiscyclohexylene naphthalamide) (Polyamide PACMN), poly(4,4'-methylenebis(2-methyl-cyclohexylene) adipamide) (Polyamide MACM6), poly(4,4'-methylenebis(2-methyl-cyclohexylene) suberamide) (Polyamide MACM8), poly(4,4'-methylenebis(2-methyl-cyclohexylene) azelamide) (Polyamide MACM9), poly(4,4'-methylenebis(2-methyl-cyclohexylene) sebacamide) (Polyamide MACM10), poly(4,4'-methylenebis(2-methyl-cyclohexylene) dodecamide) (Polyamide MACM12), poly(4,4'-methylenebis(2-methyl-cyclohexylene) tetradecamide) (Polyamide MACM14), poly(4,4'-methylenebis(2-methyl-cyclohexylene) hexadecamide) (Polyamide MACM16), poly(4,4'-methylenebis(2-methyl-cyclohexylene) octadecamide) (Polyamide MACM18), poly(4,4'-methylenebis(2-methyl-cyclohexylene) terephthalamide) (Polyamide MACMT), poly(4,4'-methylenebis(2-methyl-cyclohexylene) isophthalamide) (Polyamide MACMI), poly(4,4'-methylenebis(2-methyl-cyclohexylene) hexahydroterephthalamide) (Polyamide MACMT(H)), poly(4,4'-methylenebis(2-methyl-cyclohexylene) naphthalamide) (Polyamide MACMN), poly(4,4'-propylenebiscyclohexylene adipamide) (Polyamide PACP6), poly(4,4'-propylenebiscyclohexylene suberamide) (Polyamide PACP8), poly(4,4'-propylenebiscyclohexylene azelamide) (Polyamide PACP9), poly(4,4'-propylenebiscyclohexylene sebacamide) (Polyamide PACP10), poly(4,4'-propylenebiscyclohexylene dodecamide) (Polyamide PACP12), poly(4,4'-propylenebiscyclohexylene tetradecamide) (Polyamide PACP14), poly(4,4'-propylenebiscyclohexylene hexadecamide) (Polyamide PACP16), poly(4,4'-propylenebiscyclohexylene octadecamide) (Polyamide PACP18), poly(4,4'-propylenebiscyclohexylene terephthalamide) (Polyamide PACPT), poly(4,4'-propylenebiscyclohexylene isophthalamide) (Polyamide PACPI), poly(4,4'-propylenebiscyclohexylene hexahydroterephthalamide) (Polyamide PACPT(H)), poly(4,4'-propylenebiscyclohexylene naphthalamide) (Polyamide PACPN), poly isophorone adipamide (Polyamide IPD6), poly(isophorone suberamide) (Polyamide IPD8), poly(isophorone azelamide) (Polyamide IPD9), poly(isophorone sebacamide) (Polyamide IPD10), poly(isophorone dodecamide) (Polyamide IPD12), poly(isophorone terephthalamide) (Polyamide IPDT), poly(isophorone isophthalamide) (Polyamide IPDI), poly(isophorone hexahydroterephthalamide) (Polyamide IPDT(H)), poly(isophorone naphthalamide) (Polyamide IPDN), poly(tetramethylene terephthalamide) (Polyamide 4T), poly(tetramethylene isophthalamide) (Polyamide 4I), poly (tetramethylene hexahydroterephthalamide) (Polyamide (4T(H)), poly(tetramethylene naphthalamide) (Polyamide 4N), poly(pentamethylene terephthalamide) (Polyamide 5T), poly(pentamethylene isophthalamide) (Polyamide 5I), poly(pentamethylene hexahydroterephthalamide) (Polyamide 5T(H)), poly(pentamethylene naphthalamide) (Polyamide 5N), poly(hexamethylene terephthalamide) (Polyamide 6T), poly(hexamethylene isophthalamide) (Polyamide 6I), poly(hexamethylene hexahydroterephthalamide) (Polyamide 6T(H)), poly(hexamethylene naphthalamide) (Polyamide 6N), poly(2-methylpentarnethylene terephthalamide) (Polyamide M5T), poly(2-methylpentamethylene isophthalamide) (Polyamide M5I), poly(2-methylpentamethylene hexahydroterephthalamide) (Polyamide M5T(H)), poly(2-methylpentamethylene naphthalamide) (Polyamide M5N), poly(nonamethylene hexahydroterephthalamide (Polyamide 9T(H)), poly(2-methyloctamethylene hexahydroterephthalamide) (Polyamide M8T(H)), poly(trimethylhexamethylene isophthalamide) (Polyamide TMHI), poly(trimethylhexamethylene hexahydroterephthalamide) (Polyamide TMHT(H)), poly(decamethylene isophthalamide) (Polyamide 10I), poly(decamethylene hexahydroterephthalamide) (Polyamide 10T(H)), poly(undecamethylene isophthalamide (Polyamide 11I), poly(undecamethylene hexahydroterephthalamide (Polyamide 11T(H)), poly(dodecamethylene isophthalamide) (Polyamide 12I), poly(dodecamethylene hexahydroterephthalamide) (Polyamide 12T(H)) and copolymers using a plurality of types of these polyamide raw materials. One type of two or more types thereof can be used.

Examples of other thermoplastic resins that may be mixed include polyolefin-based resins such as high-density polyethylene (HDPE), medium-density polyethylene (MDPE), low-density polyethylene (LDPE), linear low-density polyethylene (LLDPE), ultra-high-molecular weight polyethylene (UHMWPE), polypropylene (PP), polybutene (PB), polymethylpentene (TPX), ethylene-propylene copolymer (EPR), ethylene-butene copolymer (EBR), ethylene-vinyl acetate copolymer (EVA), ethylene-acrylic acid copolymer (EAA), ethylene-methacrylic acid copolymer (EMAA), ethylene-methyl acrylate copolymer (EMA), ethylene-methyl methacrylate copolymer (EMMA) or ethylene-ethyl acrylate copolymer (EEA), polystyrene-based resins such as polystyrene (PS), syndiotactic polystyrene (SPS), methyl methacrylate-styrene copolymer (MS), methyl methacrylate-styrene-polybutadiene copolymer (MBS), styrene-butadiene copolymer (SBR), styrene-isoprene copolymer (SIR), styrene-isoprene-butadiene copolymer (SIBR), styrene-butadiene-styrene copolymer (SBS), styrene-isoprene-styrene copolymer (SIS), styrene-ethylene-butylene-styrene copolymer (SEBS) or styrene-ethylene-propylene-styrene copolymer (SEPS), the aforementioned polyolefin-based resins or polystyrene-based resins containing a functional group such as a carboxyl group or salt thereof, acid anhydride group or epoxy group, polyester-based resins such as polybutylene terephthalate (PBT), polyethylene terephthalate (PET), polyethylene isophthalate (PEI), poly(ethylene terephthalate-ethylene isophthalate) copolymer (PET/PEI), polytrimethylene terephthalate (PTT), polycyclohexane dimethylene terephthalate (PCT), polyethylene naphthalate (PEN), polybutene naphthalate (PBN), polyarylate (PAR), liquid crystal polyester (LCP), polylactic acid (PLA) or polyglycolic acid (PGA), polyether-based resins such as polyacetal (POM) or polyphenylene ether (PPO), polysulfone-based resins such as polysulfone (PSU), polyethersulfone (PESU) or polyphenylsulfone (PPSU), polythioether-based resins such as polyphenylenesulfide (PPS) or polythioethersulfone (PTES), polyketone-based resins such as polyketone (PK), polyether ketone (PEK), polyether ether ketone (PEEK), polyether ketone ketone (PEKK), polyether ether ether ketone (PEEEK), polyether ether ketone ketone (PEEKK), polyether ketone ketone ketone (PEKKK) or polyether ketone ether ketone ketone (PEKEKK), polynitrile-based resins such as polyacrylonitrile (PAN), polymethacrylonitrile, acrylonitrile-styrene copolymer (AS), methacrylonitrile-styrene copolymer, acrylonitrile-butadiene-styrene copolymer (ABS) or acrylonitrile-butadiene copolymer (NBR), polymethacrylate-based resins such as polymethyl methacrylate (PMMA) or polyethyl methacrylate (PEMA), polyvinyl-based resins such as polyvinyl alcohol (PVA), polyvinylidene chloride (PVDC), polyvinyl chloride (PVC), vinyl chloride-vinylidene chloride copolymer or vinylidene chloride-methyl acrylate copolymer, cellulose-based resins such as cellulose acetate or cellulose butyrate, polycarbonate-based resins such as polycarbonate (PC), polyimide-based resins such as thermoplastic polyimide (TPI), polyetherimide, polyesterimide, polyamide imide (PAI) or polyester amide imide, thermoplastic polyurethane-based resins, polyamide elastomers, polyurethane elastomers and polyester elastomers, and depending on the case, fluorine-based resins such as polyvinylidene fluoride (PVDF), polyvinyl fluoride (PVF), polytetrafluoroethylene (PTFE), polychlorotrifluoroethylene (PCTFE), tetrafluoroethylene-ethylene copolymer (ETFE), ethylene-chlorotrifluoroethylene copolymer (ECTFE), tetrafluoroethylene-hexafluoropropylene copolymer (FEP), tetrafluoroethylene-hexafluoropropylene-vinylidene fluoride copolymer (THV), tetrafluoroethylene-hexafluoropropylene-vinylidene fluoride-perfluoro(alkylvinylether) copolymer, tetrafluoroethylene-perfluoro(alkylvinylether) copolymer (PFA), tetrafluoroethylene-hexafluoropropylene-perfluoro(alkylvinylether) copolymer or chlorotrifluoroethylene-perfluoro(alkylvinylether)-tetrafluoroethylene copolymer (CPT). One type or two or more types thereof can be used.

Moreover, an antioxidant, heat stabilizer, ultraviolet absorber, photostabilizer, lubricant, inorganic filler, antistatic agent, flame retardant, crystallization promoter or colorant and the like may also be added to the aliphatic polyamide (A) as necessary.

2. Layer (b)

Layer (b) of the multilayer tube contains a Polyamide 6 composition (B1) and/or a Polyamide 6/66/12 composition (B2).

[Polyamide 6 Composition (B1), Polyamide 6/66/12 Composition (B2)]

The Polyamide 6 composition (B1) comprises 50% by mass to 98% by mass of polycaproamide (Polyamide 6), 1% by mass to 20% by mass of a plasticizer (B3), and 1% by mass to 30% by mass of an olefin polymer (B4) having a bending elastic modulus as measured in compliance with ISO 178 of 500 MPa or less (to also be referred to as Polyamide 6 Composition (B1)).

The polycaproamide (Polyamide 6) is a polyamide having caproamide units represented the formula (—CO—(CH$_2$)$_6$—NH—)$_n$ having amide bonds (—CONH—) in the main chain thereof (to also be referred to as Polyamide 6).

The Polyamide 6/66/12 composition (B2) comprises 50% by mass to 98% by mass of a polyamide mixture containing poly(caproamide/hexamethyleneadipamide/dodecanamide) (Polyamide 6/66/12) and at least one type of polyamide selected from the group consisting of polyhexamethylene sebacamide (Polyamide 610), polyhexamethylene dodecamide (Polyamide 612), polynonamethylene decamide (Polyamide 910), polynonamethylene dodecamide (Polyamide 912), polydecamethylene decamide (Polyamide 1010), polydecamethylene dodecamide (Polyamide 1012) and polydodecamethylene dodecamide (Polyamide 1212), 1% by mass to 20% by mass of a plasticizer (B3), and 1% by mass to 30% by mass of an olefin polymer (B4) having a bending elastic modulus of 500 MPa or less as measured in compliance with ISO 178.

The poly(caproamide/hexamethyleneadipamide/dodecanamide) (Polyamide 6/66/12) is a polyamide copolymer having caproamide units represented by the formula $(-CO-(CH_2)_6-NH-)_n$, hexamethylene adipamide units represented by the formula $(-NH-(CH_2)_6-NH-CO-(CH_2)_4-CO-)_n$, and dodecanamide units represented by the formula $(-CO-(CH_2)_{11}-NH-)_n$ that has amide bonds (—CONH—) in the main chain thereof (to also be referred to as Polyamide 6/66/12). Polyamide 6/66/12 can be obtained by copolymerizing 6-aminocaproic acid and/or caprolactam, hexamethylene diamine, a salt of adipic acid and 12-aminododecanoic acid and/or dodecalactam.

In the Polyamide 6/66/12, the mass ratio of the total number of caproamide units and hexamethylene adipamide units to the number of dodecanamide units is preferably 81:19 percent by mass to 95:5 percent by mass, and more preferably 83:17 percent by mass to 92:8 percent by mass based on 100% by mass of the total number of caproamide units, hexamethylene adipamide units and dodecanamide units from the viewpoints of ensuring adequate interlayer adhesion and durability thereof of the multilayer tube.

In the Polyamide 6/66/12, the mass ratio of caproamide units to hexamethylene adipamide units is preferably 80:20 percent by mass to 95:5 percent by mass, and more preferably 82:18 percent by mass to 93:7 percent by mass, based on 100% by mass of the total number of caproamide units and hexamethylene adipamide units from the viewpoints of adequately ensuring heat resistance of the multilayer tube and processing stability during co-extrusion with the saponified ethylene-vinyl acetate copolymer (C).

The Polyamide 6/66/12 composition (B2) comprises a polyamide mixture containing Polyamide 6/66/12 and at least one type of polyamide selected from the group consisting of polyhexamethylene sebacamide (Polyamide 610), polyhexamethylene dodecamide (Polyamide 612), polynonamethylene decamide (Polyamide 910), polynonamethylene dodecamide (Polyamide 912), polydecamethylene decamide (Polyamide 1010), polydecamethylene dodecamide (Polyamide 1012) and polydodecamethylene dodecamide (Polyamide 1212) (to also be referred to as the polyamide mixture).

Polyhexamethylene sebacamide (Polyamide 610), polyhexamethylene dodecamide (Polyamide 612), polynonamethylene decamide (Polyamide 910), polynonamethylene dodecamide (Polyamide 912), polydecamethylene decamide (Polyamide 1010), polydecamethylene dodecamide (Polyamide 1012) and polydodecamethylene dodecamide (Polyamide 1212) are long-chain aliphatic polyamides (to also be referred to as long-chain aliphatic polyamides), and among these, polyhexamethylene sebacamide (Polyamide 610) and polyhexamethylene dodecamide (Polyamide 612) are preferable from the viewpoint of adequately obtaining interlayer adhesion and durability thereof of the multilayer tube.

The mixing ratio of both the Polyamide 6/66/12 and long-chain aliphatic polyamide is such that the content of Polyamide 6/66/12 is preferably 50% by mass to 90% by mass, more preferably 55% by mass to 85% by mass, and even more preferably 60% by mass to 80% by mass, while the content of the long-chain aliphatic polyamide is preferably 10% by mass to 50% by mass, more preferably 15% by mass to 45% by mass, and even more preferably 20% by mass to 40% by mass, based on 100% by mass for the total amount of the mixture of Polyamide 6/66/12 and the long-chain aliphatic polyamide from the viewpoints of obtaining superior mechanical properties, chemical resistance and flexibility of the multilayer tube, and adequately obtaining interlayer adhesion and durability thereof of the multilayer tube.

Examples of devices used to produce Polyamide 6, Polyamide 6/66/12 and long-chain aliphatic polyamide include the known polyamide production devices described in the explanation of the aliphatic polyamide (A). Examples of methods for producing Polyamide 6, Polyamide 6/66/12 and long-chain aliphatic polyamide include the known methods described in the explanation of the aliphatic polyamide (A).

In addition, the relative viscosity of the Polyamide 6, Polyamide 6/66/12 and long-chain aliphatic polyamide as measured in compliance with JIS K-6920 under conditions of 96% sulfuric acid, a polymer concentration of 1% and 25° C. is preferably 1.5 to 5.0 and more preferably 2.0 to 4.5 from the viewpoints of ensuring mechanical properties of the resulting multilayer tube and ensuring preferable processability of the multilayer tube over the proper range of viscosity when melted.

The Polyamide 6, Polyamide 6/66/12 and long-chain aliphatic polyamide preferably satisfy the relationship $[A]>[B]+5$, more preferably satisfies the relationship $[A]>[B]+10$, and even more preferably satisfies the relationship $[A]>[B]+15$, from the viewpoints of adequately ensuring interlayer adhesion of the multilayer tube and durability thereof when the concentration of terminal amino groups per g of the polyamide is defined as [A] (μeq/g) and the concentration of terminal carboxyl groups per g of the polyamide is defined as [B] (μeq/g) (to also be referred to as the terminal-modified aliphatic polyamide). Moreover, it is preferable that $[A]>20$, and more preferable that $30<[A]<120$, from the viewpoints of melt stability of the polyamide and inhibition of the formation of gelatinous materials.

The terminal-modified aliphatic polyamide is produced by polymerizing or copolymerizing the aforementioned polyamide raw materials in the presence of an amine using a known method such as melt polymerization, solution polymerization or solid phase polymerization. Alternatively, the terminal-modified aliphatic polyamide is produced by melt-kneading in the presence of an amine following polymerization. In this manner, although an amine can be added at an arbitrary stage during polymerization or at an arbitrary stage during melt-kneading following polymerization, when considering the interlayer adhesion of the multilayer tube, the amine is preferably added at an arbitrary stage during polymerization. Examples of the aforementioned amines include monoamines, diamines, triamines and polyamines. In addition, carboxylic acids such as monocarboxylic acids, dicarboxylic acids or tricarboxylic acids may also be added as necessary in addition to amines provided they do not result in deviation from the ranges of the terminal group concentration conditions described above. These amines and carboxylic acids may be added simultaneously or separately. In addition, one type or two or more types of the amines and carboxylic acids described in the explanation of aforementioned aliphatic polyamide (A) can be used as amines and carboxylic acids.

Examples of the plasticizer (B3) in the Polyamide 6 composition (B1) and Polyamide 6/66/12 composition (B2) include benzenesulfonic acid alkyl amides, toluenesulfonic acid alkyl amides and hydroxybenzoic acid alkyl esters.

Examples of benzenesulfonic acid alkyl amides include benzenesulfonic acid propylamide, benzenesulfonic acid butyl amide and benzenesulfonic acid 2-ethylhexylamide. Examples of toluenesulfonic acid alkyl amides include N-ethyl-o-toluenesulfonic acid butylamide, N-ethyl-p-toluenesulfonic acid butylamide, N-ethyl-o-toluenesulfonic acid 2-ethylhexylamide and N-ethyl-p-toluenesulfonic acid 2-ethylhexylamide. Examples of hydroxybenzoic acid alkyl esters include ethylhexyl o-hydroxybenzoate, ethylhexyl p-hydroxybenzoate, hexyldecyl o-hydroxybenzoate, hexyldecyl p-hydroxybenzoate, ethyldecyl o-hydroxybenzoate, ethyldecyl p-hydroxybenzoate, octyloctyl o-hydroxybenzoate, octyloctyl p-hydroxybenzoate, decyldodecyl o-hydroxybenzoate, decyldodecyl p-hydroxybenzoate, methyl o-hydroxybenzoate, methyl p-hydroxybenzoate, butyl o-hydroxybenzoate, butyl p-hydroxybenzoate, hexyl o-hydroxybenzoate, hexyl p-hydroxybenzoate, n-octyl o-hydroxybenzoate, n-octyl p-hydroxybenzoate, decyl o-hydroxybenzoate, decyl p-hydroxybenzoate, dodecyl o-hydroxybenzoate and dodecyl p-hydroxybenzoate. One type or two or more types thereof can be used.

Among these, benzenesulfonic acid alkyl amides such as benzenesulfonic acid butylamide or benzenesulfonic acid 2-ethylhexyl amide, toluenesulfonic acid alkyl amides such as N-ethyl-p-toluenesulfonic acid butylamide or N-ethyl-p-toluenesulfonic acid 2-ethyhexylamide, and hydroxybenzoic acid alkyl esters such as ethylhexyl p-hydroxybenzoate, hexyldecyl p-hydroxybenzoate or ethyldecyl p-hydroxybenzoate are preferable, while benzensulfonic acid butylamide, ethylhexyl p-hydroxybenzoate and hexyldecyl p-hydroxybenzoate are more preferable.

The olefin polymer (B4) having a bending elastic modulus as measured in compliance with ISO 178 of 500 MPa or less in the Polyamide 6 composition (B1) or Polyamide 6/66/12 composition (to also be referred to as olefin polymer (B4)) is added in order to improve low-temperature impact resistance of the Polyamide 6, Polyamide 6/66/12 and long-chain aliphatic polyamide. The effect of improving impact resistance may be in adequate if the bending elastic modulus as measured in compliance with ISO 178 exceeds this value.

Examples of the olefin polymer (B4) include (ethylene and/or propylene)-α-olefin-based copolymers, (ethylene and/or propylene)-(α,β-unsaturated carboxylic acid and/or unsaturated carboxylic acid ester)-based copolymers, ionomer polymers, and aromatic vinyl compound-conjugated diene compound-based block copolymers, and one type or two or more types thereof can be used.

The aforementioned (ethylene and/or propylene)-α-olefin-based copolymers are copolymers obtained by copolymerizing ethylene and/or propylene with an α-olefin having 3 or more carbon atoms, and examples thereof include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tridecene. One type of two or more types thereof can be used. In addition, polyenes of unconjugated dienes may also be copolymerized, examples of which include 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylyidene-5-norbornene, 2-ethylidene-3-isopropylidene-5-norbornene and 2-propenyl-2,5-norbornadiene. One type or two or more types thereof can be used.

The aforementioned (ethylene and/or propylene)-(α,β-unsaturated carboxylic acid and/or unsaturated carboxylic acid ester)-based copolymers are copolymers obtained by copolymerizing ethylene and/or propylene with an α,β-unsaturated carboxylic acid and/or unsaturated carboxylic acid ester monomer, and examples of α,β-unsaturated carboxylic acid monomers include acrylic acid and methacrylic acid, while examples of α,β-unsaturated carboxylic acid ester monomers include methyl esters, ethyl esters, propyl esters, butyl esters, pentyl esters, hexyl esters, heptyl esters, octyl esters, nonyl esters and decyl esters of these unsaturated carboxylic acids. One type or two or more types thereof can be used.

The aforementioned ionomer polymers are obtained by ionizing an olefin with at least a portion of the carboxyl groups of an α,β-unsaturated carboxylic acid copolymer by neutralization of a metal ion. Although ethylene is preferably used for the olefin and acrylic acid or methacrylic acid is preferably used for the α,β-unsaturated carboxylic acid, they are not limited to those exemplified here, but rather an unsaturated carboxylic acid ester monomer may also be copolymerized. In addition, examples of the metal ion include alkaline metals and alkaline earth metals such as Li, Na, K, Mg, Ca, Sr or Ba, as well as Al, Sn, Sb, Ti, Mn, Fe, Ni, Cu, Zn and Cd. One type or two or more types thereof can be used.

In addition, the aforementioned aromatic vinyl compound-conjugated diene compound-based copolymers are block copolymers composed of an aromatic vinyl compound-based polymer block and a conjugated diene compound-based polymer block, and block copolymers are used that have at least one aromatic vinyl compound-based polymer block and at least one conjugated diene compound-based polymer block. In addition, in the aforementioned block copolymers, an unsaturated bond in the conjugated diene compound-based polymer block may be hydrogenated.

The aromatic vinyl compound-based polymer block is a polymer block consisting mainly of units derived from an aromatic vinyl compound. Examples of aromatic vinyl compounds in this case include styrene, o-methylstyrene, m-methyl styrene, p-methyl styrene, 1,5-dimethyl styrene, 2,4-dimethyl styrene, vinylnaphthalene, vinylanthracene, 4-propyl styrene, 4-cyclohexylstyrene, 4-dodecylstyrene, 2-ethyl-4-benzylstyrene and 4-(phenylbutyl)styrene, and one type or two or more types thereof can be used. In addition, the aromatic vinyl compound-based polymer block may also have a small amount of a unit composed of another unsaturated monomer depending on the case.

The conjugated diene compound-based polymer block is a polymer block formed from one type or two or more types of conjugated diene-based compounds such as 1,3-butadiene, chloroprene, isoprene, 2,3-dimethyl-1,3-butadiene, 1,3-pentadiene, 4-methyl-1,3-pentadiene or 1,3-hexadiene, and in the hydrogenated aromatic vinyl compound-conjugated diene compound-based block copolymer, a portion or all of the unsaturated bonds in the conjugated diene compound-based polymer block may be in the form of saturated bonds due to hydrogenation.

The molecular structure of the aromatic vinyl compound-conjugated diene compound-based block copolymer and hydrogenated form thereof may linear, branched, radial or an arbitrary combination thereof. Among these, one type or two or more types of a diblock copolymer, in which a single aromatic vinyl compound polymer block and a single conjugated diene compound-based polymer block are bound linearly, a triblock copolymer, in which three polymer blocks consisting of an aromatic vinyl compound-based polymer block, conjugated diene compound-based polymer block and aromatic vinyl compound-based polymer block are bound linearly in that order, and hydrogenated forms thereof, are preferably used for the aromatic vinyl compound-conjugated diene compound-based block copolymer and/or hydrogenated forms thereof, and examples thereof include non-hydrogenated or hydrogenated styrene-butadiene block copolymers, non-hydrogenated or hydrogenated styrene-isoprene block copolymers, non-hydrogenated or hydrogenated styrene-butadiene-styrene block copolymers, non-hydrogenated or hydrogenated styrene-isoprene-styrene block copolymers, non-hydrogenated or hydrogenated styrene-(ethylene/butadiene)-styrene block copolymers and non-hydrogenated or hydrogenated styrene-(isoprene/butadiene)-styrene block copolymers.

In addition, a polymer that has been modified by a carboxylic acid and/or derivative thereof is preferably used for the (ethylene and/or propylene)-α-olefin-based copolymers, (ethylene and/or propylene)-(α,β-unsaturated carboxylic acid and/or α,β-unsaturated carboxylic acid ester)-based copolymers, ionomer polymers, and aromatic vinyl compound-conjugated diene compound-based block copolymers used for the olefin polymer (B4). As a result of modifying with such components, functional groups having affinity for Polyamide 6, Polyamide 6/66/12, long-chain aliphatic polyamide or the aforementioned aliphatic polyamide (A) can be contained in a molecule thereof.

Examples of functional groups having affinity for Polyamide 6, Polyamide 6/66/12, the long-chain aliphatic polyamide or the aforementioned aliphatic polyamide (A) include a carboxyl group, acid anhydride group, carboxylic acid ester group, carboxylic acid metal salt, carboxylic acid imide group, carboxylic acid amide group and epoxy group. Examples of compounds containing these functional groups include acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, endobicyclo-[2.2.1]-5-heptene-2,3-dicarboxylic acid and metal salts of these carboxylic acids, monomethyl maleate, monomethyl itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, maleic anhydride, itaconic anhydride, citraconic anhydride, endobicyclo [2.2.1]-5-heptene-2,3-dicarboxylic anhydride, maleimide, N-ethylmaleimide, N-butylmaleimide, N-phenylmaleimide, acrylamide, methacrylamide, glycidyl acrylate, glycidyl methacrylate, glycidyl ethacrylate, glycidyl itaconate and glycidyl citraconate. One type or two or more types thereof can be used.

The content of Polyamide 6 in the Polyamide 6 composition (B1) is 50% by mass to 98% by mass, preferably 60% by mass to 95% by mass, and more preferably 70% by mass to 92% by mass. If the content of Polyamide 6 is less than the aforementioned values, mechanical properties of the resulting multilayer tube may be inferior, while if the content of Polyamide 6 exceeds the aforementioned values, the interlayer adhesion and durability thereof of the resulting multilayer tube may be inferior.

The content of the polyamide mixture in the Polyamide 6/66/12 composition (B2) is 50% by mass to 98% by mass, preferably 60% by mass to 95% by mass, and more preferably 70% by mass to 92% by mass. If the content of the polyamide mixture is less than the aforementioned values, mechanical properties of the resulting multilayer tube may be inferior, while if the content of polyamide mixture exceeds the aforementioned values, the interlayer adhesion and durability thereof of the resulting multilayer tube may be inferior.

The content of the plasticizer (B3) in the Polyamide 6 composition (B1) or Polyamide 6/66/12 composition (B2) is 1% by mass to 20% by mass, preferably 2% by mass to 15% by mass, and more preferably 3% by mass to 10% by mass. If the content of the plasticizer (B3) is less than the aforementioned values, flexibility of the resulting multilayer tube may be inferior, while if the content of the plasticizer (B3) exceeds the aforementioned values, low-temperature impact resistance of the resulting multilayer tube may be inferior.

The content of the olefin polymer (B4) in the Polyamide 6 composition (B1) or Polyamide 6/66/12 composition (B2) is 1% by mass to 30% by mass, preferably 3% by mass to 25% by mass, and more preferably 5% by mass to 20% by mass. If the content of the olefin polymer (B4) is less than the aforementioned values, low-temperature impact resistance, interlayer adhesion and durability thereof of the resulting multilayer tube may be inferior, while if the content of the olefin polymer (B4) exceeds the aforementioned values, mechanical properties of the resulting multilayer tube may be inferior.

There are no particular limitations on the method used to produce the Polyamide 6 composition (B1) or Polyamide 6/66/12 composition (B2), and various types of conventionally known methods can be employed by incorporating various types of additives as necessary. For example, the Polyamide 6 composition (B1) or Polyamide 6/66/12 composition (B2) can be produced by a method comprising uniformly dry-blending pellets of Polyamide 6 or Polyamide 6/66/12, long-chain aliphatic polyamide and olefin polymer (B4) along with other components added as necessary using a tumbler or mixer followed by supplying to a melt kneader, while injecting the plasticizer (B3) at an intermediate location of the cylinder of the melt kneader with a constant volume pump followed by melt kneading. Melt kneading can be carried out using a kneading machine such as a single-screw extruder, twin-screw extruder, kneader or Banbury mixer.

The Polyamide 6 composition (B1) and Polyamide 6/66/12 composition (B2) may also contain other polyamide-based resins or other thermoplastic resins. Examples of other polyamide-based resins or other thermoplastic resins include the same resins as in the case of the aforementioned aliphatic polyamide (A). The content of the Polyamide 6 composition (B1) or Polyamide 6/66/12 composition (B2) in the mixture is preferably 60% by mass more and more preferably 70% by mass or more.

Moreover, an antioxidant, heat stabilizer, ultraviolet absorber, photostabilizer, lubricant, inorganic filler, antistatic agent, flame retardant, crystallization promoter, colorant or lubricant agent and the like may also be added to the Polyamide 6 composition (B1) or Polyamide 6/66/12 composition (B2) as necessary.

3. Layer (c)

The layer (c) of the multilayer tube comprises a saponified ethylene-vinyl acetate copolymer.

[Saponified Ethylene-Vinyl Acetate Copolymer (C)]

The saponified ethylene-vinyl acetate copolymer (C) is obtained by saponifying a copolymer composed of ethylene and vinyl acetate by a known method using an alkaline catalyst and the like (to also be referred to as EVOH (C)).

Moreover, the ethylene content of EVOH (C) is preferably 15 mol % to 60 mol %, more preferably 20 mol % to 55 mol % and even more preferably 25 mol % to 45 mol % from the viewpoints of adequately ensuring melt processability, flexibility, impact resistance and chemical impermeability. Here, in the case EVOH (C) is composed of a mixture of two or more types of EVOH having different ethylene contents, the value calculated from each ethylene content and the mixing mass ratio is defined as the ethylene content.

In addition, the degree of saponification of the vinyl ester component of EVOH (C) is preferably 90 mol % or more, more preferably 95 mol % or more and even more preferably 98 mol % or more from the viewpoint of obtaining favorable chemical impermeability. Here, in the case EVOH (C) is composed of a mixture of two or more types of EVOH having different degrees of saponification, the value calculated from each degree of saponification and the mixing mass ratio is defined as the degree of saponification. Furthermore, the ethylene content and degree of saponification of EVOH can be determined by nuclear magnetic resonance (NMR).

The melt flow rate (MFR) of EVOH (C) (at 210° C. and under a load of 2,160 g) is preferably 0.1 g/10 minutes to 100 g/10 minutes, more preferably 0.3 g/10 minutes to 50 g/10 minutes, and even more preferably 0.5 g/10 minutes to 20 g/10 minutes from the viewpoints ensuring preferable processability over the proper range of viscosity when melted and preventing the occurrence of problems such as drawdown during processing without excessively lowering melt tension.

In addition, other monomers can also be copolymerized within a range that does impair the superior properties of the resulting multilayer tube. Examples of other monomers include vinyl esters such as vinyl formate, vinyl propionate, vinyl valerate, vinyl butyrate, vinyl isobutyrate, vinyl pivalate, vinyl caproate, vinyl caprylate, vinyl caprate, vinyl laurate, vinyl myristate, vinyl palmitate, vinyl stearate, isopropenyl acetate, 1-butenyl acetate, vinyl pivalate, vinyl 2-ethylhexanoate, vinyl cyclohexanecarboxylate, vinyl benzoate or vinyl cinnamate, α-olefins such as propylene, 1-butene, isobutene, 4-methyl-1-pentene, 1-hexene, 1-octene or 1-dodecene, unsaturated acids such as acrylic acid, methacrylic acid, crotonic acid, phthalic acid, maleic acid (anhydride) or itaconic acid (anhydride), salts thereof or mono- or dialkyl esters thereof having 1 to 18 carbon atoms, acrylamides such as acrylamide, N-alkylacrylamides having 1 to 18 carbon atoms, N,N-dimethylacrylamide, 2-acrylamidopropanesulfonic acid or salts thereof, and dimethylamidopropyl acrylamide, acid salts thereof or quaternary salts thereof, methacrylamides such as methacrylamide, N-alkylmethacrylamides having 1 to 18 carbon atoms, N,N-dimethylmethacrylamide, 2-methacrylamidopropanesulfonic acid or salts thereof, or dimethylamidopropyl methacrylamide, acid salts thereof or quaternary salts thereof, N-vinylamides such as N-vinylpyrrolidone, N-vinylformamide or N-vinylacetoamide, vinyl cyanides such as acrylonitrile or methacrylonitrile, vinyl ethers such as alkyl vinyl ethers, hydroxyalkyl vinyl ethers or alkoxyalkyl vinyl ethers having 1 to 18 carbon atoms, vinyl halides such as vinyl chloride, vinylidene chloride, vinyl fluoride, vinylidene fluoride or vinyl bromide, vinylsilanes such as vinyltrimethoxysilane, vinylmethyldimethoxysilane, vinyldimethylmethoxysilane, vinyltriethoxysilane, vinylmethyldiethoxysilane, vinyldimethylethoxysilane or γ-methacryloxypropylmethoxysilane, allyl acetate, allyl chloride, allyl alcohol, dimethylallyl alcohol, trimethyl-(3-acrylamido-3-dimethylpropyl)-ammonium chloride, acrylamido-2-methylpropanesulfonic acid and vinyl ethylene carbonate. One type or two or more types thereof can be used.

In addition, EVOH (C) can also contain various types of additives as necessary. Examples of such additives include antioxidants, plasticizers, heat stabilizers, ultraviolet absorbers, antistatic agents, lubricants, colorants, fillers and other thermoplastic resins, and these additives can be contained within a range that does not impair the superior properties of the resulting multilayer tube. Specific examples of additives include antioxidants such as 2,5-di-t-butylhydroquinone, 2,6-di-t-butyl-p-cresol, 4,4'-thiobis(6-t-butyl-m-cresol), 4,4'-thiobis(6-t-butylphenol), 4,4'-thiobis(3-methyl-6-t-butylphenol), 2,2'-methylene-bis(4-methyl-6-t-butylphenol), 2,2'-methylene-bis(4-ethyl-6-t-butylphenol), n-octadecyl-β-(3',5'-di-t-butyl-4'-hydroxyphenyl)propionate, N,N'-hexamethylenebis(3,5-di-t-butyl-4-hydroxyhydrocinnamate), 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis[methylene-3-(3',5'-di-t-butyl-4'-hydroxyphenyl)propionate], benzeneerythrityl tetrakis[3-(3,5-di-t-butyl-4-hydroxyphenyl)propionate], tris(2,4-di-t-butylphenyl) or di(2,4-di-t-butylphenyl)pentaerythritol diphosphite, ultraviolet absorbers such as ethylene-2-cyano-3,3'-diphenylacrylate, 2-(2'-hydroxy-5'-methylphenyl)benzotriazole, 2-(2'-hydroxy-3'-t-butyl-5'-methylphenyl)-5-chlorobenzotriazole, 2-hydroxy-4-methoxybenzophenone, 2,2'-dihydroxy-4-methoxybenzophenone or 2-hydroxy-4-octoxybenzophenone, plasticizers such as dimethyl phthalate, diethyl phthalate, dioctyl phthalate or phosphate esters, antistatic agents such as aliphatic polyvalent alcohols in the manner of pentaerythritol monostearate, sorbitan monopalmitate, sulfated polyolefins, ethylene glycol, glycerin or hexanediol, lubricants such as saturated aliphatic amides in the manner of stearic acid amide, unsaturated fatty acid amides in the manner of oleic acid amide, bis fatty acid amides in the manner of ethylenebis stearic acid amide, fatty acid metal salts in the manner of calcium stearate, magnesium stearate, zinc stearate or aluminum stearate, wax, liquid paraffin or low molecular weight polyolefins, stabilizers such as organic acids in the manner of acetic acid, propionic acid or stearic acid, inorganic acid-based compounds in the manner of boric acid compounds or phosphoric acid compounds, or metal salts of hydrotalcites, oxygen absorbers such as reducing iron powder, potassium sulfite, ascorbic acid, hydroquinone or gallic acid, colorants such as carbon black, phthalocyanine, quinacridone, indoline, azo-based pigments or red iron oxide, and fillers such as glass fibers, asbestos, ballastonite, mica, sericite, talc, silica, kaolin, calcium silicate or montmorillonite.

Moreover, EVOH (C) preferably contains a boron compound. The containing of a boron compound is effective from the viewpoint of obtaining a multilayer tube having improved melt stability and a uniform wall thickness. Examples of boron compounds include boric acids, boric acid esters, borates and boron hydrides. Examples of boric acids include orthoboric acid, metaboric acid and tetraboric acid, examples of boric acid esters include triethyl borate and trimethyl borate, and examples of borates include borax, alkaline metal salts and alkaline earth metal salts of each of the aforementioned boric acids. One type or two or more types thereof can be used. Among these, orthoboric acid is preferable.

The content of boron compound in EVOH (C) as elemental boron is preferably 0.002 part by mass to 0.5 part by mass and more preferably 0.005 part by mass to 0.2 part by mass based on 100 parts by mass of EVOH (C) from the viewpoints of adequately ensuring the effect of the containing thereof and obtaining a tube having a favorable appearance.

EVOH (C) may also contain a phosphoric acid compound. The containing of a phosphoric acid compound serves to realize long-running during melt processing, coloring resistance and interlayer adhesion. There are no particular limitations on the phosphoric acid compound and various types of acids such as phosphoric acid or phosphorous acid or salts thereof can be used. Examples of phosphates include monobasic phosphates, dibasic phosphates and tribasic phosphates. One type or two or more types thereof can be used. Although there are also no particular limitations on the cationic species of the phosphate, alkaline metal salts are preferable, and among these, dihydrogen sodium phosphate, dihydrogen potassium phosphate, disodium hydrogen phosphate and dipotassium hydrogen phosphate are preferable.

The content of phosphoric acid compound in EVOH (C) as phosphate radical is preferably 0.02 part by mass or less, more preferably 0.0005 part by mass to 0.01 part by mass, and even more preferably 0.001 part by mass to 0.0.007 part by mass based on 100 parts by mass of EVOH (C) from the viewpoints of adequately ensuring the effect of the containing thereof and obtaining a favorable tube appearance.

In addition, the containing of an alkaline and/or alkaline earth metal salt in EVOH (C) is preferable from the viewpoint of melt stability and long-running. There are no limitations on the anionic species of the alkaline metal or alkaline earth metal salt, and examples thereof include carboxylates, hydroxides, carbonates and bicarbonates. There are also no limitations on the cationic species of the alkaline metal salt, examples thereof include lithium salts, sodium salts and potassium salts, there also no limitations on the cationic species of the alkaline earth metal salt, and examples thereof include magnesium salts, calcium salts, barium salts, beryllium salts and strontium salts. Specific examples include sodium acetate, lithium acetate, potassium acetate, calcium palmitate, magnesium palmitate, calcium myristate, magnesium myristate, calcium stearate, magnesium stearate, calcium oleate, magnesium oleate, calcium linoleate, magnesium linoleate, calcium linolenate, magnesium linolenate, sodium phosphate and lithium phosphate. One type or two or more types thereof can be used.

The content of alkaline and/or alkaline earth metal salt in EVOH (C) as elemental metal is preferably 0.0005 part by mass to 0.2 part by mass, more preferably 0.001 part by mass to 0.1 part by mass, and even more preferably 0.002 part by mass to 0.05 part by mass based on 100 parts by mass of EVOH (C) from the viewpoints of adequately ensuring the effect of the containing thereof and obtaining a tube having a favorable appearance.

Moreover, one type or two or more types of antioxidant such as hydrotalcites or hindered phenols are preferably added within a range of 0.01 part by mass to 1 part by mass based on 100 parts by mass of EVOH (C) that does not impair the superior properties of the resulting multilayer tube in order to improve melt stability and the like.

4. Layer (d)

Layer (d) of the multilayer tube comprises a semi-aromatic polyamide composition (D1) or a semi-aromatic polyamide composition (D2).

[Semi-Aromatic Polyamide Composition (D1), Semi-Aromatic Polyamide Composition (D2)]

Semi-aromatic polyamide composition (D1) contains semi-aromatic polyamide (d1) (to also be referred to as semi-aromatic polyamide composition (D1)), and the semi-aromatic polyamide (d1) contains a diamine unit containing 50 mol % or more of an aliphatic diamine unit having 9 to 13 carbon atoms based on the total number of diamine units, and a carboxylic acid unit containing 50 mol % or more of a terephthalic acid unit and/or naphthalene dicarboxylic acid unit based on the total number of carboxylic acid units (to also be referred to as the semi-aromatic polyamide (d1)).

The content of the aliphatic diamine unit having 9 to 13 carbon atoms in the semi-aromatic polyamide (d1) is 50 mol % or more, preferably 55 mol % or more and more preferably 60 mol % or more based on the total number of diamine units from the viewpoint of adequately ensuring various properties of the resulting multilayer tube such as heat resistance, chemical resistance, impact resistance or chemical impermeability.

Examples of aliphatic diamine units having 9 to 13 carbon atoms include units derived from 1,9-nonanediamine, 1,10-decanediamine, 1,11-undecanediamine, 1,12-dodecanediamine and 1,13-tridecanediamine. Units derived from branched aliphatic diamines may also be contained provided the aforementioned number of carbon atoms is satisfied, and examples thereof include 2,2,4-trimethyl-1,6-hexanediamine, 2,4,4-trimethyl-1,6-hexanediamine, 2,4-diethyl-1,6-hexanediamine, 2,2-dimethylheptanediamine, 2,3-dimethylheptanediamine, 2,4-dimethylheptanediamine, 2,5-dimethylheptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,2-dimethyl-1,8-octanediamine, 2,4-dimethyl-1,8-octanediamine, 3,3-dimethyl-1,8-octanediamine, 3,4-dimethyl-1,8-octanediamine, 4,4-dimethyl-1,8-octanediamine, 4,5-dimethyl-1,8-octanediamine, 5-methyl-1,9-nonanediamine, 2-butyl-1,8-octanediamine and 3-butyl-1,8-octanediamine. One type or two or more types thereof can be used.

Among the aforementioned aliphatic diamine units having 9 to 13 carbon atoms, units derived from 1,9-nonanediamine, 2-methyl-1,8-octanediamine or 1,10-decanediamine are preferable from the viewpoint of a proper balance between co-extrusion processability and chemical impermeability, while units derived from 1,12-dodecanediamine are preferable from the viewpoint of adequately ensuring low-temperature impact resistance. Moreover, in the case of combining the use of 1,9-nonanediamine and 2-methyl-1,8-octanediamine, the molar ratio of 1,9-nonanediamine units to 2-methyl-1,8-octanediamine units is preferably 30:70 mol % to 98:2 mol % and more preferably 40:60 mol % to 95:5 mol % from the viewpoint of the proper balance between processability and impact resistance.

The diamine unit in the semi-aromatic polyamide (d1) may include diamine units other than aliphatic diamine units having 9 to 13 carbon atoms provided they are within a range that does not impair the superior properties of the resulting multilayer tube. Examples of other diamine units include units derived from aliphatic diamines such as 1,2-ethanediamine, 1,3-propanediamine, 1,4-butanediamine, 1,5-pentanediamine, 1,6-hexanediamine, 1,7-heptanediamine, 1,8-octanediamine, 2-methyl-1,5-pentanediamine or 3-methyl-1,5-pentanediamine, units derived from alicyclic diamines such as 1,3-cyclohexanediamine, 1,4-cyclohexanediamine, 1,3-bis(aminomethyl)cyclohexane, 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, 2,5-bis(aminomethyl)norbornane, 2,6-bis(aminomethyl)norbornane, 3,8-bis(aminomethyl)tricyclodecane or 4,9-bis(aminomethyl)tricyclodecane, and units derived from aromatic diamines such as m-phenylenediamine, p-phenylenediamine, m-xylylenediamine, p-xylylenediamine, 1,4-bis(aminomethyl)naphthalene, 1,5-bis(aminomethyl)naphthalene, 2,6-bis(aminomethyl)naphthalene, 2,7-bis(aminomethyl)naphthalene, 4,4'-diaminodiphenylmethane, 2,2-bis(4-aminophenyl)propane, 4,4'-diaminodiphenylsulfone or 4,4'-diaminodiphenyl ether, and one type or two or more types thereof can be used. The content of these other diamines is 50 mol % or less, preferably 45 mol % or less and more preferably 40 mol % or less based on the total number of diamine units.

In addition, the content of terephthalic acid units and/or naphthalene dicarboxylic acid units in the semi-aromatic polyamide (d1) is 50 mol % or more, preferably 55 mol % or more, and more preferably 60 mol % or more based on the total number of dicarboxylic acid units from the viewpoint of adequately obtaining the various properties of the resulting multilayer tube such as heat resistance, chemical resistance or chemical impermeability.

Examples of naphthalene dicarboxylic acid units include units derived from 2,6-naphthalenedicarboxylic acid, 2,7-naphthalenedicarboxylic acid, 1,4-naphthalenedicarboxylic acid and 1,5-naphthalenedicarboxylic acid. One type or two or more types thereof can be used. Among the aforementioned naphthalene dicarboxylic acid units, units derived from 2,6-naphthalenedicarboxylic acid and 2,7-naphthalenedicarboxylic acid are preferable in consideration of economy and availability.

The dicarboxylic acid unit in the semi-aromatic polyamide (d1) may include dicarboxylic acid units other than the terephthalic acid unit and/or naphthalene dicarboxylic acid unit within a range that does not impair the superior properties of the resulting multilayer tube. Examples of other dicarboxylic acid units include units derived from aliphatic dicarboxylic acids such as malonic acid, dimethylmalonic acid, succinic acid, glutaric acid, adipic acid, 2-methyladipic acid, pimelic acid, 2,2-dimethylglutaric acid, 2,2-diethylsuccinic acid, suberic acid, azelaic acid, 2,2,4-trimethyladipic acid, 2,4,4-trimethyladipic acid, sebacic acid, undecanedioic acid, dodecanedioic acid, tridecanedioic acid, tetradecanedioic acid, pentadecanedioic acid, hexadecanedioic acid, octadecanedioic acid or eicosanedioic acid, units derived from alicyclic dicarboxylic acids such as 1,3-cyclopentanedicarboxylic acid, 1,3-cyclohexanedicarboxylic acid or 1,4-cyclohexanedicarboxylic acid, and units derived from aromatic dicarboxylic acids such as phthalic acid, isophthalic acid, 1,3-phenylenedioxydiacetic acid, 1,4-phenylenedioxydiacetic acid, 4,4'-oxydibenzoic acid, diphenylmethane-4,4'-dicarboxylic acid, diphenylethane-4,4'-dicarboxylic acid, diphenylpropane-4,4'-dicarboxylic acid, diphenylether-4,4'-dicarboxylic acid, diphenyl sulfone-4,4'-dicarboxylic acid, 4,4'-biphenyl dicarboxylic acid or 4,4'-triphenyldicarboxylic acid, and one type or two or more types thereof can be used. Among these, units derived from aromatic dicarboxylic acids are preferable. The content of these other dicarboxylic acid units is 50 mol % or less, preferably 45 mol % or less and more preferably 40 mol % or less based on the total number of dicarboxylic acid units. Moreover, polyvalent carboxylic acids such as trimellitic acid, trimesic acid or pyromellitic acid can also be used within a range that allows melt processing.

The semi-aromatic polyamide (d1) may also contain a unit other than the dicarboxylic acid unit and diamine unit within a range that does not impair the superior properties of the resulting multilayer tube. Examples of other units include units derived from lactams such as caprolactam, enantolactam, undecanelactam, dodecanelactam, α-pyrrolidone or α-piperidone, aliphatic aminocarboxylic acids such as 6-aminocaproic acid, 7-aminopentanoic acid, 9-aminononanoic acid, 11-aminoundecanoic acid or 12-aminododecanoic acid, and units derived from aminocarboxylic acids of aromatic aminocarboxylic acids such as p-aminomethylbenzoic acid. One type or two or more types thereof can be used. The content of these other units is 45 mol % or less, preferably 45 mol % or less, more preferably 40 mol % or less and even more preferably 35 mol % or less based on the total number of dicarboxylic acid units.

Moreover, examples of devices used to produce the semi-aromatic polyamide (d1) include known polyamide production devices such as batch-type reactors, single-tank and/or multi-tank continuous reactors, tubular continuous reactors, and kneading reaction extruders such as single-screw kneading extruders or twin-screw kneading extruders. A known polymerization method such as melt polymerization, solution polymerization or solid phase polymerization can be used for the polymerization method, and polymerization can be carried out by repeating normal pressure, reduced pressure and increased pressure operations. These polymerization methods can be used alone or suitably used in combination.

When producing the semi-aromatic polyamide (d1), phosphoric acid, phosphorous acid, hypophosphorous acid or salts or esters thereof can be added as catalyst. Examples of salts and esters of phosphoric acid, phosphorous acid and hypophosphorous acid include metal salts of phosphoric acid, phosphorous acid or hypophosphorous acid and potassium, sodium, magnesium, vanadium, calcium, zinc, cobalt, manganese, tin, tungsten, germanium, titanium or antimony, ammonium salts of phosphoric acid, phosphorous acid or hypophosphorous acid, and ethyl esters, isopropyl esters, butyl esters, hexyl esters, isodecyl esters, decyl esters, stearyl esters and phenyl esters of phosphoric acid, phosphorous acid or hypophosphorous acid. One type or two or more types thereof can be used.

Semi-aromatic polyamide composition (D2) contains semi-aromatic polyamide (d2) (to also be referred to as semi-aromatic polyamide composition (D2)), and the semi-aromatic polyamide (d2) contains a diamine unit containing 50 mol % or more of xylylenediamine unit and/or bis(aminomethyl)naphthalene unit based on the total number of diamine units, and a carboxylic acid unit containing 50 mol % or more of an aliphatic dicarboxylic acid unit having 8 to 13 carbon atoms based on the total number of carboxylic acid units (to also be referred to as the semi-aromatic polyamide (d2)).

The content of the xylylenediamine unit and/or bis(aminomethyl)naphthalene unit in the semi-aromatic polyamide (d2) is 50 mol % or more, preferably 60 mol % or more and more preferably 70 mol % or more based on the total number of diamine units from the viewpoint of adequately ensuring various properties of the resulting multilayer tube such as heat resistance, chemical resistance, impact resistance or chemical impermeability.

Examples of the xylylenediamine unit include units derived from o-xylylenediamine, m-xylylenediamine and p-xylylenediamine. One type or two or more types thereof can be used. Among the aforementioned xylylenediamine units, units derived from m-xylylenediamine and p-xylylenediamine are preferable.

Examples of the bis(aminomethyl)naphthalene unit include units derived from 1,4-bis(aminomethyl)naphthalene, 1,5-bis(aminomethyl)naphthalene, 2,6-bis(aminomethyl)naphthalene and 2,7-bis(aminomethyl)naphthalene. One type or two or more types thereof can be used. Among the aforementioned bis(aminomethyl)naphthalene units, units derived from 1,5-bis(aminomethyl)naphthalene and 2,6-bis(aminomethyl)naphthalene are preferable.

The diamine unit in the semi-aromatic polyamide (d2) may include other diamine units in addition to the xylylenediamine unit and/or bis(aminomethyl)naphthalene unit within a range that does not impair the superior properties of the resulting multilayer tube. Examples of other diamine units include units derived from aliphatic diamines such as 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine or 5-methyl-1,9-nonanediamine, units derived from alicyclic diamines such as 1,3-cyclohexanediamine, 1,4-cyclohexanediamine, 1,3-bis(aminomethyl)cyclohexane, 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, 2,5-bis(aminomethyl)norbornane, 2,6-bis(aminomethyl)norbornane, 3,8-bis(aminomethyl)tricyclodecane or 4,9-bis(aminomethyl)tricyclodecane, and units derived from aromatic diamines such as m-phenylenediamine, p-phenylenediamine, 4,4'-diaminodiphenylmethane, 2,2-bis(4-aminophenyl)propane, 4,4'-diaminodiphenylsulfone or 4,4'-diaminodiphenyl ether, and one type or two or more types thereof can be used. Among these, units derived from aromatic diamines are preferable. The content of these other diamines is 50 mol % or less, preferably 40 mol % or less and more preferably 30 mol % or less based on the total number of diamine units.

In addition, the content of the aliphatic dicarboxylic acid unit having 8 to 13 carbon atoms in the semi-aromatic polyamide (d2) is 50 mol % or more, preferably 60 mol % or more and more preferably 70 mol % or more based on the total number of dicarboxylic acid units from the viewpoint of adequately ensuring various properties of the resulting multilayer tube such as heat resistance, chemical resistance or chemical impermeability.

Examples of the aliphatic dicarboxylic acid unit having 8 to 13 carbon atoms include units derived from suberic acid, azelaic acid, sebacic acid, undecanedioic acid, dodecanedioic acid and tridecanedioic acid. Units derived from branched aliphatic dicarboxylic acids such as 2,2-diethylsuccinic acid, 2,2,4-trimethyladipic acid, 2,4,4-trimethyladipic acid or 2-butylsuberic acid may also be contained provided the aforementioned number of carbon atoms is satisfied. One type or two or more types thereof can be used.

Among the aforementioned aliphatic dicarboxylic acid units having 8 to 13 carbon atoms, units derived from azelaic acid and sebacic acid are preferable from the viewpoint of a proper balance between co-extrusion processability and chemical impermeability, while units derived from dodecanedioic acid are preferable from the viewpoint of adequately ensuring low-temperature impact resistance.

The dicarboxylic acid unit in the semi-aromatic polyamide (d2) may also include other dicarboxylic acid units in addition to the aliphatic dicarboxylic acid unit having 8 to 13 carbon atoms. Examples of other dicarboxylic acid units include units derived from aliphatic dicarboxylic acids such as malonic acid, dimethylmalonic acid, succinic acid, glutaric acid, adipic acid, 2-methyladipic acid, pimelic acid, 2,2-dimethylglutaric acid, tetradecanedioic acid, pentadecanedioic acid, hexadecanedioic acid, octadecanedioic acid or eicosanedioic acid, units derived from alicyclic dicarboxylic acids such as 1,3-cyclopentanedicarboxylic acid, 1,3-cyclohexanedicarboxylic acid or 1,4-cyclohexanedicarboxylic acid, and units derived from aromatic dicarboxylic acids such as terephthalic acid, isophthalic acid, 1,4-naphthalenedicarboxylic acid, 1,5-naphthalenedicarboxylic acid, 2,6-naphthalenedicarboxylic acid, 2,7-naphthalenedicarboxylic acid, 1,3-phenylenedioxydiacetic acid, 1,4-phenylenedioxydiacetic acid, 4,4'-oxydibenzoic acid, diphenylmethane-4,4'-dicarboxylic acid, diphenylethane-4,4'-dicarboxylic acid, diphenylpropane-4,4'-dicarboxylic acid, diphenylether-4,4'-dicarboxylic acid, diphenyl sulfone-4,4'-dicarboxylic acid, 4,4'-biphenyl dicarboxylic acid or 4,4'-triphenyldicarboxylic acid, and one type or two or more types thereof can be used. The content of these other dicarboxylic acid units is 50 mol % or less, preferably 40 mol % or less, and more preferably 30 mol % or less based on the total number of dicarboxylic acid units. Moreover, polyvalent carboxylic acids such as trimellitic acid, trimesic acid or pyromellitic acid can also be used within a range that allows melt processing.

The semi-aromatic polyamide (d2) may also contain other units in addition to the dicarboxylic acid unit and diamine unit within a range that does not impair the superior properties of the resulting multilayer tube. Examples of other units include units derived from lactams such as caprolactam, enantolactam, undecanelactam, dodecanelactam, α-pyrrolidone or α-piperidone, units derived from aliphatic aminocarboxylic acids such as 6-aminocaproic acid, 7-aminoheptanoic acid, 9-aminononanoic acid, 11-aminoundecanoic acid or 12-aminododecanoic acid, and units derived from aminocarboxylic acids of aromatic aminocarboxylic acids such as p-aminomethylbenzoic acid. One type or two or more types thereof can be used. The content of these other units is preferably 30 mol % or less and more preferably 10 mol % or less based on the total number of dicarboxylic acid units.

Examples of devices used to produce the semi-aromatic polyamide (d2) include known polyamide production devices such as batch-type reactors, single-tank and/or multi-tank continuous reactors, tubular continuous reactors and kneading reaction extruders such as single-screw kneading extruders or twin-screw kneading extruders. A known polymerization method such as melt polymerization, solution polymerization or solid phase polymerization can be used for the method used to produce the semi-aromatic polyamide (d2), and these methods can be used to produce the semi-aromatic polyamide (d2) by repeating normal pressure, reduced pressure and increased pressure operations.

These production methods can be used alone or suitably used in combination, and among these methods, melt polymerization is preferable. For example, the semi-aromatic polyamide (d2) is produced by a method consisting of pressurizing and heating xylylenediamine and/or bis(aminomethyl)naphthalene and a nylon salt composed of an aliphatic dicarboxylic acid having 8 to 13 carbon atoms in the presence of water, followed by polymerizing in a molten state while removing the added water and condensed water. In addition, the semi-aromatic polyamide (d2) is also produced by a method consisting of adding xylylenediamine and/or bis(aminomethyl)naphthalene directly to an aliphatic dicarboxylic acid having 8 to 13 carbon atoms in a molten state followed by subjecting to polycondensation under normal pressure. In this case, the xylylenediamine and/or bis(aminomethyl)naphthalene are continuously added to the aliphatic dicarboxylic acid having 8 to 13 carbon atoms in order to maintain the reaction system in a homogeneous liquid state, and during that time, polymerization is allowed to proceed while heating the reaction system so that the temperature of the reaction system is equal to or higher than the melting point of oligoamides and polyamides formed. In addition, the semi-aromatic polyamide (d2) may be subjected to solid phase polymerization after having been produced by melt polymerization.

A phosphorous compound can be added to the semi-aromatic polyamide (d2) as a catalyst or in order to enhance processing stability and prevent coloring during melt processing. Examples of phosphorous compounds include alkaline earth metal salts of hypophosphorous acid, alkaline metal salts of phosphorous acid, alkaline earth metal salts of phosphorous acid, alkaline metal salts of phosphoric acid, alkaline earth metal salts of phosphoric acid, alkaline metal salts of pyrophosphoric acid, alkaline earth metal salts of pyrophosphoric acid, alkaline metal salts of metaphosphoric acid and alkaline earth metal salts of metaphosphoric acid.

Specific examples include calcium hypophosphite, magnesium hypophosphite, sodium phosphite, sodium hydrogen phosphite, potassium phosphite, potassium hydrogen phosphite, lithium phosphite, lithium hydrogen phosphite, magnesium phosphite, magnesium hydrogen phosphite, calcium phosphite, calcium hydrogen phosphite, sodium phosphate, disodium hydrogen phosphate, sodium dihydrogen phosphate, potassium phosphate, dipotassium hydrogen phosphate, potassium dihydrogen phosphate, magnesium phosphate, dimagnesium hydrogen phosphate, magnesium dihydrogen phosphate, calcium phosphate, dicalcium hydrogen phosphate, calcium dihydrogen phosphate, lithium phosphate, dilithium hydrogen phosphate, lithium dihydrogen phosphate, sodium pyrophosphate, potassium pyrophosphate, magnesium pyrophosphate, calcium pyrophosphate, lithium pyrophosphate, sodium metaphosphate, potassium metaphosphate, magnesium metaphosphate, calcium metaphosphate and lithium metaphosphate. One type or two or more types thereof can be used. Among these, calcium hypophosphite, magnesium hypophosphite, calcium phosphite, calcium hydrogen phosphite and calcium dihydrogen phosphate are preferable, and calcium hypophosphite is more preferable. Furthermore, these phosphorous compounds may also be in the form of hydrates.

The content of phosphorous compound as phosphorous atom concentration is preferably 0.030 parts by mass to 0.30 parts by mass, more preferably 0.050 parts by mass to 0.20 parts by mass, and even more preferably 0.070 parts by mass to 0.15 parts by mass based on 100 parts by mass of the semi-aromatic polyamide (d2) from the viewpoints of adequately ensuring the catalytic effect and effect of preventing coloration during polymerization and inhibiting the formation of a gel.

Although examples of methods used to add these phosphorous compounds include adding to the raw materials of the semi-aromatic polyamide (d2) in the form of the nylon salt aqueous solution, diamine or dicarboxylic acid, adding to the dicarboxylic acid in a molten state, and adding during melt polymerization, the method is not limited to these methods and any method may be used provided the phosphorous compound can be uniformly dispersed in the semi-aromatic polyamide (d2).

An alkaline metal compound can be added to the semi-aromatic polyamide (d2) in combined use with the phosphorous compound. Although an adequate amount of phosphorous compound is required to be present during polycondensation to prevent coloring of the polyamide, since there is the risk of the occurrence of gelation of the polyamide depending on the case, an alkaline metal compound is also preferably made to be present in order to regulate the amidation reaction rate. Examples of alkaline metal compounds include alkaline metal hydroxides, alkaline earth metal hydroxides, alkaline metal acetates and alkaline earth metal acetates, and alkaline metal hydroxides and alkaline metal acetates are preferable.

Specific examples of alkaline metal compounds include lithium hydroxide, sodium hydroxide, potassium hydroxide, rubidium hydroxide, cesium hydroxide, magnesium hydroxide, calcium hydroxide, strontium hydroxide, barium hydroxide, lithium acetate, sodium acetate, potassium acetate, rubidium acetate, cesium acetate, magnesium acetate, calcium acetate, strontium acetate and barium acetate. One type or two or more types thereof can be used. Among these, sodium hydroxide, potassium hydroxide, magnesium hydroxide, calcium hydroxide, sodium acetate and potassium acetate are preferable from the viewpoint of economy, while sodium hydroxide, sodium acetate and potassium acetate are more preferable.

In the case of adding an alkaline metal compound to the polycondensation system of the semi-aromatic polyamide (d2), the value obtained by dividing the number of moles of the alkaline metal compound by the number of moles of the aforementioned phosphorous compound as the number of phosphorous atoms is preferably 0.30 to 1.0, more preferably 0.40 to 0.95 and even more preferably 0.50 to 0.90 from the viewpoint of proper balance between promotion and suppression of the amidation reaction.

Although examples of methods used to add these alkaline metal compounds include adding to the raw materials of the semi-aromatic polyamide (d2) in the form of the nylon salt aqueous solution, diamine or dicarboxylic acid, adding to the dicarboxylic acid in a molten state, and adding during melt polymerization, the method is not limited to these methods and any method may be used provided the alkaline metal compound can be uniformly dispersed in the semi-aromatic polyamide (d2).

Relative viscosity of the semi-aromatic polyamide (d1) and semi-aromatic polyamide (d2) as measured in compliance with JIS K-6920 under conditions of 96% sulfuric acid, polymer concentration of 1% and 25° C. is preferably 1.5 to 4.0, more preferably 1.8 to 3.5, and even more preferably 2.0 to 3.0 from the viewpoints of ensuring mechanical properties of the resulting multilayer tube and ensuring preferable processability of the multilayer tube over the proper range of viscosity when melted.

Furthermore, there are no particular restrictions on the types or concentrations of terminal groups or on molecular weight distribution of the semi-aromatic polyamide (d1) and semi-aromatic polyamide (d2). One type or two or more types of a monoamine, diamine, polyamine, monocarboxylic acid or dicarboxylic acid can be suitably combined and added in order to regulate molecular weight or stabilize melting during processing. Examples thereof include aliphatic monoamines such as methylamine, ethylamine, propylamine, butylamine, hexylamine, octylamine, decylamine, stearylamine, dimethylamine, diethylamine, dipropylamine or dibutylamine, alicyclic monoamines such as cyclohexylamine or dicyclohexylamine, aromatic monoamines such as aniline, toluidine, diphenylamine or naphthylamine, aliphatic diamines such as 1,4-butanediamine, 1,5-pentanediamine, 1,6-hexanediamine, 1,8-octanediamine or 2-methyl-1,5-pentanediamine, alicyclic diamines such as cyclohexanediamine, bis(aminomethyl)cyclohexane or 5-amino-1,3,3-trimethylcyclohexanemethylamine, aromatic diamines such as m-phenylenediamine or p-phenylenediamine, polyamines such as polyalkyleneimines, polyalkylene polyamines, polyvinylamines or polyallylamines, aliphatic monocarboxylic acids such as acetic acid, propionic acid, butyric acid, valeric acid, caproic acid, caprylic acid, lauric acid, tridecylic acid, myristic acid, palmitic acid, stearic acid, pivalic acid or isobutyric acid, alicyclic monocarboxylic acids such as cyclohexanecarboxylic acid, aromatic monocarboxylic acids such as benzoic acid, toluic acid, α-naphthalenecarboxylic acid, β-naphthalenecarboxylic acid, methylnaphthalenecarboxylic acid or phenylacetic acid, aliphatic dicarboxylic acids such as adipic acid or pimelic acid, alicyclic dicarboxylic acids such as 1,3-cyclopentanedicarboxylic acid, 1,3-cyclohexanedicarboxylic acid or 1,4-cyclohexanedicarboxylic acid, and aromatic dicarboxylic acids such as phthalic acid or isophthalic acid. One type or two or more types thereof can be used. Although varying according to the reactivity of the molecular weight regulator and polymerization conditions, the amount of these molecular weight regulators used is suitably determined so that the relative viscosity of the polyamide to be ultimately obtained is within the aforementioned range.

In consideration of melt stability, terminal groups of the molecular chain of the semi-aromatic polyamide (d1) and semi-aromatic polyamide (d2) are preferably blocked with a terminal blocking agent, and more preferably 10% or more, and even more preferably 20% or more, of the terminal groups are blocked. Although there are no particular limitations on the terminal blocking agent provided it is a monofunctional compound having reactivity with the amino group or carboxyl group of the polyamide terminal, a monocarboxylic acid or monoamine is preferable from the viewpoints of reactivity and stability of the blocked terminal, and a monocarboxylic acid is more preferable from the viewpoint of handling ease and the like. In addition, acid anhydrides such as phthalic anhydride, monoisocyanates, monoacid halides, monoesters or monoalcohols can also be used.

There are no particular limitations on the monocarboxylic acid used as a terminal blocking agent provided it has reactivity with an amino group, and examples thereof include the aforementioned aliphatic monocarboxylic acids, alicyclic monocarboxylic acids and aromatic monocarboxylic acids. From the viewpoint of reactivity, stability of the blocked terminal, price and the like, acetic acid, propionic acid, butyric acid, valeric acid, caproic acid, caprylic acid, lauric acid, tridecylic acid, myristic acid, palmitic acid, stearic acid and benzoic acid are preferable. There are also no particular limitations on the monoamine used as a terminal blocking agent provided it has reactivity with a carboxyl group, and examples thereof include the aforementioned aliphatic monoamines, alicyclic monoamines and aromatic monoamines. Among these, butylamine, hexylamine, octylamine, decylamine, stearylamine, cyclohexylamine and aniline are preferable from the viewpoints of reactivity, boiling point, stability of the blocked terminal, price and the like.

The amount of terminal blocking agent used can be suitably selected in consideration of the reactivity and boiling point of the terminal blocking agent used, reactor, reaction conditions and the like. From the viewpoint of adjusting degree of polymerization, 0.1 mol % to 15 mol % of terminal blocking agent is used based on the total number of moles of the raw material components in the form of dicarboxylic acid and diamine.

The semi-aromatic polyamide composition (D1) and semi-aromatic polyamide composition (D2) may also contain other polyamide-based resins or other thermoplastic resins in addition to the semi-aromatic polyamide (d1) or semi-aromatic polyamide (d2). Examples of other polyamide-based resins or other thermoplastic resins include the same resins as in the case of the aforementioned aliphatic polyamide (A). Moreover, the semi-aromatic polyamide composition (D1) and semi-aromatic polyamide composition (D2) may also be a mixture of the semi-aromatic polyamide (d1) or semi-aromatic polyamide (d2) with the aliphatic polyamide (A). The content of the semi-aromatic polyamide (d1) or semi-aromatic polyamide (d2) in the mixture is preferably 60% by mass or more.

Moreover, an antioxidant, heat stabilizer, ultraviolet absorber, photostabilizer, lubricant, inorganic filler, antistatic agent, flame retardant, crystallization promoter, plasticizer, colorant, lubricant agent or impact modifier and the like may also be added as necessary to the semi-aromatic polyamide composition (D1) or semi-aromatic polyamide composition (D2). An impact modifier is preferably added to the semi-aromatic polyamide composition (D1) or semi-aromatic polyamide composition (D2) in order to improve low-temperature impact resistance of the semi-aromatic polyamide (d1) or semi-aromatic polyamide (d2), and in particular, a rubbery polymer having a bending elastic modulus of 500 MPa or less measured in compliance with ISO 178 as described in the aforementioned sections on the Polyamide 6 composition (B1) and Polyamide 6/66/12 composition (B2) is more preferable.

5. Layer (e)

Layer (e) of the multilayer tube comprises a fluorine-containing polymer (E) having a functional group having reactivity with an amino group introduced into the molecular chain thereof.

[Fluorine-Containing Polymer (E) Having Functional Group Having Reactivity with an Amino Group Introduced into the Molecular Chain Thereof]

The fluorine-containing polymer (E) is a fluorine-containing polymer having a functional group having reactivity with an amino group introduced into the molecular chain thereof (to also be referred to as the fluorine-containing polymer (E)).

The fluorine-containing polymer (E) is a polymer (homopolymer or copolymer) having at least one type of repeating unit derived from a fluorine-containing monomer. There are no particular limitations thereon provided it is a fluorine-containing polymer that can be processed by hot-melting.

Here, examples of fluorine-containing monomers include tetrafluoroethylene (TFE), trifluoroethylene, polyvinylidene fluoride (VDF), vinyl fluoride (VF), chlorotrifluoroethylene (CTFE), trichlorofluoroethylene, hexafluoropropylene (HFP), $CF_2$=$CFOR^{f1}$ (wherein, $R^{f1}$ represents a perfluoroalkyl group having 1 to 10 carbon atoms that may contain an etheric oxygen atom), $CF_2$=CF—$OCH_2$—$R^{f2}$ (wherein, $R^{f2}$ represents a perfluoroalkylene group having 1 to 10 carbon atoms that may contain an etheric oxygen atom), $CF_2$=CF$(CF_2)_pOCF$=$CF_2$ (wherein, p is 1 or 2), and $CH_2$=$CX^1(CF_2)_nX^2$ (wherein, $X^1$ and $X^2$ mutually and independently represent a hydrogen atom or fluorine atom, and n is an integer of 2 to 10). One type or two or more types thereof can be used.

Specific examples compounds represented by the aforementioned general formula $CF_2$=$CFOR^{f1}$ include perfluoro (alkyl vinyl ethers) (to also be referred to as PAVE) such as $CF_2$=$CFOCF^2$ (perfluoro(methyl vinyl ether): PMVE), $CF_2$=$CFOCF_2CF_3$ (perfluoro(ethyl vinyl ether): PEVE), $CF_2$=$CFOCF_2CF_2CF_3$ (perfluoro(propyl vinyl ether): PPVE), $CF_2$=$CFOCF_2CF_2CF_2CF_3$ (perfluoro(butyl vinyl ether): PBVE) or $CF_2$=$CFO(CF_2)_8F$ (perfluoro(octyl vinyl ether): POVE). Among these, $CF_2$=$CFOCF_2$ and $CF_2$=$CFOCF_2CF_2CF_3$ are preferable.

n in compounds represented by the aforementioned general formula $CH_2$=$CX^1(CF_2)_nX^2$ (wherein, $X^1$ and $X^2$ mutually and independently represent a hydrogen atom or fluorine atom, and n is an integer of 2 to 10) is an integer of 2 to 10 from the viewpoints of ensuring the effect of modifying the fluorine-containing polymer (such as inhibiting the formation of cracks during processing of a copolymer and in molded products thereof) and obtaining adequate polymerization reactivity. Specific examples include $CH_2$=$CF(CF_2)_2F$, $CH_2$=$CF(CF_2)_3F$, $CH_2$=$CF(CF_2)_4F$, $CH_2$=$CF(CF_2)_5F$, $CH_2$=$CF(CF_2)_8F$, $CH_2$=$CF(CF_2)_2H$, $CH_2$=$CF(CF_2)_3H$, $CH_2$=$CF(CF_2)_4H$, $CH_2$=$CF(CF_2)_5H$, $CH_2$=$CF(CF_2)_8H$, $CH_2$=$CH(CF_2)_2F$, $CH_2$=$CH(CF_2)_3F$, $CH_2$=$CH(CF_2)_4F$, $CH_2$=$CH(CF_2)_5F$, $CH_2$=$CH(CF_2)_8F$, $CH_2$=$CH(CF_2)_2H$, $CH_2$=$CH(CF_2)_3H$, $CH_2$=$CH(CF_2)_4H$, $CH_2$=$CH(CF_2)_5H$, and $CH_2$=$CH(CF_2)_8H$. One type of two or more types thereof can be used.

Among these, compounds represented by $CH_2$=CH$(CF_2)_nF$ or $CH_2$=$CF(CF_2)_nH$ are preferable, and compounds in which n is 2 to 4 in these formulas are more preferable from the viewpoint of a proper balance between chemical impermeability and resistance to cracking caused by environmental stress of the fluorine-containing polymer (E).

The fluorine-containing polymer (E) may also contain a polymer unit based on a non-fluorine-containing monomer in addition to the aforementioned fluorine-containing monomer. Examples of non-fluorine-containing monomers include olefins having 2 to 4 carbon atoms such as ethylene, propylene or isobutene, vinyl esters such as vinyl chloride, vinylidene chloride, vinyl acetate, vinyl chloroacetate, vinyl lactate, vinyl butyrate, vinyl pivalate, vinyl benzoate, vinyl crotonate, methyl (meth)acrylate, ethyl (meth)acrylate, n-butyl (meth)acrylate or methyl crotonate, and vinyl ethers such as methyl vinyl ether (MVE), ethyl vinyl ether (EVE), butyl vinyl ether (BVE), isobutyl vinyl ether (IBVE), cyclohexyl vinyl ether (CHVE) or glycidyl vinyl ether. One type or two or more types thereof can be used. Among these, ethylene, propylene and vinyl acetate are preferable and ethylene is more preferable.

From the viewpoints of heat resistance, chemical resistance and chemical impermeability, the fluorine-containing polymer (E) is preferably a copolymer (E5) at least comprising a copolymer (E1) comprising a vinylidene fluoride unit (VDF unit), a copolymer (E2) at least comprising a tetrafluoroethylene unit (TFE unit) and ethylene unit (E unit), a copolymer (E3) at least comprising a tetrafluoroethylene unit (TFE unit) and hexafluoropropylene unit (HFP unit) and/or PAVE unit derived from PAVE represented by the aforementioned general formula $CF_2$=$CFOR^{f1}$ (wherein, $R^{f1}$ represents a perfluoroalkyl group having 1 to 10 carbon atoms that may contain an etheric oxygen atom), a copolymer (E4) at least comprising a chlorotrifluoroethylene unit (CTFE unit), or a copolymer (E5) at least comprising a chlorotrifluoroethylene unit (CTFE unit) and tetrafluoroethylene unit (TFE unit).

Examples of the copolymer (E1) at least comprising a vinylidene fluoride unit (VDF unit) (to also be referred to as VDF copolymer (E1)) include:

vinylidene fluoride homopolymers (polyvinylidene fluoride (PVDF)) (E1-1);

copolymers comprising a VDF unit and TFE unit, wherein the VDF unit content is 30 mol % to 99 mol % and the TFE unit content is 1 mol % to 70 mol % based on all monomers excluding the functional group-containing monomer to be subsequently described (E1-2);

copolymers comprising a VDF unit, TFE unit and trichlorofluoroethylene unit, wherein the VDF unit content is 10 mol % to 90 mol %, the TFE unit content is 0 mol % to 90 mol %, and the trichlorofluoroethylene unit content is 0 mol % to 30 mol % based on all monomers excluding the functional group-containing monomer to be subsequently described (E1-3); and, copolymers comprising a VDF unit, TFE unit and HFP unit, wherein the VDF unit content is 10 mol % to 90 mol %, the TFE unit content is 0 mol % to 90 mol %, and the HFP unit content is 0 mol % to 30 mol % based on all monomers excluding the functional group-containing monomer to be subsequently described (E1-4).

In the aforementioned copolymer (E1-4), the VDF unit content is preferably 15 mol % to 84 mol %, the TFE unit content is preferably 15 mol % to 84 mol %, and the HFP unit content is preferably 0 mol % to 30 mol % based on all monomers excluding the functional group-containing monomer to be subsequently described.

Examples of the copolymer (E2) at least comprising a tetrafluoroethylene unit (TFE unit) and ethylene unit (E unit) (to also be referred to as TFE copolymer (E2)) include copolymers in which the TFE unit content is 20 mol % or more based on all monomers excluding the functional group-containing monomer to be subsequently described, and additionally copolymers in which the TFE unit content is 20 mol % to 80 mol %, the E unit content is 20 mol % to 80 mol %, and the content of units derived from monomers capable of copolymerizing therewith is 0 mol % to 60 mol % based on all monomers excluding the functional group-containing monomer to be subsequently described.

Examples of the aforementioned copolymerizable monomers include hexafluoropropylene (HFP), those represented by the aforementioned general formula $CF_2$=$CFOR^{f1}$ (wherein, $R^{f1}$ represents a perfluoroalkyl group having 1 to 10 carbon atoms that may contain an etheric oxygen atom) and those represented by the aforementioned general formula $CH_2$=$CX^1(CF_2)_nX^2$ (wherein, $X^1$ and $X^2$ mutually and independently represent a hydrogen atom or fluorine atom, and n is an integer of 2 to 10). One type of two or more types thereof can be used.

Examples of the TFE copolymer (E2) include:

copolymers comprising a TFE unit, E unit and fluoroolefin unit derived from a fluoroolefin represented by the aforementioned general formula $CH_2$=$CX^1(CF_2)_nX^2$ (wherein, $X^1$ and $X^2$ mutually and independently represent a hydrogen atom or fluorine atom, and n is an integer of 2 to 10), wherein the TFE unit content is 30 mol % to 70 mol %, the E unit content is 20 mol % to 55 mol %, and the content of a fluoroolefin unit derived from a fluoroolefin represented by the general formula $CH_2=CX^3(CF_2)_nX^4$ (wherein, $X^3$ and $X^4$ mutually and independently represent a hydrogen atom or fluorine atom and n is an integer of 2 to 10) is 0 mol % to 10 mol % based on all monomers excluding the functional group-containing monomer to be subsequently described (E2-1);

copolymers comprising a TFE unit, E unit, HFP unit and unit derived from a monomer copolymerizable therewith, wherein the TFE unit content is 30 mol % to 70 mol %, the E unit content is 20 mol % to 55 mol %, the HFP unit content is 1 mol % to 30 mol % and the content of the unit derived from a monomer copolymerizable therewith is 0 mol % to 10 mol % based on all monomers excluding the functional group-containing monomer to be subsequently described (E2-2); and copolymers comprising a TFE unit, E unit and PAVE unit derived from PAVE represented by the aforementioned general formula $CF_2=CFOR^{f1}$ (wherein, $R^{f1}$ represents a perfluoroalkyl group having 1 to 10 carbon atoms that may contain an etheric oxygen atom), wherein the TFE unit content is 30 mol % to 70 mol %, the E unit content is 20 mol % to 55 mol %, and the content of the PAVE unit derived from PAVE represented by the aforementioned general formula $CF_2=CFOR^{f1}$ (wherein, $R^{f1}$ represents a perfluoroalkyl group having 1 to 10 carbon atoms that may contain an etheric oxygen atom) is 0 mol % to 10 mol % based on all monomers excluding the functional group-containing monomer to be subsequently described (E2-3).

Examples of the copolymer (E3) at least comprising a tetrafluoroethylene unit (TFE unit), hexafluoropropylene unit (HFP unit) and/or PAVE unit derived from PAVE represented by the aforementioned general formula $CF_2=CFOR^{f1}$ (wherein, $R^{f1}$ represents a perfluoroalkyl group having 1 to 10 carbon atoms that may contain an etheric oxygen atom) (to also be referred to as TFE polymer (E3)) include:

copolymers comprising a TFE unit and HFP unit, wherein the TFE unit content is 70 mol % to 95 mol % and preferably 85 mol % to 93 mol %, and the HFP unit content is 5 mol % to 30 mol % and preferably 7 mol % to 15 mol % based on all monomers excluding the functional group-containing monomer to be subsequently described (E3-1);

copolymers comprising a TFE unit and one type or two or more types of PAVE units derived from PAVE represented by the aforementioned general formula $CF_2=CFOR^{f1}$ (wherein, $R^{f1}$ represents a perfluoroalkyl group having 1 to 10 carbon atoms that may contain an etheric oxygen atom), wherein the TFE unit content is 70 mol % to 95 mol % and the content of one type or two or more types of PAVE units derived from PAVE represented by the aforementioned general formula $CF_2=CFOR^{f1}$ (wherein, $R^{f1}$ represents a perfluoroalkyl group having 1 to 10 carbon atoms that may contain an etheric oxygen atom) is 5 mol % to 30 mol % based on all monomers excluding the functional group-containing monomer to be subsequently described (E3-2); and, copolymers comprising a TFE unit, HFP unit and one type or two or more types of PAVE units derived from PAVE represented by the aforementioned general formula $CF_2=CFOR^{f1}$ (wherein, $R^{f1}$ represents a perfluoroalkyl group having 1 to 10 carbon atoms that may contain an etheric oxygen atom), wherein the TFE unit content is 70 mol % to 95 mol % and the total content of the HFP unit and the one type or two or more types of PAVE units derived from PAVE represented by the aforementioned formula $CF_2=CFOR^{f1}$ (wherein, $R^{f1}$ represents a perfluoroalkyl group having 1 to 10 carbon atoms that may contain an etheric oxygen atom) is 5 mol % to 30 mol % based on all monomers excluding the functional group-containing monomer to be subsequently described (E3-3).

A copolymer at least comprising a chlorotrifluoroethylene unit (CTFE unit) refers to a chlorotrifluoroethylene copolymer (E4) that has a CTFE unit ($-CFCl-CF_2-$) and is composed of an ethylene unit (E unit) and/or fluorine-containing monomer unit (to also be referred to as CTFE copolymer (E4)).

There are no particular limitations on the fluorine-containing monomer in the aforementioned CTFE copolymer (E4) provided it is not CTFE, and examples thereof include vinylidene fluoride (VDF), hexafluoropropylene (HFP), PAVE represented by the aforementioned general formula $CF_2=CFOR^{f1}$ (wherein, $R^{f1}$ represents a perfluoroalkyl group having 1 to 10 carbon atoms that may contain an etheric oxygen atom), and fluoroolefins represented by the aforementioned general formula $CH_2=CX^1(CF_2)_nX^2$ (wherein, $X^1$ and $X^2$ mutually and independently represent a hydrogen atom or fluorine atom, and n is an integer of 2 to 10). One type or two or more types thereof can be used.

There are no particular limitations on the CTFE copolymer (E4), and examples thereof include CTFE-PAVE copolymers, CTFE-VDF copolymers, CTFE-HFP copolymers, CTFE-E copolymers, CTFE-PAVE-E copolymers, CTFE-VDF-E copolymers and CTFE-HFP-E copolymers.

The content of the CTFE unit in the CTFE copolymer (E4) is preferably 15 mol % to 70 mol % and more preferably 18 mol % to 65 mol % based on all monomers excluding the functional group-containing monomer to be subsequently described. On the other hand, the content of the E unit and/or fluorine-containing monomer unit is preferably 30 mol % to 85 mol % and more preferably 35 mol % to 82 mol %.

A copolymer (E5) at least comprising a chlorotrifluoroethylene unit (CTFE unit) and tetrafluoroethylene unit (TFE) unit refers to a chlorotrifluoroethylene copolymer comprising a CTFE unit ($-CFCl-CF_2-$), TFE unit ($-CF_2-CF_2-$) and a monomer unit copolymerizable with CTFE and TFE (to also be referred to as CTFE-TFE copolymer (E5)).

There are no particular limitations on the copolymerizable monomer in the aforementioned CTFE-TFE copolymer (E5) provided it is not CTFE or TFE, and examples thereof include vinylidene fluoride (VDF), hexafluoropropylene (HFP), PAVE represented by the aforementioned general formula $CF_2=CFOR^{f1}$ (wherein, $R^{f1}$ represents a perfluoroalkyl group having 1 to 10 carbon atoms that may contain an etheric oxygen atom), fluorine-containing monomers such as fluoroolefins represented by the aforementioned general formula $CH_2=CX^1(CF_2)_nX^2$ (wherein, $X^1$ and $X^2$ mutually and independently represent a hydrogen atom or fluorine atom, and n is an integer of 2 to 10), and non-fluorine-containing monomers such as olefins having 2 to 4 carbon atoms such as ethylene, propylene or isobutene, vinyl esters such as vinyl acetate, methyl (meth)acrylate or ethyl (meth)acrylate, or vinyl ethers such as methyl vinyl ether (MVE), ethyl vinyl ether (EVE) or butyl vinyl ether (BVE). One type or two or more types thereof can be used. Among these, PAVE represented by the aforementioned general formula $CF_2=CFOR^{f1}$ (wherein, $R^{f1}$ represents a perfluoroalkyl group having 1 to 10 carbon atoms that may contain an etheric oxygen atom) is preferable, perfluoro(methyl vinyl ether) (PMVE) and perfluoro(propyl vinyl ether) (PPVE) are more preferable, and PPVE is even more preferable from the viewpoint of heat resistance.

There are no particular limitations on the CTFE-TFE copolymer (E5), and examples thereof include CTFE-TFE copolymers, CTFE-TFE-HFP copolymers, CTFE-TFE-VDF copolymers, CTFE-TFE-PAVE copolymers, CTFE-TFE-E copolymers, CTFE-TFE-HFP-PAVE copolymers and CTFE-TFE-VDF-PAVE copolymers. Among these, CTFE-TFE-PAVE copolymers and CTFE-TFE-HFP-PAVE copolymers are preferable.

The total content of the CTFE unit and TFE unit in the CTFE-TFE copolymer (E5) is preferably 90.0 mol % to 99.9 mol %, and the content of the aforementioned monomer unit polymerizable with CTFE and TFE is preferably 0.10 mol % to 10.0 mol % based on all monomers excluding the functional group-containing monomer to be subsequently described from the viewpoints of ensuring favorable processability, resistance to cracking caused by environmental stress, chemical impermeability, heat resistance and mechanical properties.

The content of the CTFE unit in the CTFE-TFE copolymer (E5) is preferably 15 mol % to 80 mol %, more preferably 17 mol % to 70 mol %, and even more preferably 19 mol % to 65 mol % based on a value of 100% for the total amount of the aforementioned CTFE unit and TFE unit from the viewpoints of ensuring favorable processability, resistance to cracking caused by environmental stress and chemical impermeability.

In the CTFE-FTE copolymer (E5), in the case the aforementioned monomer copolymerizable with CTFE and FTE is PAVE, the content of the PAVE unit is preferably 0.5 mol % to 7 mol % and more preferably 1 mol % to 5 mol % based on all monomers excluding the functional group-containing monomer to be subsequently described.

In the CTFE-FTE copolymer (E5), in the case the aforementioned monomer copolymerizable with CTFE and TFE consists of HFP and PAVE, the total content of the HFP unit and PAVE unit is preferably 0.5 mol % to 7 mol % and more preferably 1 mol % to 5 mol % based on all monomers excluding the functional group-containing monomer to be subsequently described.

TFE copolymer (E3), CTFE copolymer (E4) and CTFE-TFE copolymer (E5) demonstrate superior chemical impermeability and have significantly superior barrier properties with respect to alcohol-containing gasoline. The permeability coefficient with respect to alcohol-containing gasoline is the value that is calculated from the change in mass as measured at 60° C. by placing a sheet obtained from the resin to be measured in a permeability coefficient measuring cup containing a mixed solvent of isooctane, toluene and ethanol mixed at a volume ratio of isooctane:toluene:ethanol of 45:45:10. The gasoline-containing alcohol permeability coefficient of the TFE copolymer (E3), CTFE copolymer (E4) and CTFE-TFE copolymer (E5) is preferably 1.5 g·mm/(mm$^2$·day) or less, more preferably 0.010 g·mm/(mm$^2$·day) to 1.0 g·mm/(mm$^2$·day), and even more preferably 0.020 g·mm/(mm$^2$·day) to 0.80 g·mm/(mm$^2$·day).

The fluorine-containing polymer (E) can be obtained by (co)polymerizing a monomer composing the polymer by a conventional polymerization method. Among these, radical polymerization is used primarily. Namely, there are no particular limitations on the means used to initiate polymerization provided it allows radical polymerization to proceed, and polymerization is initiated by, for example, an organic or inorganic radical polymerization initiator, heat, light or ionizing radiation.

There are no particular limitations on the method used to produce the fluorine-containing polymer (E), and a polymerization method is used that uses a commonly used radical polymerization initiator. A known polymerization method can be used for the polymerization method, examples of which include block polymerization, solution polymerization using an organic solvent such as a fluorohydrocarbon, chlorohydrocarbon, fluorochlorohydrocarbon, alcohol or hydrocarbon, suspension polymerization using an aqueous medium and suitable organic solvent as necessary, and emulsification polymerization using an aqueous medium and an emulsifier.

In addition, polymerization can be carried out by a batch or continuous procedure using a single-tank or multi-tank stirring-type polymerization reactor or tubular polymerization reactor.

The 10 hour half-life decomposition temperature of the radical polymerization initiator is preferably 0° C. to 100° C. and more preferably 20° C. to 90° C. Specific examples thereof include azo compounds such as 2,2'-azobisisobutyronitrile, 2,2'-azobis(2,4-dimethylvaleronitrile), 2,2'-azobis(2-methylvaleronitrile), 2,2'-azobis(2-cyclopropylpropionitrile), dimethyl 2,2'-azobisisobutyrate, 2,2'-azobis[2-(hydroxymethyl)propionitrile] or 4,4'-azobis(4-cyanopentenoic acid), hydroperoxides such as hydrogen peroxide, t-butyl hydroperoxide or cumene hydroperoxide, dialkyl peroxides such as di-t-butyl peroxide or dicumyl peroxide, non-fluorine-based dialkyl peroxides such as acetyl peroxide, isobutyryl peroxide, octanoyl peroxide, benzoyl peroxide or lauroyl peroxide, ketone peroxides such as methyl ethyl ketone peroxide or cyclohexanone peroxide, peroxydicarbonates such as diisopropyl peroxydicarbonate, peroxyesters such as t-butyl peroxypivalate, t-butyl peroxyisobutyrate or t-butyl peroxyacetate, fluorine-containing diacylperoxides such as compounds represented by $(Z(CF_2)_p(COO))_2$ (wherein, Z represents a hydrogen atom, fluorine atom or chlorine atom, and p is an integer of 1 to 10), and inorganic peroxides such as potassium persulfate, sodium persulfate or ammonium persulfate. One type or two or more types thereof can be used.

In addition, when producing the fluorine-containing polymer (E), an ordinary chain transfer agent is preferably used to regulate molecular weight. Examples of chain transfer agents include alcohols such as methanol or ethanol, chlorofluorohydrocarbons such as 1,3-dichloro-1,1,2,2,3-pentafluoropropane, 1,1-dichloro-1-fluoroethane, 1,2-dichloro-1,1,2,2-tetrafluoroethane, 1,1-dichloro-1-fluoroethane or 1,1,2-trichloro-1,2,2-trifluoroethane, hydrocarbons such as pentane, hexane or cyclohexane, and chlorohydrocarbons such as carbon tetrachloride, chloroform, methylene chloride or methyl chloride. One type or two or more types thereof can be used.

There are no particular limitations on the polymerization conditions, and the polymerization temperature is preferably 0° C. to 100° C. and more preferably 20° C. to 90° C. In general, a low temperature is preferable to avoid decreases in heat resistance attributable to the formation of ethylene-ethylene chains in the polymer. Although suitably determined corresponding to the type and amount of solvent used, vapor pressure, polymerization temperature and other polymerization conditions, polymerization pressure is preferably 0.1 MPa to 10 MPa and more preferably 0.5 MPa to 3 MPa. Polymerization time is preferably 1 hour to 30 hours.

In addition, although there are no particular limitations on the molecular weight of the fluorine-containing polymer (E), the polymer is preferably a solid at room temperature, and the polymer per se can be used as a thermoplastic resin or elastomer and the like. In addition, molecular weight is controlled by the concentration of monomer used in polymerization, concentration of the polymerization initiator, concentration of the chain transfer agent and temperature.

In the case the fluorine-containing polymer (E) is co-extruded with the aforementioned aliphatic polyamide (A), Polyamide 6 composition (B1), Polyamide 6/66/12 composition (B2), EVOH (C), semi-aromatic polyamide composition (D1), semi-aromatic polyamide composition (D2) and the like, in order to ensure adequate melt fluidity over a kneading temperature range and processing temperature range that do not cause significant deterioration thereof, the melt flow rate at a temperature 50° C. higher than the melting point of the fluorine-containing polymer (E) and at a load of 5 kg is preferably 0.5/10 minutes to 200 g/10 minutes and more preferably 1 g/10 minutes to 100 g/10 minutes.

In addition, the melting point and glass transition point of the fluorine-containing polymer (E) can be adjusted by selecting the type, composite ratio and so forth of the fluorine-containing monomer and other monomers.

Although the melting point of the fluorine-containing monomer (E) is suitably selected according to the purpose, application and usage method, in the case of co-extruding with the aforementioned aliphatic polyamide (A), Polyamide 6 composition (B1), Polyamide 6/66/12 composition (B2), EVOH (C), semi-aromatic polyamide composition (D1), semi-aromatic polyamide composition (D2) and the like, the melting point is preferably close to the processing temperature of the resin. Consequently, the melting point of the fluorine-containing polymer (E) is preferably optimized by suitably adjusting the ratios of the aforementioned fluorine-containing monomer, other monomers and functional group-containing monomer to be subsequently described. In particular, the melting point of the fluorine-containing polymer (E) is preferably 150° C. to 280° C. from the viewpoints of adequately ensuring heat-melting stability and continuous processability when co-extruding with the EVOH (C) and heat resistance, chemical resistance and chemical impermeability of the fluorine-containing polymer (E).

Here, melting point is defined as the temperature of the peak value of a melting curve measured by using a differential scanning calorimeter and heating a sample to a temperature equal to or higher than the predicted melting point, cooling the sample to 30° C. by lowering the temperature at the rate of 10° C. per minute and allowing to stand for 1 minute, and then raising the temperature at the rate of 10° C. per minute.

The fluorine-containing polymer (E) has a functional group having reactivity with an amino group within the molecular structure thereof, and the functional group may be contained in the molecular terminal, side chain or main chain of the fluorine-containing polymer (E). In addition, the functional group may be used alone in the fluorine-containing polymer (E) or two or more types of functional groups may be used in combination. The type and content of the functional group is suitably determined according to the type, shape and application of the counter material adhered to the fluorine-containing polymer (E), the required level of interlayer adhesion, adhesion method, functional group introduction method and the like.

Examples of functional groups having reactivity with an amino group include at least one type selected from the group consisting of a carboxyl group, acid anhydride group or carboxylate, sulfo group or sulfonate, epoxy group, cyano group, carbonate group and haloformyl group. Among these, at least one type selected from the group consisting of a carboxyl group, acid anhydride group or carboxylate, epoxy group, carbonate group and haloformyl group is preferable.

Examples of methods used to introduce the functional group having reactivity with an amino group into the fluorine-containing polymer (E) include: (i) a method of copolymerizing a copolymerizable monomer having a functional group when polymerizing the fluorine-containing polymer (E), (ii) a method of introducing a functional group into the molecular terminal of the fluorine-containing polymer (E) during polymerization by using a polymerization initiator or chain transfer agent and the like, and (iii) a method of grafting a compound having a functional group, which enables grafting of a functional group having reactivity (grafting compound), to the fluorine-containing polymer. These introduction methods may be used alone or may be suitably used in combination. In the case of considering interlayer adhesion in the multilayer tube, the fluorine-containing polymer (E) is preferably produced according to the aforementioned method (i) or (ii). The production methods proposed by Japanese Unexamined Patent Publication No. H7-18035, Japanese Unexamined Patent Publication No. H7-25952, Japanese Unexamined Patent Publication No. H7-25954, Japanese Unexamined Patent Publication No. H7-173230, Japanese Unexamined Patent Publication No. H7-173446, Japanese Unexamined Patent Publication No. H7-173447 and Japanese Unexamined Patent Publication No. H10-503236 should be referred to with respect to method (iii). The following provides an explanation of method (i) of copolymerizing a copolymerizable monomer having a functional group when polymerizing a fluorine-containing polymer, and method (ii) of introducing a functional group into the molecular terminal of a fluorine-containing polymer by using a polymerization initiator and the like.

In the method of copolymerizing a copolymerizable monomer having a functional group (to also be abbreviated as the functional group-containing monomer) when producing the fluorine-containing polymer (E), a functional group-containing monomer containing at least one type of functional group selected from the group consisting of a carboxyl group, acid anhydride group or carboxylate, hydroxyl group, sulfo group or sulfonate, epoxy group and cyano group is used for the polymerizing monomer. Examples of functional group-containing monomers include functional group-containing non-fluorine monomers and functional group-containing, fluorine-containing monomers.

Examples of functional group-containing non-fluorine monomers include unsaturated carboxylic acids and ester derivatives thereof such as acrylic acid, halogenated acrylic acids (excluding fluoroacrylic acid), methacrylic acid, halogenated methacrylic acid (excluding fluoromethacrylic acid), maleic acid, halogenated maleic acid (excluding fluoromaleic acid), fumaric acid, halogenated fumaric acid (excluding fluorofumaric acid), itaconic acid, citraconic acid, crotonic acid or endobicyclo-[2.2.1]-5-heptene-2,3-dicarboxylic acid, carboxyl group-containing monomers such as maleic anhydride, itaconic anhydride, succinic anhydride, citraconic anhydride or endobicyclo-[2.2.1]-5-heptene-2,3-dicarboxylic anhydride, and epoxy group-containing monomers such as glycidyl acrylate, glycidyl methacrylate or glycidyl ether. One type or two or more types thereof can be used. The functional group-containing non-fluorine monomer is determined in consideration of copolymerization reactivity with the fluorine-containing monomer used. Selection of a suitable functional group-containing non-fluorine monomer allows polymerization to proceed favorably and facilitates uniform introduction of the functional group-containing non-fluorine monomer into the main chain, and as a result thereof, offers the advantage of being able to reduce the levels of unreacted monomer and impurities.

Examples of functional group-containing, fluorine-containing monomers include unsaturated compounds represented by the general formula $CX^3=CX^4-(R^7)_nY$ (wherein, Y represents a functional group selected from the group consisting of —COOM (wherein, M represents a hydrogen atom or alkaline metal), carboxyl group-derived group, —$SO_3M$ (wherein, M represents a hydrogen atom or alkaline metal), sulfonic acid-derived group, epoxy group and —CN, $X^3$ and $X^4$ may be the same or different and represent hydrogen atoms or fluorine atoms (provided that in the case $X^3$ and $X^4$ are both hydrogen atoms, n=1 and $R^1$ includes a fluorine atom), and $R^7$ represents an alkylene group having 1 to 40 carbon atoms, fluorine-containing oxyalkylene group having 1 to 40 carbon atoms, fluorine-containing alkylene group having 1 to 40 carbon atoms and having an ether bond, or fluorine-containing oxyalkylene group having 1 to 40 carbon atoms and having an ether bond, and n is 0 or 1).

Examples of carboxyl group-derived groups represented by Y in the aforementioned general formula include groups represented by the general formula —C(=O)$Q^1$ (wherein, $Q^1$ represents —$OR^8$, —$NH_2$, F, Cl, Br or I, and $R^8$ represents an alkyl group having 1 to 20 carbon atoms or an aryl group having 6 to 22 carbon atoms).

Examples of sulfonic acid-derived groups represented by Y in the aforementioned general formula include groups represented by the general formula —$SO_2Q^2$ (wherein, $Q^2$ represents —$OR^9$, —$NH_2$, F, Cl, Br or I, and $R^9$ represents an alkyl group having 1 to 20 carbon atoms or an aryl group having 6 to 22 carbon atoms).

The aforementioned Y preferably represents —COOH, —$SO_3H$, —$SO_3Na$, —$SO_2F$ or —CN.

Examples of functional group-containing, fluorine-containing monomers in the case, for example, the functional group has a carbonyl group, include perfluoroacrylic acid fluoride, 1-fluoroacrylic acid fluoride, acrylic acid fluoride, 1-trifluoromethacrylic acid fluoride and perfluorobutenoic acid. One type or two or more types thereof can be used.

The content of the functional group-containing monomer in the fluorine-containing polymer (E) is preferably 0.05 mol % to 20 mol %, more preferably 0.05 mol % to 10 mol %, and even more preferably 0.1 mol % to 5 mol % from the viewpoints of ensuring adequate interlayer adhesion, ensuring adequate heat resistance without inviting a decrease in interlayer adhesion attributable to usage and environmental conditions, and preventing the occurrence of defective adhesion, coloring and foaming when processing at high temperatures as well as the occurrence of separation, coloring, foaming and elution attributable to decomposition during use at high temperatures. If the content of the functional group-containing monomer is within the aforementioned ranges, there are no decreases in the polymerization rate during production and the fluorine-containing polymer (E) demonstrates superior adhesion to a counter material to be laminated. There are no particular limitations on the method used to add the functional group-containing monomer, and it may be added all at once at the start of polymerization or may be added continuously during the course of polymerization. Although the addition method is suitably selected according to the decomposition reactivity of the polymerization initiator and the polymerization temperature, during polymerization, the amount of functional group-containing monomer that is consumed is preferably supplied to the polymerization tank either continuously or intermittently as the amount thereof is consumed by polymerization to maintain the concentration of the functional group-containing monomer within this range.

In addition, as long as the aforementioned contents are satisfied, the fluorine-group containing polymer may be a mixture of a fluorine-containing polymer having a functional group introduced therein and a fluorine-containing polymer not having a functional group introduced therein.

In the method (ii) of introducing a functional group into the molecular terminal of a fluorine-containing polymer by using a polymerization initiator and the like, the functional group is introduced into one terminal or both terminals of the molecular chain of the fluorine-containing polymer. The functional group introduced into the terminal is preferably a carbonate group or haloformyl group.

The carbonate group introduced as a terminal group of the fluorine-containing polymer (E) is typically a group having a —OC(=O)O— bond, and specific examples thereof include those having the structure of an —OC(=O)O—$R^{10}$ group (wherein, $R^{10}$ represents a hydrogen group, organic group (such as an alkyl group having 1 to 20 carbon atoms or alkyl group having 2 to 20 carbon atoms and an ether bond), or an element of group I, II or VII of the periodic table), such as —OC(=O)$OCH_3$, —OC(=O)$OC_3H_7$, —OC(=O)$OO_8H_{17}$ or —OC(=O)$OCH_2CH_2OCH_2CH_3$. The haloformyl group specifically has a structure represented by —COZ (wherein, Z represents a halogen atom), and examples thereof include —COF and —COCl. One type or two or more types thereof can be used.

In addition, although various methods using a polymerization initiator or chain transfer agent can be employed to introduce a carbonate group onto the molecular terminal of a polymer, a method using a peroxide, and particularly a peroxycarbonate or peroxyester, as a polymerization initiator can be used preferably from the viewpoint of performance in terms of economy, heat resistance, chemical resistance and the like. According to this method, a carbonyl group derived from a peroxide, a carbonate group derived from peroxycarbonate, an ester group derived from peroxyester, or a haloformyl group obtained by converting these functional groups can be introduced onto the polymer terminal. Among these polymerization initiators, the use of peroxycarbonate is more preferable since it allows the polymerization temperature to be lowered and the initiation reaction is not accompanied by side reactions.

Although various methods can be employed to introduce a haloformyl group onto the molecular terminal of a polymer, a haloformyl group can be introduced, for example, by heating the carbonate group of a fluorine-containing polymer having a carbonate group on a terminal thereof as previously described to cause the carbonate group to undergo thermal decomposition (decarboxylation).

Examples of peroxycarbonates include diisopropyl peroxycarbonate, di-n-propyl peroxycarbonate, t-butyl peroxyisopropyl carbonate, t-butyl peroxymethacryloyloxyethyl carbonate, bis(4-t-butylcyclohexyl) peroxycarbonate and di-2-ethylhexyl peroxycarbonate. One type or two or more types thereof can be used.

Although varying according to the type (composition, etc.) and molecular weight of the target polymer, polymerization conditions and type of initiator used, the amount of peroxycarbonate used is preferably 0.05 part by mass to 20 parts by mass and more preferably 0.1 part by mass to 10 parts by mass based on 100 parts by mass of all polymers obtained by polymerization from the viewpoints of properly controlling the polymerization rate and ensuring an adequate polymerization rate. The content of the carbonate group on a molecular terminal of the polymer can be controlled by adjusting polymerization conditions. There are no particular limitations on the method used to add the polymerization initiator, and it may be added all at once at the start of polymerization or may be added continuously during the course of polymerization. The addition method is suitably selected according to the decomposition reactivity of the polymerization initiator and the polymerization temperature.

The number of terminal functional groups per $10^6$ main chain carbon atoms in the fluorine-containing polymer (E) is preferably 150 to 3,000, more preferably 200 to 2,000 and even more preferably 300 to 1,000 from the viewpoints of ensuring adequate interlayer adhesion, ensuring adequate heat resistance without inviting a decrease in interlayer adhesion attributable to usage and environmental conditions, and preventing the occurrence of defective adhesion, coloring and foaming when processing at high temperatures as well as the occurrence of separation, coloring, foaming and elution attributable to decomposition during use at high temperatures. In addition, as long as the aforementioned number of functional groups is satisfied, the fluorine-containing polymer may be a mixture of a fluorine-containing polymer having a functional group introduced therein and a fluorine-containing polymer not having a functional group introduced therein.

As has been described above, the fluorine-containing polymer (E) is a fluorine-containing polymer that is introduced with a functional group having reactivity with an amino group. As previously described, the fluorine-containing polymer (E) introduced with a functional group per se is able to maintain superior properties unique to fluorine-containing polymers such as heat resistance, water resistance, low friction, chemical resistance, weather resistance, antifouling or chemical impermeability, and is also advantageous in terms of productivity and cost.

Moreover, as a result of containing a functional group having reactivity with an amino group in the molecular chain thereof, superior interlayer adhesion with various other materials for which interlayer adhesion was inadequate or impossible can be imparted directly to a multilayer tube without having to carry out surface treatment or other special treatment and without having to coat with an adhesive resin and the like.

Various fillers such as inorganic fillers, glass fibers, carbon fibers, metal oxide or carbon can be added to the fluorine-containing polymer (E) corresponding to the purpose or application within a range that does not impair the performance thereof. In addition, pigment, ultraviolet absorber and other optional additives can be mixed in addition to filler. Other resins such as fluorine-based resins or thermoplastic resins or synthetic rubber and the like can also be added in addition to these additives, thereby making it possible to improve mechanical properties, improve weather resistance, impart design properties, prevent static electricity or improve processability and the like.

[Multilayer Tube]

A first aspect of the multilayer tube comprises at least four layers, having a layer (a) containing the aliphatic polyamide (A), a layer (b) containing the Polyamide 6 composition (B1) and/or the Polyamide 6/66/12 composition (B2), a layer (c) containing the EVOH (C), and a layer (d) containing the semi-aromatic polyamide composition (D1) or the semi-aromatic polyamide composition (D2).

In the multilayer tube of the first aspect, it is essential to contain the layer (c) containing the EVOH (C) and the layer (d) containing the semi-aromatic polyamide composition (D1) or the semi-aromatic polyamide composition (D2) since this results in favorable chemical impermeability, and particularly hydrocarbon impermeability, of the multilayer tube.

In a preferable embodiment, layer (a) containing the aliphatic polyamide (A) is arranged as the outermost layer of the multilayer tube. A multilayer tube having superior chemical resistance and flexibility can be obtained by arranging layer (a) containing the aliphatic polyamide (A) in the outermost layer. In addition, layer (c) containing EVOH (C) is arranged between layer (a) containing the aliphatic polyamide (A) and layer (d) containing the semi-aromatic polyamide composition (D1) or the semi-aromatic polyamide composition (D2). As a result of arranging layer (d) containing the semi-aromatic polyamide composition (D1) or the semi-aromatic polyamide composition (D2) in the innermost layer, in addition to being able to obtain a multilayer tube having superior deteriorated fuel resistance, elution of low molecular weight components such as monomers or oligomers attributable to contact with alcohol-containing gasoline can be inhibited. Namely, a multilayer tube in which layer (a) is arranged in the outermost layer and layer (c) is arranged between layer (a) and layer (d) is preferable.

In a more preferable embodiment, layer (b) containing the Polyamide 6 composition (B1) and/or the Polyamide 6/66/12 composition (B2) is arranged on at least one side adjacent to layer (c) containing EVOH (C). As a result of arranging layer (b) containing the Polyamide 6 composition (B1) and/or the Polyamide 6/66/12 composition (B2) on at least one side adjacent to layer (c) containing EVOH (C), superior interlayer adhesion can be obtained, and in the case of co-extruding with EVOH (C) and the semi-aromatic polyamide composition (D1) or semi-aromatic polyamide composition (D2), adequate processing stability can be ensured over a wide processing temperature range. Namely, a multilayer tube in which layer (b) is arranged on at least one side adjacent to layer (c) is more preferable.

In addition, in the multilayer tube of the first aspect, if the semi-aromatic polyamide composition (D1) or semi-aromatic polyamide composition (D2) containing an electrically conductive filler is arranged in the innermost layer of the multilayer tube, together with demonstrating superior chemical impermeability, deteriorated fuel resistance and monomer and oligomer elution resistance, in the case of using as a fuel line tube, ignition of fuel by sparks generated by internal friction or friction with the tube wall by fuel circulating through the line can be prevented. At that time, by arranging a layer containing a semi-aromatic polyamide not having electrical conductivity to the outside of the aforementioned electrically conductive layer, both low-temperature impact resistance and electrical conductivity can be realized, thereby making this economically advantageous.

Electrical conductivity refers to having electrical properties such that, although there is the possibility of ignition due to accumulation of static electricity in the case of a flammable liquid such as gasoline continuously contacting an insulator in the form of a resin, this static electricity is not allowed to accumulate. As a result, explosions attributable to static electricity generated during transport of a liquid such as fuel can be prevented.

The electrically conductive filler includes all fillers added for the purpose of imparting a resin with electrical conductivity, and examples thereof include granular, flake-like and fibrous fillers.

Examples of granular fillers include carbon black and graphite. Examples of flake-like fillers include aluminum flakes, nickel flakes and nickel-coated mica. In addition, examples of fibrous fillers include metal fibers such as carbon fibers, carbon-coated ceramic fibers, carbon whiskers, carbon nanotubes, aluminum fibers, copper fibers, bronze fibers or stainless steel fibers. One type or two or more types thereof can be used. Among these, carbon nanotubes and carbon black are preferable.

Carbon nanotubes are referred to as hollow carbon fibrils, these fibrils have an outer region, composed of a large number of essentially continuous layers of regularly arranged carbon atoms, and an inner hollow region, and are essentially cylindrical fibrils in which each layer and the hollow region are arranged essentially concentrically arranged around the cylindrical axis of the fibril. Moreover, the regularly arranged carbon atoms of the aforementioned outer region are preferably graphitic, and the diameter of the aforementioned hollow region is preferably 2 nm to 20 nm. The outer diameter of carbon nanotubes is preferably 3.5 nm to 70 nm and more preferably 4 nm to 60 nm from the viewpoints of imparting adequate dispersibility in resin and favorable electrical conductivity to the resulting resin molded product. The aspect ratio (referred to as the ratio of length to outer diameter) of the carbon nanotubes is preferably 5 or more, more preferably 100 or more and even more preferably 500 or more. As a result of satisfying the aspect ratio, an electrically conductive network is easily formed and superior electrical conductivity can be demonstrated while adding only a small amount of carbon nanotubes.

The carbon black includes all carbon black commonly used to impart electrical conductivity, and preferable examples of carbon black include, but are not limited to, acetylene black obtained by incomplete combustion of acetylene gas, furnace black such as Ketjen black produced by incomplete furnace combustion when using crude oil as raw material, oil black, naphthalene black, thermal black, lamp black, channel black, roll black and disk black. Among these, acetylene black and furnace black are preferable.

In addition, various types of carbon powder are produced from carbon black that have different properties such as particle diameter, surface area, DBP oil absorption or ash content. Although there are no particular limitations on the properties of the carbon black, that having a favorable linear structure and large cohesive density is preferable. The incorporation of a large amount of carbon black is not preferable from the viewpoint of impact resistance, and the average particle diameter is preferably 500 nm or less, more preferably 5 nm to 100 nm and even more preferably 10 nm to 70 nm from the viewpoint of obtaining superior electrical conductivity with a smaller amount of carbon black, while surface area (as determined by the BET method) is preferably 10 $m^2/g$ or more, more preferably 30 $m^2/g$ or more and even more preferably 50 $m^2/g$ or more, and DBP (dibutyl phthalate) oil absorption is preferably 50 ml/100 g or more, more preferably 100 ml/100 g or more and even more preferably 150 ml/100 g or more. In addition, the ash content is preferably 0.5% by mass or less and more preferably 0.3% by mass or less. DBP oil absorption as referred to here is the value measured using the method defined in ASTM D-2414. In addition, the volatile matter content of carbon black is preferably less than 1.0% by mass.

These electrically conductive fillers may be subjected to surface treatment with a titanate-based, aluminum-based or silane-based surface treatment agent. In addition, granulated electrically conductive filler can also be used in order to improve melt-kneading workability.

Although unable to be uniformly defined as a result of varying according to the type of electrically conductive filler used, the content of the electrically conductive filler is typically preferably 3 parts by mass to 30 parts by mass based on 100 parts of the semi-aromatic polyamide (d1) or semi-aromatic polyamide (d2) from the viewpoint of a proper balance among electrical conductivity, fluidity, mechanical strength and the like.

In addition, the surface specific resistance of a melt extrusion product of the electrically conductive filler is preferably $10^8$ Ω/square or less and more preferably $10^6$ Ω/square or less from the viewpoint of obtaining adequate antistatic performance. However, addition of the aforementioned electrically conductive filler easily invites decreases in strength and fluidity. Consequently, the content of the aforementioned electrically conductive filler is made to be as low as possible provided the target level of electrical conductivity is obtained.

In the multilayer tube of the first aspect, although there are no particular limitations on the thickness of each layer, and can be adjusted corresponding to the type of polymer that composes each layer and the number of layers and application and so forth of the entire multilayer tube, the thickness of each layer is determined in consideration of properties such as chemical impermeability, low-temperature impact resistance and flexibility of the multilayer tube. In general, the thickness of layer (a), layer (b), layer (c) and layer (d) is respectively 3% to 90% of the total thickness of the multilayer tube. The thicknesses of layer (c) and layer (d) are respectively more preferably 5% to 50%, and even more preferably 7% to 30%, of the total thickness of the multilayer tube in consideration of a proper balance between low-temperature impact resistance and chemical impermeability.

There are no particular limitations on the total number of layers of the multilayer tube of the first aspect provided it comprises at least four layers, having layer (a) containing the aliphatic polyamide (A), layer (b) containing the Polyamide 6 composition (B1) and/or Polyamide 6/66/12 composition (B2), layer (c) containing EVOH (C), and layer (d) containing the semi-aromatic polyamide composition (D1) or the semi-aromatic polyamide composition (D2). Moreover, in addition to the layer (a), layer (b), layer (c) and layer (d), the multilayer tube of the first aspect may also have one layer or two or more layers comprising other thermoplastic resins to obtain a multilayer tube that impart additional functions or is economically advantageous. Although the number of layers of the multilayer tube of the first aspect is four or more, the number of layers is preferably 8 or less and more preferably 5 to 7 judging from the mechanism of tube production devices.

A second aspect of the multilayer tube comprises at least five layers, having a layer (a) containing the aliphatic polyamide (A), layer (b) containing the Polyamide 6 composition (B1) and/or the Polyamide 6/66/12 composition (B2), layer (c) containing EVOH (C), layer (d) containing the semi-aromatic polyamide composition (D1) or the semi-aromatic polyamide composition (D2), and a layer (e) containing the fluorine-containing polymer (E).

In the multilayer tube of the second aspect, it is essential that the multilayer tube be comprised of the layer (c) containing EVOH (C) and the layer (d) containing the semi-aromatic polyamide composition (D1) or the semi-aromatic polyamide composition (D2) since this results in favorable chemical impermeability, and particularly hydrocarbon impermeability, of the multilayer tube. In addition, it is also essential that the multilayer tube comprises the layer (e) containing the fluorine-containing polymer (E) since this results in favorable alcohol impermeability of the multilayer tube. Resistance to permeation of highly concentrated, alcohol-containing gasoline in particular is superior as a result of comprising the layer (e).

In a preferable embodiment, the layer (a) containing the aliphatic polyamide (A) is arranged in the outermost layer of the multilayer tube. A multilayer tube having superior chemical resistance and flexibility can be obtained by arranging the layer (a) containing the aliphatic polyamide (A) in the outermost layer. In addition, the layer (c) containing EVOH (C) and the layer (d) containing the semi-aromatic polyamide composition (D1) or the semi-aromatic polyamide composition (D2) are arranged between the layer (a) containing the aliphatic polyamide (A) and the layer (e) containing the fluorine-containing polymer (E). In addition to allowing the obtaining of a multilayer tube having superior deteriorated fuel resistance, the elution of low molecular weight components such as monomers or oligomers attributable to contact with alcohol-containing gasoline can be inhibited by arranging the layer (e) containing the fluorine-containing polymer (E) in the innermost layer. Namely, a preferable multilayer tube has the layer (a) arranged in the outermost layer and the layers (c) and (d) arranged between the layers (a) and (e).

In a more preferable embodiment, the layer (b) containing the Polyamide 6 composition (B1) and/or the Polyamide 6/66/12 composition (B2) is arranged on at least one side adjacent to the layer (c) containing the EVOH (C). Superior interlayer adhesion can be obtained by arranging the layer (b) containing the Polyamide 6 composition (B1) and/or the Polyamide 6/66/12 composition (B2) on at least one side adjacent to the layer (c) containing the EVOH (C), and in the case of co-extruding with the EVOH (C), semi-aromatic polyamide composition (D1) or semi-aromatic polyamide composition (D2) and the fluorine-containing polymer (E), adequate processing stability can be ensured over a wide processing temperature range. Namely, the multilayer tube more preferably has the layer (b) arranged on at least one side adjacent to the layer (c).

In addition, in a multilayer tube of the second aspect, in addition to enabling superior chemical impermeability, deteriorated fuel resistance and resistance to elution of monomers or oligomers and the like by arranging an electrically conductive layer comprising a fluorine-containing polymer composition containing an electrically conductive filler in the innermost layer of the multilayer tube, in the case using the multilayer tube as a fuel line tube, ignition of fuel caused by sparking occurring due to internal friction of the fuel circulating through the line or friction with the tube wall can be prevented. At that time, as a result of a layer containing a thermoplastic resin not having electrical conductivity being arranged to the outside of the aforementioned electrically conductive layer, both low-temperature impact resistance and electrical conductivity can be realized, while also being economically advantageous. Moreover, the fluorine-containing polymer referred to here includes the fluorine-containing polymer (E) having a functional group in the molecular chain thereof, while also referring to fluorine-containing polymers not having a functional group to be subsequently described.

Details regarding electrical conductivity and electrically conductive filler are the same as those of the multilayer tube of the first aspect.

Although unable to be uniformly defined as a result of varying according to the type of electrically conductive filler used, the content of the electrically conductive filler is typically preferably 3 parts by mass to 30 parts by mass based on 100 parts of fluorine-containing polymer from the viewpoint of a proper balance among electrical conductivity, fluidity, mechanical strength and the like.

In addition, the surface specific resistance of a melt extrusion product of the electrically conductive filler is preferably $10^8$ Ω/square or less and more preferably $10^6$ Ω/square or less from the viewpoint of obtaining adequate antistatic performance. However, addition of the aforementioned electrically conductive filler easily invites decreases in strength and fluidity. Consequently, the content of the aforementioned electrically conductive filler is preferably made to be as low as possible provided the target level of electrical conductivity is obtained.

In the multilayer tube of the second aspect, although there are no particular limitations on the thickness of each layer, and can be adjusted corresponding to the type of polymer that composes each layer and the number of layers and application and so forth of the entire multilayer tube, the thickness of each layer is determined in consideration of properties such as chemical impermeability, low-temperature impact resistance and flexibility of the multilayer tube. In general, the thickness of layer (a), layer (b), layer (c), layer (d) and layer (e) is respectively 3% to 90% of the total thickness of the multilayer tube. The thicknesses of layer (c), layer (d) and layer (e) are respectively more preferably 5% to 50%, and even more preferably 7% to 30%, of the total thickness of the multilayer tube in consideration of a proper balance between low-temperature impact resistance and chemical impermeability.

There are no particular limitations on the total number of layers of the multilayer tube of the second aspect provided it comprises at least five layers, having layer (a) containing the aliphatic polyamide (A), layer (b) containing the Polyamide 6 composition (B1) and/or Polyamide 6/66/12 composition (B2), layer (c) containing EVOH (C), layer (d) containing the semi-aromatic polyamide composition (D1) or the semi-aromatic polyamide composition (D2), and layer (e) containing the fluorine-containing polymer (E). Moreover, in addition to the fiver layers consisting of layer (a), layer (b), layer (c), layer (d) and layer (e), the multilayer tube of the second aspect may also have one layer or two or more layers comprising other thermoplastic resins to obtain a multilayer tube that impart additional functions or is economically advantageous. Although the number of layers of the multilayer tube of the second aspect is five or more, the number of layers is preferably 8 or less and more preferably 6 to 7 judging from the mechanism of tube production devices.

Examples of other thermoplastic resins in addition to aliphatic polyamide (A), semi-aromatic polyamide (d1) and semi-aromatic polyamide (d2) in the multilayer tubes of the first aspect and second aspect include poly(meta-xylylene adipamide) (Polyamide MXD6), poly(meta-xylylene terephthalamide) (Polyamide MXDT), poly(meta-xylylene isophthalamide) (Polyamide MXDI), poly(meta-xylylene hexahydroterephthalamide) (Polyamide MXDT(H)), poly (meta-xylylene naphthalamide) (Polyamide MXDN), poly (para-xylylene adipamide) (Polyamide PXD6), poly(para-xylylene terephthalamide) (Polyamide PXDT), poly(para-xylylene isophthalamide) (Polyamide PXDI), poly(para-xylylene hexahydroterephthalamide) (Polyamide PXDT (H)), poly(para-xylylene naphthalamide) (Polyamide PXDN), poly(para-phenylene terephthalamide) (Polyamide PPTA), poly(para-phenylene isophthalamide) (Polyamide PPIA), poly(meta-phenylene terephthalamide) (Polyamide PMTA), poly(meta-phenylene isophthalamide) (Polyamide PMIA), poly(2,6-naphthalenedimethylene adipamide) (Polyamide 2,6-BAN6), poly(2,6-naphthalenedimethylene terephthalamide) (Polyamide 2,6-BANT), poly(2,6-naphthalenedimethylene isophthalamide) (Polyamide 2,6-BANI), poly(2,6-naphthalenedimethylene hexahydroterephthalamide) (Polyamide 2,6-BANT(H)), poly(2,6-naphthalenedimethylene naphthalamide) (Polyamide 2,6-BANN), poly(1,3-cyclohexanedimethylene adipamide) (Polyamide 1,3-BAC6), poly(1,3-cyclohexanedimethylene suberamide) (Polyamide 1,3-BAC8), poly(1,3-cyclohexanedimethylene azelamide) (Polyamide 1,3-BAC9), poly(1,3-cyclohexanedimethylene sebacamide) (Polyamide 1,3-BAC10), poly(1,3-cyclohexanedimethylene dodecamide) (Polyamide 1,3-BAC12), poly(1,3-cyclohexanedimethylene terephthalamide) (Polyamide 1,3-BACT), poly(1,3-cyclohexanedimethylene isophthalamide) (Polyamide 1,3-BALI), poly(1,3-cyclohexanedimethylene hexahydroterephthalamide) (Polyamide 1,3-BACT(H)), poly(1,3-cyclohexanedimethylene naphthalamide) (Polyamide 1,3-BACN), poly(1,4-cyclohexanedimethylene adipamide) (Polyamide 1,4-BAC6), poly(1,4-cyclohexanedimethylene suberamide) (Polyamide 1,4-BAC8), poly(1,4-cyclohexanedimethylene azelamide) (Polyamide 1,4-BAC9), poly(1,4-cyclohexanedimethylene sebacamide) (Polyamide 1,4-BAC10), poly(1,4-cyclohexanedimethylene dodecamide) (Polyamide 1,4-BAC12), poly(1,4-cyclohexanedimethylene terephthalamide) (Polyamide 1,4-BACT), poly(1,4-cyclohexanedimethylene isophthalamide) (Polyamide 1,4-BACI), poly(1,4-cyclohexanedimethylene hexahydroterephthalamide) (Polyamide 1,4-BACT(H)), poly(1,4-cyclohexanedimethylene naphthalamide) (Polyamide 1,4-BACN), poly(4,4'-methylenebiscyclohexylene adipamide) (Polyamide PACM6), poly(4,4'-methylenebiscyclohexylene suberamide) (Polyamide PACM8), poly(4,4'-methylenebiscyclohexylene azelamide) (Polyamide PACM9), poly(4,4'-methylenebiscyclohexylene sebacamide) (Polyamide PACM10), poly(4,4'-methylenebiscyclohexylene dodecamide) (Polyamide PACM12), poly(4,4'-methylenebiscyclohexylene tetradecamide) (Polyamide PACM14), poly(4,4'-methylenebiscyclohexylene hexadecamide) (Polyamide PACM16), poly(4,4'-methylenebiscyclohexylene octadecamide) (Polyamide PACM18), poly(4,4'-methylenebiscyclohexylene terephthalamide) (Polyamide PACMT), poly(4,4'-methylenebiscyclohexylene isophthalamide) (Polyamide PACMI), poly(4,4'-methylenebiscyclohexylene hexahydroterephthalamide) (Polyamide PACMT(H)), poly(4,4'-methylenebiscyclohexylene naphthalamide) (Polyamide PACMN), poly(4,4'-methylenebis(2-methyl-cyclohexylene) adipamide) (Polyamide MACM6), poly(4,4'-methylenebis(2-methyl-cyclohexylene) suberamide) (Polyamide MACM8), poly(4,4'-methylenebis(2-methyl-cyclohexylene) azelamide) (Polyamide MACM9), poly(4,4'-methylenebis(2-methyl-cyclohexylene) sebacamide) (Polyamide MACM10), poly(4,4'-methylenebis(2-methyl-cyclohexylene) dodecamide) (Polyamide MACM12), poly(4,4'-methylenebis(2-methyl-cyclohexylene) tetradecamide) (Polyamide MACM14), poly(4,4'-methylenebis(2-methyl-cyclohexylene) hexadecamide) (Polyamide MACM16), poly(4,4'-methylenebis(2-methyl-cyclohexylene) octadecamide) (Polyamide MACM18), poly(4,4'-methylenebis(2-methyl-cyclohexylene) terephthalamide) (Polyamide MACMT), poly(4,4'-methylenebis(2-methyl-cyclohexylene) isophthalamide) (Polyamide MACMI), poly(4,4'-methylenebis(2-methyl-cyclohexylene) hexahydroterephthalamide) (Polyamide MACMT(H)), poly(4,4'-methylenebis(2-methyl-cyclohexylene) naphthalamide) (Polyamide MACMN), poly(4,4'-propylenebiscyclohexylene adipamide) (Polyamide PACP6), poly(4,4'-propylenebiscyclohexylene suberamide) (Polyamide PACP8), poly(4,4'-propylenebiscyclohexylene azelamide) (Polyamide PACP9), poly(4,4'-propylenebiscyclohexylene sebacamide) (Polyamide PACP10), poly(4,4'-propylenebiscyclohexylene dodecamide) (Polyamide PACP12), poly(4,4'-propylenebiscyclohexylene tetradecamide) (Polyamide PACP14), poly(4,4'-propylenebiscyclohexylene hexadecamide) (Polyamide PACP16), poly(4,4'-propylenebiscyclohexylene octadecamide) (Polyamide PACP18), poly(4,4'-propylenebiscyclohexylene terephthalamide) (Polyamide PACPT), poly(4,4'-propylenebiscyclohexylene isophthalamide) (Polyamide PACPI), poly(4,4'-propylenebiscyclohexylene hexahydroterephthalamide) (Polyamide PACPT(H)), poly(4,4'-propylenebiscyclohexylene naphthalamide) (Polyamide PACPN), poly(isophorone adipamide) (Polyamide IPD6), poly(isophorone suberamide) (Polyamide IPD8), poly(isophorone azelamide) (Polyamide IPD9), poly(isophorone sebacamide) (Polyamide IPD10), poly(isophorone dodecamide) (Polyamide IPD12), poly(isophorone terephthalamide) (Polyamide IPDT), poly(isophorone isophthalamide) (Polyamide IPDI), poly(isophorone hexahydroterephthalamide) (Polyamide IPDT(H)), poly(isophorone naphthalamide) (Polyamide IPDN), poly(tetramethylene terephthalamide) (Polyamide 4T), poly(tetramethylene isophthalamide) (Polyamide 4I), poly(tetramethylene hexahydroterephthalamide) (Polyamide (4T(H)), poly(tetramethylene naphthalamide) (Polyamide 4N), poly(pentamethylene terephthalamide) (Polyamide 5T), poly(pentamethylene isophthalamide) (Polyamide 5I), poly(pentamethylene hexahydroterephthalamide) (Polyamide 5T(H)), poly(pentamethylene naphthalamide) (Polyamide 5N), poly(hexamethylene terephthalamide) (Polyamide 6T), poly(hexamethylene isophthalamide) (Polyamide 6I), poly(hexamethylene hexahydroterephthalamide) (Polyamide 6T(H)), poly(hexamethylene naphthalamide (Polyamide 6N), poly(2-methylpentamethylene terephthalamide) (Polyamide MST), poly(2-methylpentamethylene isophthalamide) (Polyamide M5I), poly(2-methylpentamethylene hexahydroterephthalamide) (Polyamide M5T(H)), poly(2-methylpentamethylene naphthalamide) (Polyamide M5N), poly(nonamethylene hexahydroterephthalamide (Polyamide 9T(H)), poly(2-methyloctamethylene hexahydroterephthalamide) (Polyamide M8T(H)), poly(trimethylhexamethylene isophthalamide) (Polyamide TMHI), poly(trimethylhexamethylene hexahydroterephthalamide) (Polyamide TMHT(H)), poly(decamethylene isophthalamide) (Polyamide 10I), poly(decamethylene hexahydroterephthalamide) (Polyamide 10T(H)), poly(undecamethylene isophthalamide (Polyamide 11I), poly(undecamethylene hexahydroterephthalamide (Polyamide 11T(H)), poly(dodecamethylene isophthalamide) (Polyamide 12I), poly(dodecamethylene hexahydroterephthalamide) (Polyamide 12T(H)), and copolymers using a plurality of types of raw material monomers of these polyamides and/or raw material monomers of the aforementioned aliphatic polyamide (A).

In addition, examples include fluorine-containing polymers not containing a functional group having reactivity with an amino group such as polyvinylidene fluoride (PVDF), polyvinyl fluoride (PVF), polytetrafluoroethylene (PTFE), polychlorotrifluoroethylene (PCTFE), tetrafluoroethylene-perfluoro(alkylvinylether) copolymer (PFA), tetrafluoroethylene-hexafluoropropylene copolymer (FEP), tetrafluoroethylene-perfluoro(alkylvinylether)-hexafluoropropylene copolymer, ethylene-tetrafluoroethylene copolymer (ETFE), ethylene-tetrafluoroethylene-hexafluoropropylene copolymer (EFEP), vinylidene fluoride-tetrafluoroethylene copolymer, vinylidene fluoride-hexafluoropropylene copolymer, vinylidene fluoride-perfluoro(alkylvinyl ether) copolymer, tetrafluoroethylene-hexafluoropropylene-vinylidene fluoride copolymer (THV), vinylidene fluoride-perfluoro(alkylvinylether)-tetrafluoroethylene copolymer, tetrafluoroethylene-hexafluoropropylene-vinylidene fluoride-perfluoro(alkylvinyl ether) copolymer, ethylene-chlorotrifluoroethylene copolymer (ECTFE), chlorotrifluoroethylene-tetrafluoroethylene copolymer, vinylidene fluoride-chlorotrifluoro ethylene copolymer, chlorotrifluoroethylene-perfluoro(alkylvinylether) copolymer, chlorotrifluoroethylene-hexafluoropropylene copolymer, chlorotrifluoroethylene-tetrafluoroethylene-hexafluoropropylene copolymer, chlorotrifluoroethylene-tetrafluoroethylene-vinylidene fluoride copolymer, chlorotrifluoroethylene-perfluoro(alkylvinylether)-tetrafluoroethylene copolymer (CPT), chlorotrifluoroethylene-perfluoro(alkylvinylether)-hexafluoropropylene copolymer, chlorotrifluoroethylene-tetrafluoroethylene-hexafluoropropylene-perfluoro(alkylvinylether) copolymer, chlorotrifluoroethylene-tetrafluoroethylene-vinylidene fluoride-perfluoro(alkylvinylether) copolymer, chlorotrifluoroethylene-tetrafluoroethylene-vinylidene fluoride-hexafluoropropylene copolymer, and chlorotrifluoroethylene-tetrafluoroethylene-vinylidene fluoride-perfluoro(alkylvinylether)-hexafluoropropylene copolymer.

In the case the multilayer tube has layer (e) containing the fluorine-containing polymer (E) containing the aforementioned functional group having reactivity with an amino group, arranging a layer comprising a fluorine-containing polymer not containing a functional group to the inside of the layer (e) makes it possible to realize low-temperature impact resistance, chemical impermeability and resistance to cracking caused by environmental stress, while also being economically advantageous. Furthermore, the fluorine-containing polymer (E) having a functional group having reactivity with an amino group introduced into the molecular chain thereof is not contained in layers other than layer (e).

Moreover, additional examples include polyolefin-based resins such as high-density polyethylene (HDPE), medium-density polyethylene (MDPE), low-density polyethylene (LDPE), linear low-density polyethylene (LLDPE), ultra-high-molecular weight polyethylene (UHMWPE), polypropylene (PP), polybutene (PB), polymethylpentene (TPX), ethylene-propylene copolymer (EPR), ethylene-butene copolymer (EBR), ethylene-vinyl acetate copolymer (EVA), ethylene-acrylic acid copolymer (EAA), ethylene-methacrylic acid copolymer (EMAA), ethylene-methyl acrylate copolymer (EMA), ethylene-methyl methacrylate copolymer (EMMA) or ethylene-ethyl acrylate copolymer (EEA), polystyrene-based resins such as polystyrene (PS), syndiotactic polystyrene (SPS), methyl methacrylate-styrene copolymer (MS), methyl methacrylate-styrene-butadiene copolymer (MBS), styrene-butadiene copolymer (SBR), styrene-isoprene copolymer (SIR), styrene-isoprene-butadiene copolymer (SIBR), styrene-butadiene-styrene copolymer (SBS), styrene-isoprene-styrene copolymer (SIS), styrene-ethylene-butylene-styrene copolymer (SEBS) or styrene-ethylene-propylene-styrene copolymer (SEPS), the aforementioned polyolefin-based resins and polystyrene-based resins containing a functional group such as carboxyl groups and metal salts thereof (Na, Zn, K, Ca and Mg salts) such as those of acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid or endobicyclo-[2.2.1]-5-heptene-2,3-dicarboxylic acid, acid anhydride groups such as those of maleic anhydride, itaconic anhydride, citraconic anhydride or endobicyclo-[2.2.1]-5-heptene-2,3-dicarboxylic anhydride, epoxy groups such as glycidyl acrylate, glycidyl methacrylate, glycidyl ethacrylate, glycidyl itaconate or glycidyl citraconate, or other functional group, polyester-based resins such as polybutylene terephthalate (PBT), polyethylene terephthalate (PET), polyethylene isophthalate (PEI), poly(ethylene terephthalate-ethylene isophthalate) copolymer (PET/PEI), polytrimethylene terephthalate (PTT), polycyclohexene dimethylene terephthalate (PCT), polyethylene naphthalate (PEN), polybutylene naphthalate (PBN), polyarylate (PAR), liquid crystal polyester (LCP), polylactic acid (PLA) or polyglycolic acid (PGA), polyether-based resins such as polyacetal (POM) or polyphenylene ether (PPO), polysulfone-based resins such as polysulfone (PSU), polyethersulfone (PESU) or polyphenylsulfone (PPSU), polythioether-based resins such as polyphenylenesulfide (PPS) or polythioethersulfone (PTES), polyketone-based resins such as polyketone (PK), polyether ketone (PEK), polyether ether ketone (PEEK), polyether ketone ketone (PEKK), polyether ether ether ketone (PEEEK), polyether ether ketone ketone (PEEKK), polyether ketone ketone ketone (PEKKK) or polyether ketone ether ketone ketone (PEKEKK), polynitrile-based resins such as polyacrylonitrile (PAN), polymethacrylonitrile, acrylonitrile-styrene copolymer (AS), methacrylonitrile-styrene copolymer, acrylonitrile-butadiene-styrene copolymer (ABS) or acrylonitrile-butadiene copolymer (NBR), polymethacrylate-based resins such as polymethyl methacrylate (PMMA) or polyethyl methacrylate (PEMA), polyvinyl ester-based resins such as polyvinyl acetate (PVAc), polyvinyl chloride-based resins such as polyvinylidene chloride (PVDC), polyvinyl chloride (PVC), vinyl chloride-vinylidene chloride copolymer or vinylidene chloride-methyl acrylate copolymer, cellulose-based resins such as cellulose acetate or cellulose butyrate, polycarbonate-based resins such as polycarbonate (PC), polyimide-based resins such as thermoplastic polyimide (TPI), polyetherimide, polyesterimide, polyamide imide (PAI) or polyester amide imide, thermoplastic polyurethane-based resins, polyamide elastomers, polyurethane elastomers and polyester elastomers.

Furthermore, in the first aspect of the multilayer tube, among the aforementioned examples of thermoplastic resin, polyester-based resin, polyamide-based resin, polythioether-based resin, polyolefin-based resin and fluorine-based polymer having a melting point of 290° C. or lower are used preferably from the viewpoint of melt stability of EVOH (C).

In addition, in the second aspect of the multilayer tube, among the aforementioned examples of thermoplastic resins, polyester-based resin, polyamide-based resin, polythioether-based resin, polyolefin-based resin and fluorine-based polymer not containing a functional group are used preferably from the viewpoint of melt stability of EVOH (C).

In addition, an arbitrary base material other than a thermoplastic resin can be laminated, examples of which include paper, metallic materials, non-oriented, uniaxially oriented or biaxially oriented plastic films or sheets, woven fabric, non-woven fabric, metallic fiber and wood. Examples of metallic materials include materials made of a metal such as aluminum, iron, copper, nickel, gold, silver, titanium, molybdenum, magnesium, manganese, lead, tin, chromium, beryllium, tungsten or cobalt, metal compounds thereof, and alloys such as stainless steel or other alloy steel, aluminum alloy, copper alloys such as brass or bronze or nickel alloy composed of two or more types thereof.

Examples of methods used to produce the multilayer tube include a method of melt-extruding using a number of extruding machines corresponding to the number of layers or number of materials followed by simultaneously laminating inside or outside a die (co-extrusion method), and a method of preliminarily producing a single-layer tube or multilayer tube produced according to the aforementioned method, and then sequentially integrating the resin and laminating on the outside using an adhesive as necessary (coating method). The multilayer tube is preferably produced according to the co-extrusion method in which a tube having a multilayer structure is produced in a single step by co-extruding each type of material in the molten state and then subjecting both to thermal fusion bonding (melt adhesion). Namely, the method for producing the multilayer tube preferably comprises co-extrusion processing.

In addition, in the case the resulting multilayer tube has a complex shape or is used in the form of a molded product by subjecting to heat bending after processing, the target molded product can be obtained by carrying out heat treatment for 0.01 hours to 10 hours after forming the aforementioned multilayer tube at a temperature lower than the lowest melting point of the melting points of the resins that compose the tube in order to remove residual strain of the molded product.

The multilayer tube may have a wavy region. A wavy region refers to a region formed into a waveform shape, bellowed shape, accordion shape or corrugated shape. The wavy region may be provided over the entire length of the multilayer tube or provided only partially in a suitable intermediate region. The wavy region can be easily formed by first forming a straight tube and then subjecting the tube to molding to form into a prescribed wavy shape. The presence of this wavy region enables the multilayer tube to absorb impacts and facilitates mounting. Moreover, the wavy region can also be fitted with a necessary component such as a connector or can be formed into an L-shape or U-shape by bending processing.

A solid or sponge-like protective member (protector) can be arranged on all or a portion of the outer periphery of the multilayer tube molded in this manner in consideration of damage caused by flying stones, wear with other components and fire resistance, and examples of materials composing the protective member include natural rubber (NR), butadiene rubber (BR), isoprene rubber (IR), butyl rubber (IIR), chloroprene rubber (CR), carboxylated butadiene rubber (XBR), carboxylated chloroprene rubber (XCR), epichlorhydrin rubber (ECO), acrylonitrile butadiene rubber (NBR), hydrogenated acrylonitrile butadiene rubber (HNBR), carboxylated acrylonitrile butadiene rubber (XNBR), mixtures of NBR and polyvinyl chloride, acrylonitrile isoprene rubber (NIR), chlorinated polyethylene rubber (CM), chlorosulfonated polyethylene rubber (CSM), ethylene propylene rubber (EPR), ethylene propylene diene rubber (EPDM), ethylene vinyl acetate rubber (EVM), mixed rubber of NBR and EPDM, acrylic rubber (ACM), ethylene acrylic rubber (AEM), acrylate butadiene rubber (ABR), styrene butadiene rubber (SBR), carboxylated styrene butadiene rubber (XSBR), styrene isoprene rubber (SIR), styrene isoprene butadiene rubber (SIBR), urethane rubber, silicone rubber (MQ, VMQ), fluororubber (FKM, FFKM), fluorosilicone rubber (FVMQ) and vinyl chloride-based, olefin-based, ester-based, urethane-based and amide-based thermoplastic elastomers. The protective member may be in the form of a sponge-like porous body produced by a known technique. The use of the protective member in the form of a porous body enables the formation of a protective member that is lightweight and demonstrates superior thermal insulating properties. In addition, material costs can also be reduced. Alternatively, the strength of the protective member may be improved by adding glass fiber and the like. There are no particular limitations on the shape of the protective member, and normally is a tubular member or is a block-like member having an indentation into which a tubular member or multilayer tube is inserted. In the case of a tubular member, the multilayer tube can be subsequently inserted into a preliminarily fabricated tubular member, or the tubular member can be extrusion-coated on the multilayer tube followed by adhering the two components to produce the protective member. In order to adhere the two components, by coating an adhesive on the inner surface of the protective member or on the aforementioned indented surface as necessary, inserting or fitting the multilayer tube therein and adhering the two components, a structure is formed in which the multilayer tube and protective member are integrated into a single unit. In addition, the protective member can also be reinforced with metal and the like.

Although the outer diameter of the multilayer tube is designed to a thickness that prevents increases in the amount of chemical permeation in consideration of the flow rate of a chemical (such as a fuel in the manner of alcohol-containing gasoline), is able to maintain the burst pressure of an ordinary tube, and is able to maintain flexibility to a degree that facilitates tube assembly work and results in favorable vibration resistance during use, there are no particular limitations thereon. Outer diameter is preferably 4 mm to 300 mm, inner diameter is preferably 3 mm to 250 mm, and wall thickness is preferably 0.5 mm to 25 mm.

The multilayer tube of the present embodiment can be used in various types of applications, including mechanical components such as automobile parts, internal combustion engine applications or power tool housings, as well as industrial materials, building materials, electrical and electronic components, health care applications, foods, home and office supplies, construction material components and furniture parts.

In addition, the multilayer tube of the present invention is preferable for use as a liquid chemical transport tube due to its superior chemical impermeability. Examples of liquid chemicals include aromatic hydrocarbon-based solvents such as benzene, toluene or xylene, alcohol- and phenol-based solvents such as methanol, ethanol, propanol, butanol, pentanol, ethylene glycol, propylene glycol, diethylene glycol, phenol, cresol, polyethylene glycol or polypropylene glycol, ether-based solvents such as dimethyl ether, dipropyl ether, methyl t-butyl ether, ethyl t-butyl ether, dioxane or tetrahydrofuran, halogen-based solvents such as chloroform, methylene chloride, trichloroethylene, ethylene dichloride, perchloroethylene, monochloroethane, dichloroethane, tetrachloroethane, perchloroethane or chlorobenzene, ketone-based solvents such as acetone, methyl ethyl ketone, diethyl ketone or acetophenone, gasoline, kerosene, diesel gasoline, alcohol-containing gasoline, ethyl t-butyl ether-blended, oxygen-containing gasoline, amine-containing gasoline, sour gasoline, castor oil-based brake fluid, glycol ether-based brake fluid, borate ester-based brake fluid, cold weather brake fluid, silicone-based brake fluid, mineral oil-based brake fluid, power steering oil, hydrogen sulfide-containing oil, window washer fluid, engine coolant, urea solutions, pharmaceutical agents, ink and paint. The multilayer tube is preferable for use as a tube used to transport the aforementioned liquid chemicals, and specific examples thereof include fuel tubes such as a feed tube, return tube, evaporation tube, fuel filler tube, OR VR tube, reserve tube or vent tube, oil tube, oil drilling tube, brake tube, window washer fluid tube, engine coolant tube (LLC) tube, reserve tank tube, urea solution transport tube, cooling water or coolant cooler tube, air-conditioner coolant tube, heater tube, road heating tube, floor heating tube, infrastructure supply tube, fire extinguisher or extinguishing equipment tube, medical cooling equipment tube, ink, paint spraying tube and other liquid chemical tubes. The multilayer tube is used particularly preferably as a fuel tube. Namely, the present invention includes the use of the aforementioned multilayer tube of the present invention as a fuel tube.

EXAMPLES

Although the following provides a detailed explanation of the present invention by indicating examples and comparative examples thereof, the present invention is not limited thereto.

Furthermore, analysis and measurement methods used in the examples and comparative examples as well as materials used in the examples and comparative examples are indicated below.

Properties of polyamide-based resins were measured according to the methods indicated below.

[Relative Viscosity]

Relative viscosity was measured in compliance with JIS K-6920 under conditions of 96% sulfuric acid, a polyamide concentration of 1% and temperature of 25° C.

[Terminal Amino Group Concentration]

A prescribed amount of polyamide sample was placed in an Erlenmeyer flask equipped with a stopcock, and after adding 40 mL of a preliminarily prepared phenol/methanol solvent (volume ratio: 9/1), the sample was dissolved by stirring with a magnetic stirrer and the resulting solution was titrated with 0.05 N hydrochloric acid using thymol blue for the indicator to determine the terminal amino group concentration.

[Terminal Carboxyl Group Concentration]

A prescribed amount of polyamide sample was placed in a three-mouth pear-shaped flask, and after adding 40 mL of benzyl alcohol, the flask was immersed in an oil bath set to 180° C. in the presence of flowing nitrogen. After dissolving by stirring with a stirring motor attached to the upper portion of the flask, the solution was titrated with 0.05 N sodium hydroxide solution using phenolphthalein for the indicator to determine the terminal carboxyl group concentration.

Properties of fluorine-containing polymers were measured according to the methods indicated below.

[Fluorine-Containing Polymer Composition]

Fluorine-containing polymer composition was measured by melt NMR analysis, fluorine content analysis and infrared absorption spectrum.

[Number of Terminal Carbonate Groups in Fluorine-Containing Polymer]

The number of terminal carbonate groups in fluorine-containing polymer was determined by measuring the absorbance of peaks appearing at an absorption wavelength of 1817 $cm^{-1}$ belonging to the carbonyl groups of carbonate groups (—OC(=O)O—) using infrared absorption spectrum analysis, and then calculating the number of carbonate groups per $10^6$ carbon atoms present in the main chain of the fluorine-containing polymer according to the equation indicated below.

[No. of carbonate groups per $10^6$ main chain carbon atoms in fluorine-containing polymer]=500 AW/εdf A: Absorbance of carbonate group (—OC(=O)O—) peak ε: Molar extinction coefficient of carbonate group (—OC(=O)O—) [$cm^{-1} \cdot mol^{-1}$] (ε=170 as determined using model compound)

W: Average composition molecular weight as calculated from monomer composition d: Film density [$g/cm^3$]

f: Film thickness [mm]

In addition, properties of multilayer tubes were measured according to the methods indicated below.

[Low-Temperature Impact Resistance]

An impact test was carried out at −40° C. according to the method described in VW TL 52435 6.5.

[Deteriorated Fuel Resistance]

A test of resistance to deteriorated fuel was carried out according to the method described in SAE J-2260 7.8. Following testing, the tubes were subject to an impact test at −40° C. according to the method described in SAE J-2260 7.5, and deteriorated fuel resistance was judged to be superior in the case 0 of 10 test tubes ruptured.

[Chemical (Alcohol-Containing Gasoline (CE10)) Permeation Resistance]

One end of a tube cut to a length of 200 mm was sealed followed by filling the tube with alcohol-containing gasoline (CE10) obtained by mixing Fuel C (volume ratio of isooctane/toluene=50/50) and ethanol at a volume ratio of 90/10, and sealing the remaining end of the tube. Subsequently, the total mass of the filled tube was measured followed by placing the test tube in an oven at 60° C. and measuring the change in mass each day. The permeated amount of alcohol-containing gasoline (CE10) ($g/m^2 \cdot day$) was calculated by dividing the mass change per day by the tube inner layer surface area.

[Chemical (Alcohol-Containing Gasoline (CE85)) Permeation Resistance]

One end of a tube cut to a length of 200 mm was sealed followed by filling the tube with alcohol-containing gasoline (CE85) obtained by mixing Fuel C (volume ratio of isooctane/toluene=50/50) and ethanol at a volume ratio of 15/85, and sealing the remaining end of the tube. Subsequently, the total mass of the filled tube was measured followed by placing the test tube in an oven at 60° C. and measuring the change in mass each day. The permeated amount of alcohol-containing gasoline (CE85) ($g/m^2 \cdot day$) was calculated by dividing the mass change per day by the tube inner layer surface area.

[Interlayer Adhesion]

A tube cut to a length of 200 mm was further cut in half in the longitudinal direction to prepare a test piece. A 180° peel test was carried out at a pulling speed of 50 mm/min using a universal tester (Tensilon UTM III-200 manufactured by Orientec Co., Ltd.). Interlayer adhesion was evaluated by reading peel strength from the local maximum of an S—S curve.

[Interlayer Adhesion Durability]

A tube cut to a length of 200 mm was placed in an oven at 160° C. and treated for 12 minutes. The interlayer adhesion of the tube after removing from the oven was evaluated in accordance with the method described above. Peel strength after heat treatment of 20 N/cm or more was judged to indicate superior interlayer adhesion durability.

[Monomer/Oligomer Elution Resistance]

One end of a tube cut to a length of 0.5 m was sealed followed by filling the tube with alcohol-containing gasoline (CE10) obtained by mixing Fuel C (volume ratio of isooctane/toluene=50/50) and ethanol at a volume ratio of 90/10, and sealing the remaining end of the tube. Subsequently, the test tube was placed in an oven at 60° C. and treated for 48 hours. Following completion of treatment, the alcohol-containing gasoline present in the tube after having been removed from the oven was cooled at 0° C. for 24 hours followed by filtering through a filter having a pore diameter of 0.45 µm (material: polyethersulfone) and measuring the mass of the material trapped on the filter. The amount of eluted monomer and oligomer (g/m$^2$·day) was calculated by dividing the mass of material trapped on the filter by the number of treatment days and the tube inner surface area. Furthermore, following completion of treatment, the color of alcohol-containing gasoline that escaped from inside the tube was observed visually.

[Materials Used in Examples and Comparative Examples]

Production of Polyamide A12 Composition (A-1)

An impact modifier in the form of maleic anhydride-modified ethylene-propylene copolymer (JSR T7761P, JSR Corp., bending elastic modulus as measured in compliance with ISO 178: 5 MPa), an antioxidant in the form of triethylene glycol-bis[3-(3-t-butyl-5-methyl-4-hydroxyphenyl)propionate] (Irganox 245, BASF Japan, Ltd.), and a phosphorous-based processing stabilizer in the form of tris(2,4-di-t-butylphenyl)phosphite (Irgafos 168, BASF Japan, Ltd.) were preliminarily mixed with Polyamide 12 (a-1) (Ubesta 3030UX1, Ube Industries, Ltd., relative viscosity: 2.21), followed by supplying to a twin-screw melt kneader (Model TEX44, Japan Steel Works, Ltd.) while injecting a plasticizer in the form of benzenesulfonic acid butyl amide with a constant volume pump at an intermediate location of the cylinder of the twin-screw melt kneader, melt-kneading at a cylinder temperature from 180° C. to 260° C. and extruding the molten resin in the form of a strand, followed by cooling by introducing in a water bath, cutting and vacuum-drying to obtain pellets of a Polyamide 12 composition comprising 0.8 part by mass of antioxidant and 0.2 part by mass of phosphorous-based processing stabilizer based on a total of 100 parts of 85% by mass of Polyamide 12, 10% by mass of impact modifier and 5% by mass of plasticizer (this Polyamide 12 composition is hereinafter be referred to as (A-1)).

Production of Polyamide 12 Composition (A-2)

Pellets of Polyamide 12 composition comprising 0.8 part by mass of antioxidant and 0.2 part by mass of phosphorous-based processing stabilizer based on a total of 100 parts by mass of 85% by mass of Polyamide 12 and 15% by mass of impact modifier were obtained using the same method as in the production of Polyamide 12 composition (A-1) with the exception of not using a plasticizer and changing the amount of impact modifier added in the production of Polyamide 12 composition (A-1) (this Polyamide 12 composition is hereinafter be referred to as (A-2)).

Production of Electrically Conductive Polyamide 12 Composition (A-3)

Pellets of an electrically conductive Polyamide 12 composition comprising 0.8 part by mass of antioxidant and 0.2 part by mass of phosphorous-based processing stabilizer based on a total of 100 parts by mass of 60% by mass of Polyamide 12, 20% by mass of impact modifier and 20% by mass of electrically conductive filler were obtained using the same method as in the production of Polyamide 12 composition (A-1) with the exception of changing the Polyamide 12 (a-1) to Polyamide 12 (a-2) (Ubesta 3020U, Ube Industries, Ltd., relative viscosity: 1.86), using an electrically conductive filler in the form of carbon black (Vulcan XD-72, Cabot Corp.), not using a plasticizer and changing the cylinder temperature from 260° C. to 270° C. in the production of Polyamide 12 composition (A-1) (this electrically conductive Polyamide 12 composition is hereinafter be referred to as (A-3)).

Production of Polyamide 610 (a-3) or (b-3)

17.6 kg of a 50% by mass aqueous solution of an equimolar salt of 1,6-hexanediamine and sebacic acid and 40.0 g of 1,6-hexanediamine were charged into a pressure-resistant reaction vessel having an internal volume of 70 liters and equipped with a stirrer, and after replacing the inside of the polymerization tank with nitrogen, the polymerization tank was heated to 220° C. followed by stirring at that temperature so that the reaction system became homogeneous. Next, the temperature inside the polymerization tank was raised to 270° C. and polymerization was carried out for 2 hours while stirring and regulating the pressure inside the tank to 1.7 MPa. Subsequently, the pressure was returned to normal pressure over the course of about 2 hours followed by reducing the pressure to 53 kPa and carrying out polymerization for 4 hours under reduced pressure. Next, nitrogen was introduced into the autoclave, and after restoring the pressure to normal pressure, the reaction product was extracted from a nozzle in the bottom of the pressure vessel in the form of a strand which was then cut to obtain pellets. The pellets were dried under reduced pressure to obtain Polyamide 610 having a relative viscosity of 3.05, terminal amino group concentration of 50 µeq/g, and terminal carboxyl group concentration of 14 µeq/g (this Polyamide 610 is hereinafter be referred to as (a-3) or (b-3)).

Production of Polyamide 610 Composition (A-4)

Pellets of Polyamide 610 composition comprising 0.8 part by mass of antioxidant and 0.2 part by mass of phosphorous-based processing stabilizer based on a total of 100 parts by mass of 80% by mass of Polyamide 610, 10% by mass of impact modifier and 10% by mass of plasticizer were obtained using the same method as in the production of Polyamide 12 composition (A-1) with the exception of changing the Polyamide 12 (a-1) to Polyamide 610 (a-3) and changing the cylinder temperature from 260° C. to 270° C. in the production of Polyamide 12 composition (A-1) (this Polyamide 610 composition is hereinafter be referred to as (A-4)).

Production of Polyamide 612 (a-4) or (b-4)

Pellets of Polyamide 612 having a relative viscosity of 2.78, terminal amino group concentration of 51 µeq/g and terminal carboxyl group concentration of 14 µeq/g were obtained using the same method as in the production of Polyamide 610 (a-3) with the exception of changing the 17.6 kg of a 50% by mass aqueous solution of an equimolar salt of 1,6-hexanediamine and sebacic acid to 19.2 kg of a 50% by mass aqueous solution of an equimolar salt of 1,6-hexanediamine and dodecanedioic acid, and changing the amount of 1,6-hexanediamine added from 40.0 g to 43.5 g in the production of Polyamide 610 (a-3) (this Polyamide 612 is hereinafter be referred to as (a-4) or (b-4)).

Production of Polyamide 612 Composition (A-5)

Pellets of Polyamide 612 composition comprising 0.8 part by mass of antioxidant and 0.2 part by mass of phosphorous-based processing stabilizer based on a total of 100 parts by mass of 80% by mass of Polyamide 612, 10% by mass of impact modifier and 10% by mass of plasticizer were obtained using the same method as in the production of Polyamide 12 composition (A-1) with the exception of changing the Polyamide 12 (a-1) to Polyamide 612 (a-4) and changing the cylinder temperature from 260° C. to 270° C. in the production of Polyamide 12 composition (A-1) (this Polyamide 612 composition is hereinafter be referred to as (A-5)).

Production of Polyamide 6 Composition (B1-1)

Pellets of Polyamide 6 composition comprising 0.8 part by mass of antioxidant and 0.2 part by mass of phosphorous-based processing stabilizer based on a total of 100 parts by mass of 80% by mass of Polyamide 6, 10% by mass of impact modifier and 10% by mass of plasticizer were obtained using the same method as in the production of Polyamide 12 composition (A-1) with the exception of changing the Polyamide 12 (a-1) to Polyamide 6 (b-1) (Ube Nylon 1030B, Ube Industries, Ltd., relative viscosity: 3.89) and changing the cylinder temperature from 260° C. to 270° C. in the production of Polyamide 12 composition (A-1) (this Polyamide 6 composition is hereinafter be referred to as (B1-1)).

Production of Polyamide 6/66/12 (b-2)

16.2 kg of caprolactam, 5.0 kg of a 50% by mass aqueous solution of an equimolar salt of 1,6-hexanediamine and sebacic acid, and 2.5 kg of 12-aminododecanoic acid were placed in a pressure-resistant reaction vessel having an internal volume of 70 liters and equipped with a stirrer followed by heating to 100° C. and stirring at that temperature so that the reaction system became homogeneous. Next, the temperature was raised to 260° C. followed by stirring for 1 hour at a pressure of 2.5 MPa. Subsequently, the pressure was released and a polymerization reaction was carried out for 2 hours at 260° C. under normal pressure while allowing moisture to vaporize from the reaction vessel followed by further carrying out the polymerization reaction for 7 hours under reduced pressure at 260° C. and 53 kPa. Following completion of the reaction, the reaction product was extracted from a nozzle in the bottom of the pressure vessel in the form of a strand which was then cooled by introducing into a water tank and cut to obtain pellets. After immersing the pellets in hot water to extract and remove unreacted monomer, the pellets were dried under reduced pressure to obtain Polyamide 6/66/12 having a relative viscosity of 4.01 (caproamide unit/hexamethylene adipamide unit/dodecanamide unit=78/11/11% by mass) (this Polyamide 6/66/12 is hereinafter be referred to as (b-2)).

Production of Polyamide 6/66/12 Composition (B2-1)

Pellets of Polyamide 6/66/12 composition comprising 0.8 part by mass of antioxidant and 0.2 part by mass of phosphorous-based processing stabilizer based on a total of 100 parts by mass of 50% by mass of Polyamide 6/66/12, 30% by mass of Polyamide 610, 15% by mass of impact modifier and 5% by mass of plasticizer were obtained using the same method as in the production of Polyamide 12 composition (A-1) with the exception of changing the Polyamide 12 (a-1) to Polyamide 6/66/12 (b-2) and Polyamide 610 (b-3) in the production of Polyamide 12 composition (A-1) (this Polyamide 6/66/12 composition is hereinafter be referred to as (B2-1)).

Production of Polyamide 6/66/12 Composition (B2-2)

Pellets of Polyamide 6/66/12 composition comprising 0.8 part by mass of antioxidant and 0.2 part by mass of phosphorous-based processing stabilizer based on a total of 100 parts by mass of 50% by mass of Polyamide 6/66/12, 30% by mass of Polyamide 612, 15% by mass of impact modifier and 5% by mass of plasticizer were obtained using the same method as in the production of Polyamide 6/66/12 composition (B2-1) with the exception of changing the Polyamide 610 (b-3) to Polyamide 612 (b-4) in the production of Polyamide 6/66/12 composition (B2-1) (this Polyamide 6/66/12 composition is hereinafter be referred to as (B2-2)).

Production of Polyamide 6/66/12 Composition (B2-3)

Pellets of Polyamide 6/66/12 composition comprising 0.8 part by mass of antioxidant and 0.2 part by mass of phosphorous-based processing stabilizer based on a total of 100 parts by mass of 80% by mass of Polyamide 6/66/12, 15% by mass of impact modifier and 5% by mass of plasticizer were obtained using the same method as in the production of Polyamide 6/66/12 composition (B2-1) with the exception of not using Polyamide 610 (b-3) in the production of Polyamide 6/66/12 composition (B2-1) (this Polyamide 6/66/12 composition is hereinafter be referred to as (B2-3)).

Production of Polyamide 6/66/12 Composition (B2-4)

Pellets of Polyamide 6/66/12 composition comprising 0.8 part by mass of antioxidant and 0.2 part by mass of phosphorous-based processing stabilizer based on 100% by mass of Polyamide 6/66/12 were obtained using the same method as in the production of Polyamide 6/66/12 composition (B2-1) with the exception of not using Polyamide 610 (b-3), impact modifier or plasticizer in the production of Polyamide 6/66/12 composition (B2-1) (this Polyamide 6/66/12 composition is hereinafter be referred to as (B2-4)).

Production of Polyamide 6/12 (b-5)

Polyamide 6/12 (caproamide unit/dodecanamide unit=80/20% by mass) having relative viscosity of 3.86 was obtained using the same method as in the production of Polyamide 6/66/12 (b-2) with the exception of changing the 16.2 kg of caprolactam, 5.0 kg of a 50% by mass aqueous solution of an equimolar salt of 1,6-hexanediamine and sebacic acid, and 2.5 kg of 12-aminododecanoic acid to 16.2 kg of caprolactam and 4.4 kg of 12-aminododecanoic acid and adding 2 kg of water in the production of Polyamide 6/66/12 (b-2) (this Polyamide 6/12 is hereinafter be referred to as (b-5)).

Production of Polyamide 6/12 Composition (B2-5)

Pellets of Polyamide 6/12 composition comprising 0.8 part by mass of antioxidant and 0.2 part by mass of phosphorous-based processing stabilizer based on a total of 100 parts by mass of 80% by mass of Polyamide 6/12, 15% by mass of impact modifier and 5% by mass of plasticizer were obtained using the same method as in the production of Polyamide 6/66/12 composition (B2-1) with the exception of changing the Polyamide 6/66/12 (b-2) to Polyamide 6/12 (b-5) and not using Polyamide 610 (b-3) in the production of Polyamide 6/66/12 composition (B2-1) (this Polyamide 6/12 composition is hereinafter be referred to as (B2-5)).

EVOH (C-1): Soarnol DC3203, Nippon Synthetic Chemical Industry Co., Ltd., ethylene content: 32 mol %, degree of saponification: 99 mol % or more Production of Semi-Aromatic Polyamide (d1-1)

2.374 kg (15.0 mol) of 1,9-nonanediamine, 2.374 kg (15.0 mol) of 2-methyl-1,8-octanediamine, 4.984 kg (30.0 mol) of terephthalic acid, 65.9 g (0.54 mol) of benzoic acid, 10.2 g (0.1% by mass based on raw materials) of sodium hypophosphite monohydrate and 6.0 L of distilled water were placed in an autoclave followed by replacing the air inside the autoclave with nitrogen. After stirring for 30 minutes at 100° C., the internal temperature was raised to 210° C. over the course of 2 hours. At this time, the pressure inside the autoclave increased to 2.2 MPa. After continuing to react for 1 hour while in this state, the temperature was raised to 230° C. and subsequently held at a temperature of 230° C. for 2 hours followed by gradually releasing water vapor and allowing to react while holding the pressure at 2.2 MPa. Next, pressure was lowered to 1.0 MPa over the course of 30 minutes followed by allowing to additionally react for 1 hour to obtain a prepolymer. This prepolymer was then dried for 12 hours at 100° C. under reduced pressure, crushed to a size of 2 mm or less and subjected to solid phase polymerization for 8 hours at 230° C. and 0.013 kPa to obtain a semi-aromatic polyamide having a melting point of 265° C. and relative viscosity of 2.38 (Polyamide 9T:M8T=50:50 mol %) (this semi-aromatic polyamide is hereinafter referred to as (d1-1)).

Production of Semi-Aromatic Polyamide Composition (D1-1)

An impact modifier in the form of maleic anhydride-modified ethylene-propylene copolymer (JSR T7761P, JSR Corp.), an antioxidant in the form of triethylene glycol-bis [3-(3-t-butyl-5-methyl-4-hydroxyphenyl)propionate] (Irganox 245, BASF Japan, Ltd.), and a phosphorous-based processing stabilizer in the form of tris(2,4-di-t-butylphenyl) phosphite (Irgafos 168, BASF Japan, Ltd.) were preliminarily mixed with semi-aromatic polyamide (d1-1), followed by supplying to a twin-screw melt kneader (Model TEX44, Japan Steel Works, Ltd.), melt-kneading at a cylinder temperature from 240° C. to 300° C. and extruding the molten resin in the form of a strand, and then cooling by introducing in a water bath, cutting and vacuum-drying to obtain pellets of a semi-aromatic polyamide composition comprising 0.8 part by mass of antioxidant and 0.2 part by mass of phosphorous-based processing stabilizer based on a total of 100 parts of 90% by mass of semi-aromatic polyamide and 10% by mass of impact modifier (this semi-aromatic polyamide composition is hereinafter be referred to as (D1-1)).

Production of Semi-Aromatic Polyamide (d1-2)

Semi-aromatic polyamide (Polyamide 9T/M8T=85/15 mol %) having a melting point of 305° C. and relative viscosity of 2.34 was obtained using the same method as in the production of semi-aromatic polyamide (d1-1) with the exception of changing the 2.374 kg (15.0 mol) of 1,9-nonanediamine and 2.374 kg (15.0 mol) of 2-methyl-1,8-octandeiamine in the production of semi-aromatic polyamide (d1-1) to 4.036 kg (25.5 mol) of 1,9-nonanediamine and 0.712 kg (4.5 mol) of 2-methyl-1,8-octanediamine and changing the solid polymerization temperature from 230° C. to 250° C. (this semi-aromatic polyamide is hereinafter referred to as (d1-2)).

Production of Semi-Aromatic Polyamide Composition (D1-2)

Pellets of a semi-aromatic polyamide composition comprising 0.8 part by mass of antioxidant and 0.2 part by mass of phosphorous-based processing stabilizer based on a total of 100 parts by mass of 90% by mass of semi-aromatic polyamide and 10% by mass of impact modifier were obtained using the same method as in the production of semi-aromatic polyamide composition (D1-1) with the exception of changing the semi-aromatic polyamide (d1-1) in the production of semi-aromatic polyamide composition (D1-1) to semi-aromatic polyamide (d1-2) and changing the cylinder temperature from 300° C. to 330° C. (this semi-aromatic polyamide composition is hereinafter referred to as (D1-2)).

Production of Semi-Aromatic Polyamide (d1-3)

Semi-aromatic polyamide (Polyamide 9N/M8N=50/50 mol %) having a melting point of 275° C. and relative viscosity of 2.37 was obtained using the same method as in the production of semi-aromatic polyamide (d1-1) with the exception of changing the 4.984 kg (30.0 mol) of terephthalic acid in the production of semi-aromatic polyamide (d1-1) to 6.486 kg (30.0 mol) of 2,6-naphthalenedicarboxylic acid (this semi-aromatic polyamide is hereinafter referred to as (d1-3)).

Production of Semi-Aromatic Polyamide Composition (D1-3)

Pellets of a semi-aromatic polyamide composition comprising 0.8 part by mass of antioxidant and 0.2 part by mass of phosphorous-based processing stabilizer based on a total of 100 parts by mass of 90% by mass of semi-aromatic polyamide and 10% by mass of impact modifier were obtained using the same method as in the production of semi-aromatic polyamide composition (D1-1) with the exception of changing the semi-aromatic polyamide (d1-1) in the production of semi-aromatic polyamide composition (D1-1) to semi-aromatic polyamide (d1-3) and changing the cylinder temperature from 300° C. to 310° C. (this semi-aromatic polyamide composition is hereinafter referred to as (D1-3)).

Production of Semi-Aromatic Polyamide (d1-4)

Semi-aromatic polyamide (Polyamide 10T=100 mol %) having a melting point of 315° C. and relative viscosity of 2.33 was obtained using the same method as in the production of semi-aromatic polyamide (d1-1) with the exception of changing the 2.374 kg (15 mol %) of 1,9-nonanediamine and 2.374 kg (15.0 mol) of 2-methyl-1,8-octanediamine in the production of semi-aromatic polyamide (d1-1) to 5.169 kg (30.0 mol) of 1,10-decanediamine (this semi-aromatic polyamide is hereinafter referred to as (d1-4)).

Production of Semi-Aromatic Polyamide Composition (D1-4)

Pellets of a semi-aromatic polyamide composition comprising 0.8 part by mass of antioxidant and 0.2 part by mass of phosphorous-based processing stabilizer based on a total of 100 parts by mass of 90% by mass of semi-aromatic polyamide and 10% by mass of impact modifier were obtained using the same method as in the production of semi-aromatic polyamide composition (D1-1) with the exception of changing the semi-aromatic polyamide (d1-1) in the production of semi-aromatic polyamide composition (D1-1) to semi-aromatic polyamide (d1-4) and changing the cylinder temperature from 300° C. to 340° C. (this semi-aromatic polyamide composition is hereinafter referred to as (D1-4)).

Production of Semi-Aromatic Polyamide (d1-5)

Semi-aromatic polyamide (Polyamide 10T/11=60/40 mol %) having a melting point of 255° C. and relative viscosity of 2.34 was obtained using the same method as in the production of semi-aromatic polyamide (d1-4) with the exception of changing the 5.169 kg of 1,10-decanediamine and 4.984 kg (30.0 mol) of terephthalic acid in the production of semi-aromatic polyamide (d1-4) to 3.101 kg (18.0 mol) of 1,10-decanediamine, 2.990 kg (18.0 mol) of terephthalic acid and 2.416 kg (12.0 mol) of 11-aminoundecanoic acid, and changing the solid phase polymerization temperature from 260° C. to 200° C. (this semi-aromatic polyamide copolymer is hereinafter referred to as (d1-5)).

Production of Semi-Aromatic Polyamide Composition (D1-5)

Pellets of a semi-aromatic polyamide composition comprising 0.8 part by mass of antioxidant and 0.2 part by mass of phosphorous-based processing stabilizer based on a total of 100 parts by mass of 90% by mass of semi-aromatic polyamide and 10% by mass of impact modifier were obtained using the same method as in the production of semi-aromatic polyamide composition (D1-1) with the exception of changing the semi-aromatic polyamide (d1-1) in the production of semi-aromatic polyamide composition (D1-1) to semi-aromatic polyamide (d1-5) and changing the cylinder temperature from 300° C. to 290° C. (this semi-aromatic polyamide composition is hereinafter referred to as (D1-5)).

Production of Semi-Aromatic Polyamide (d1-6)

Semi-aromatic polyamide (Polyamide 10T/1010=67/33 mol %) having a melting point of 279° C. and relative viscosity of 2.37 was obtained using the same method as in the production of semi-aromatic polyamide (d1-4) with the exception of changing the 4.984 kg (30.0 mol) of terephthalic acid in the production of semi-aromatic polyamide (d1-4) to 3.324 kg (20.0 mol) of terephthalic acid and 2.020 kg (9.99 mol) of sebacic acid, and changing the solid phase polymerization temperature from 260° C. to 220° C. (this semi-aromatic polyamide copolymer is hereinafter referred to as (d1-6)).

Production of Semi-Aromatic Polyamide Composition (D1-6)

Pellets of a semi-aromatic polyamide composition comprising 0.8 part by mass of antioxidant and 0.2 part by mass of phosphorous-based processing stabilizer based on a total of 100 parts by mass of 90% by mass of semi-aromatic polyamide and 10% by mass of impact modifier were obtained using the same method as in the production of semi-aromatic polyamide composition (D1-1) with the exception of changing the semi-aromatic polyamide (d1-1) in the production of semi-aromatic polyamide composition (D1-1) to semi-aromatic polyamide (d1-6) and changing the cylinder temperature from 300° C. to 310° C. (this semi-aromatic polyamide composition is hereinafter referred to as (D1-6)).

Production of Semi-Aromatic Polyamide (d1-7)

Semi-aromatic polyamide (Polyamide 9T/M8T=50/50 mol %) having a melting point of 265° C. and relative viscosity of 2.16 was obtained using the same method as in the production of semi-aromatic polyamide (d1-1) with the exception of changing the solid phase polymerization time from 8 hours to 4 hours (this semi-aromatic polyamide copolymer is hereinafter referred to as (d1-7)).

Production of Electrically Conductive Semi-Aromatic Polyamide Composition (D1-7)

Pellets of an electrically conductive semi-aromatic polyamide composition comprising 0.8 part by mass of antioxidant and 0.2 part by mass of phosphorous-based processing stabilizer based on a total of 100 parts by mass of 75% by mass of semi-aromatic polyamide, 20% by mass of impact modifier and 5% by mass of electrically conductive filler were obtained using the same method as in the production of semi-aromatic polyamide composition (D1-1) with the exception of changing the semi-aromatic polyamide (d1-1) to (d1-7), changing the maleic anhydride-modified ethylene-propylene copolymer (JSR T7761P, JSR Corp.) to maleic anhydride-modified ethylene-1-butene copolymer (Tafmer MH5010, Mitsui Chemicals, Inc.) and ethylene-1-butene copolymer (Tafmer A-0550, Mitsui Chemicals, Inc.), using an electrically conductive filler in the form of carbon nanotubes (NC7000, Nanocyl SA), and changing the cylinder temperature from 300° C. to 320° C. (this semi-aromatic polyamide composition is hereinafter referred to as (D1-7)).

Production of Semi-Aromatic Polyamide (d1-8)

Semi-aromatic polyamide (Polyamide 6T/6I/66=65/25/10 mol %) having a melting point of 315° C. and relative viscosity of 2.38 was obtained using the same method as in the production of semi-aromatic polyamide (d1-4) with the exception of changing the 5.169 kg (30.0 mol) of 1,10-decanediamine and 4.984 kg (30.0 mol) of terephthalic acid in the production of semi-aromatic polyamide (d1-4) to 3.718 (32.0 mol) of 1,6-hexanediamine, 3.240 kg (19.5 mol) of terephthalic acid, 1.246 kg (7.5 mol) of isophthalic acid and 0.438 kg (3.0 mol) of adipic acid (this semi-aromatic polyamide copolymer is hereinafter referred to as (d1-8)).

Production of Semi-Aromatic Polyamide Composition (D1-8)

Pellets of a semi-aromatic polyamide composition comprising 0.8 part by mass of antioxidant and 0.2 part by mass of phosphorous-based processing stabilizer based on a total of 100 parts by mass of 90% by mass of semi-aromatic polyamide and 10% by mass of impact modifier were obtained using the same method as in the production of semi-aromatic polyamide composition (D1-1) with the exception of changing the semi-aromatic polyamide (d1-1) in the production of semi-aromatic polyamide composition (D1-1) to semi-aromatic polyamide (d1-8) and changing the cylinder temperature from 300° C. to 340° C. (this semi-aromatic polyamide composition is hereinafter referred to as (D1-8)).

Production of Semi-Aromatic Polyamide (d2-1)

6.068 kg (30.0 mol) of sebacic acid, 8.50 g (0.049 mol) of calcium hypophosphite and 2.19 g (0.025 mol) of sodium acetate were charged into a pressure vessel having an internal volume of 40 liters and provided with a stirrer, thermometer, torque meter, manometer, raw material feed port directly coupled to a diaphragm pump, nitrogen gas inlet port, pressure release port, pressure regulator and polymer discharge port, and the reaction vessel was pressurized to 0.3 MPa with nitrogen gas having purity within the pressure vessel of 99.9999%, followed by repeating a procedure consisting of releasing the nitrogen gas to normal pressure five times to replace the nitrogen, and then raising the temperature inside the system while stirring under confined pressure. After further raising the temperature to 190° C. in the presence of a small amount of nitrogen flow, 4.086 kg (30.0 mol) of p-xylylenediamine were dropped in over the course of 160 minutes while stirring. During this time, the pressure within the reaction system was controlled to 0.5 MPa and the internal temperature was continuously raised to 295° C. In addition, water that accumulated accompanying dropping in of the p-xylylenediamine was removed outside the system by passing through a partial condenser and cooler. Following completion of dropping of the p-xylylenediamine, the pressure was lowered to normal pressure over the course of 60 minutes, and during this time, the temperature inside the vessel was held at 300° C. and the reaction was continued for 10 minutes. Subsequently, the pressure inside the reaction system was decreased to 79 kPa and a melt polymerization reaction was continued for 40 minutes. Subsequently, stirring was discontinued and the inside of the system was pressurized to 0.2 MPa with nitrogen followed by extracting the polycondensate from a port in the bottom of the pressure vessel in the form of a strand. The strand-like polycondensate was cooled immediately, after which the water-cooled strand-like polycondensate was formed into pellets with a pelletizer followed by drying under reduced pressure to obtain a semi-aromatic polyamide (Polyamide PXD10=100 mol %) having melting points at 281° C. and 291° C. (two melting points) and relative viscosity of 2.47 (this semi-aromatic polyamide is hereinafter referred to as (d2-1)).

Production of Semi-Aromatic Polyamide Composition (D2-1)

Pellets of a semi-aromatic polyamide composition comprising 0.8 part by mass of antioxidant and 0.2 part by mass of phosphorous-based processing stabilizer based on a total of 100 parts by mass of 90% by mass of semi-aromatic polyamide and 10% by mass of impact modifier were obtained using the same method as in the production of semi-aromatic polyamide composition (D1-1) with the exception of changing the semi-aromatic polyamide (d1-1) in the production of semi-aromatic polyamide composition (D1-1) to semi-aromatic polyamide (d2-1) and changing the cylinder temperature from 300° C. to 320° C. (this semi-aromatic polyamide composition is hereinafter referred to as (D2-1)).

Production of Semi-Aromatic Polyamide (d2-2)

Semi-aromatic polyamide (Polyamide PXD9=100 mol %) having a melting point of 270° C. and relative viscosity of 2.45 was obtained using the same method as in the production of semi-aromatic polyamide (d2-1) with the exception of changing the 6.068 kg (30.0 mol) of sebacic acid in the production of semi-aromatic polyamide (d2-1) to 5.647 kg (30.0 mol) of azelaic acid (this semi-aromatic polyamide copolymer is hereinafter referred to as (d2-2)).

Production of Semi-Aromatic Polyamide Composition (D2-2)

Pellets of a semi-aromatic polyamide composition comprising 0.8 part by mass of antioxidant and 0.2 part by mass of phosphorous-based processing stabilizer based on a total of 100 parts by mass of 90% by mass of semi-aromatic polyamide and 10% by mass of impact modifier were obtained using the same method as in the production of semi-aromatic polyamide composition (D2-1) with the exception of changing the semi-aromatic polyamide (d2-1) in the production of semi-aromatic polyamide composition (D2-1) to semi-aromatic polyamide (d2-2) and changing the cylinder temperature from 320° C. to 310° C. (this semi-aromatic polyamide composition is hereinafter referred to as (D2-2)).

Production of Semi-Aromatic Polyamide (d2-3)

Semi-aromatic polyamide (Polyamide MXD10=100 mol %) having a melting point of 191° C. and relative viscosity of 2.46 was obtained using the same method as in the production of semi-aromatic polyamide (d2-1) with the exception of changing the 4.086 kg (30.0 mol) of p-xylylenediamine in the production of semi-aromatic polyamide (d2-1) to 4.086 kg (30.0 mol) of m-xylylenediamine and changing the polymerization temperature from 300° C. to 250° C. (this semi-aromatic polyamide copolymer is hereinafter referred to as (d2-3)).

Production of Semi-Aromatic Polyamide Composition (D2-3)

Pellets of a semi-aromatic polyamide composition comprising 0.8 part by mass of antioxidant and 0.2 part by mass of phosphorous-based processing stabilizer based on a total of 100 parts by mass of 90% by mass of semi-aromatic polyamide and 10% by mass of impact modifier were obtained using the same method as in the production of semi-aromatic polyamide composition (D2-1) with the exception of changing the semi-aromatic polyamide (d2-1) in the production of semi-aromatic polyamide composition (D2-1) to semi-aromatic polyamide (d2-3) and changing the cylinder temperature from 320° C. to 240° C. (this semi-aromatic polyamide composition is hereinafter referred to as (D2-3)).

Production of Semi-Aromatic Polyamide (d2-4)

Semi-aromatic polyamide (Polyamide MXD12=100 mol %) having a melting point of 175° C. and relative viscosity of 2.40 was obtained using the same method as in the production of semi-aromatic polyamide (d2-3) with the exception of changing the 6.068 kg (30.0 mol) of sebacic acid in the production of semi-aromatic polyamide (d2-3) to 6.488 kg (30.0 mol) of dodecanedioic acid and changing the polymerization temperature from 250° C. to 240° C. (this semi-aromatic polyamide copolymer is hereinafter referred to as (d2-4)).

Production of Semi-Aromatic Polyamide Composition (D2-4)

Pellets of a semi-aromatic polyamide composition comprising 0.8 part by mass of antioxidant and 0.2 part by mass of phosphorous-based processing stabilizer based on a total of 100 parts by mass of 90% by mass of semi-aromatic polyamide and 10% by mass of impact modifier were obtained using the same method as in the production of semi-aromatic polyamide composition (D2-1) with the exception of changing the semi-aromatic polyamide (d2-1) in the production of semi-aromatic polyamide composition (D2-1) to semi-aromatic polyamide (d2-4) and changing the cylinder temperature from 320° C. to 230° C. (this semi-aromatic polyamide composition is hereinafter referred to as (D2-4)).

Production of Semi-Aromatic Polyamide (d2-5)

Semi-aromatic polyamide (Polyamide MXD10/PXD10=70/30 mol %) having a melting point of 215° C. and relative viscosity of 2.45 was obtained using the same method as in the production of semi-aromatic polyamide (d2-1) with the exception of changing the 4.086 kg (30.0 mol) of p-xylylenediamine in the production of semi-aromatic polyamide (d2-1) to 4.086 kg (30.0 mol) of a mixed diamine consisting of m-xylylenediamine and p-xylylenediamine at a ratio of 7:3 and changing the polymerization temperature from 300° C. to 260° C. (this semi-aromatic polyamide copolymer is hereinafter referred to as (d2-5)).

Production of Semi-Aromatic Polyamide Composition (D2-5)

Pellets of a semi-aromatic polyamide composition comprising 0.8 part by mass of antioxidant and 0.2 part by mass of phosphorous-based processing stabilizer based on a total of 100 parts by mass of 90% by mass of semi-aromatic polyamide and 10% by mass of impact modifier were obtained using the same method as in the production of semi-aromatic polyamide composition (D2-1) with the exception of changing the semi-aromatic polyamide (d2-1) in the production of semi-aromatic polyamide composition (D2-1) to semi-aromatic polyamide (d2-5) and changing the cylinder temperature from 320° C. to 250° C. (this semi-aromatic polyamide composition is hereinafter referred to as (D2-5)).

Production of Semi-Aromatic Polyamide (d2-6)

Semi-aromatic polyamide (Polyamide 2,6BAN12=100 mol %) having a melting point of 272° C. and relative viscosity of 2.33 was obtained using the same method as in the production of semi-aromatic polyamide (d2-4) with the exception of changing the 4.086 kg (30.0 mol) of m-xylylenediamine in the production of semi-aromatic polyamide (d2-4) to 5.588 kg (30.0 mol) of 2,6-bis(aminomethyl)naphthalene and changing the polymerization temperature from 240° C. to 300° C. (this semi-aromatic polyamide copolymer is hereinafter referred to as (d2-6)).

Production of Semi-Aromatic Polyamide Composition (D2-6)

Pellets of a semi-aromatic polyamide composition comprising 0.8 part by mass of antioxidant and 0.2 part by mass of phosphorous-based processing stabilizer based on a total of 100 parts by mass of 90% by mass of semi-aromatic polyamide and 10% by mass of impact modifier were obtained using the same method as in the production of semi-aromatic polyamide composition (D2-1) with the exception of changing the semi-aromatic polyamide (d2-1) in the production of semi-aromatic polyamide composition (D2-1) to semi-aromatic polyamide (d2-6) and changing the cylinder temperature from 320° C. to 310° C. (this semi-aromatic polyamide composition is hereinafter referred to as (D2-6)).

Production of Semi-Aromatic Polyamide (d2-7)

Semi-aromatic polyamide (Polyamide MXD6=100 mol %) having a melting point of 243° C. and relative viscosity of 2.45 was obtained using the same method as in the production of semi-aromatic polyamide (d2-1) with the exception of changing the 4.086 kg (30.0 mol) of p-xylylenediamine in the production of semi-aromatic polyamide (d2-1) to 4.086 kg (30.0 mol) of m-xylylenediamine, changing the 6.086 kg (30.0 mol) of sebacic acid to 4.384 kg (30.0 mol) of adipic acid, and changing the polymerization temperature from 300° C. to 275° C. (this semi-aromatic polyamide copolymer is hereinafter referred to as (d2-7)).

Production of Semi-Aromatic Polyamide Composition (D2-7)

Pellets of a semi-aromatic polyamide composition comprising 0.8 part by mass of antioxidant and 0.2 part by mass of phosphorous-based processing stabilizer based on a total of 100 parts by mass of 90% by mass of semi-aromatic polyamide and 10% by mass of impact modifier were obtained using the same method as in the production of semi-aromatic polyamide composition (D2-1) with the exception of changing the semi-aromatic polyamide (d2-1) in the production of semi-aromatic polyamide composition (D2-1) to semi-aromatic polyamide (d2-7) and changing the cylinder temperature from 320° C. to 280° C. (this semi-aromatic polyamide composition is hereinafter referred to as (D2-7)).

Fluorine-Containing Polymer (E)
Production of Fluorine-Containing Polymer (E-1)

A polymerization tank having an internal volume of 100 L and equipped with a stirrer was degassed and charged with 92.1 kg of 1-hydrotridecafluorohexane, 16.3 kg of 1,3-dichloro-1,1,2,2,3-pentafluoropropane, 73 g of (perfluoroethyl)ethylene $CH_2=CH(CF_2)_2F$ and 10.1 g of itaconic anhydride (IAH) followed by injecting 9.6 kg of tetrafluoroethylene (TFE) and 0.7 kg of ethylene (E) under pressure, raising the temperature inside the polymerization tank to 66° C. and charging the tank with 433 cm$^3$ of a polymerization initiator in the form of 1,3-dichloro-1,1,2,2,3-pentafluoropropane solution containing 1% by mass of t-butylperoxypivalate to initiate polymerization. A monomer mixed gas of TFE and E at a ratio of 60:40 (molar ratio) was continuously charged into the tank so as to maintain a constant pressure during polymerization. In addition, an amount of (perfluoroethyl)ethylene equivalent to 2.0 mol % and an amount of IAH equivalent to 0.5 mol % based on the total number of moles of TFE and E charged into the tank during polymerization were continuously charged into the tank. The temperature inside the polymerization tank was lowered to room temperature at the point 8.0 kg of the monomer mixed gas and 63 g of IAH have been charged into the tank 5.5 hours after the start of polymerization followed by purging the tank to return the pressure to normal pressure. The resulting slurry-like fluorine-containing polymer was placed in a 200 L granulation tank charged with 75.0 kg of water followed by granulating while distilling off the solvent by raising the temperature to 105° C. and stirring. The resulting granules were then dried for 5 hours at 150° C. to obtain 8.3 kg of granules of a fluorine-containing polymer.

The composition of the fluorine-containing polymer was such that the ratio of a polymer unit based on TFE, a polymer unit based on E, a polymer unit based on $CH_2=CH(CF_2)_2F$ and a polymer unit based on IAH was 58.5:39.0:2.0:0.5 (mol %), and the melting point thereof was 240° C. These granules were melted at 280° C. and residence time of 2 minutes using an extruder to obtain pellets of the fluorine-containing polymer (this fluorine-containing polymer is hereinafter referred to as (E-1)).

Production of Electrically Conductive Fluorine-Containing Polymer (E-2)

Pellets of an electrically conductive fluorine-containing polymer were obtained by preliminarily mixing 100 parts by mass of fluorine-containing polymer (E-1) and 13 parts by mass of carbon black (Denka Co., Ltd.), supplying to a twin-screw melt kneader (Model TEM-48S, Toshiba Machine Co., Ltd.), melt-kneading at a cylinder temperature from 240° C. to 300° C., and extruding the molten resin in the form of a strand, followed by introducing into a water tank to cool the discharged strand with water, cutting the strand with a pelletizer and drying for 10 hours with a dryer at 120° C. to remove moisture (this electrically conductive fluorine-containing polymer is hereinafter referred to as (E-2)).

Production of Fluorine-Containing Polymer (E-3)

7.6 kg of fluorine-containing polymer were obtained using the same method as in the production of fluorine-containing polymer (E-1) with the exception of not charging the itaconic anhydride (IAH) in the production of fluorine-containing polymer (E-1).

The composition of the fluorine-containing polymer was such that the ratio of a polymer unit based on TFE, a polymer unit based on E, and a polymer unit based on $CH_2=CH(CF_2)_2F$ was 58.8:39.2:2.0 (mol %), and the melting point thereof was 242° C. These granules were melted at 280° C. and residence time of 2 minutes using an extruder to obtain pellets of the fluorine-containing polymer (this fluorine-containing polymer is hereinafter referred to as (E-3)).

Production of Electrically Conductive Fluorine-Containing Polymer (E-4)

Pellets of an electrically conductive fluorine-containing polymer were obtained using the same method as in the production of electrically conductive fluorine-containing polymer (E-2) with the exception of changing the fluorine-containing polymer (E-1) in the production of electrically conductive fluorine-containing polymer (E-2) to fluorine-containing polymer (E-3) (this electrically conductive fluorine-containing polymer is hereinafter referred to as (E-4)).

Production of Fluorine-Containing Polymer (E-5)

A polymerization tank having an internal volume of 100 L and equipped with a stirrer was degassed and charged with 42.5 kg of 1,3-dichloro-1,1,2,2,3-pentafluoropropane, $CF_2=CFOCF_2CF_2CF_3$ (perfluoro(propyl vinyl ether): PPVE), 2.13 kg of 1,1,2,4,4,5,5,6,6,6-decafluoro-3-oxahex-1-ene) and 51.0 kg of hexafluoropropylene (HFP). Next, the temperature inside the polymerization tank was raised to 50° C. followed by charging the tank with 4.25 kg of tetrafluoroethylene (TFE) and raising the pressure to 1.0 MPa/G. The tank was then charged with 340 cm$^3$ of a polymerization initiator in the form of a 1,3-dichloro-1,1,2,2,3-pentafluoropropane solution containing 0.3% by mass of (perfluorobutyryl)peroxide to initiate polymerization followed by charging the tank with 340 cm$^3$ of the polymerization initiator solution every ten minutes thereafter. During polymerization, the tank was continuously charged with TFE so as to maintain the pressure at 1.0 MPa/G. In addition, an amount of 1,3-dichloro-1,1,2,2,3-pentafluoropropane solution containing 0.3% by mass of 5-norbornene-2,3-dicarboxylic anhydride (NAH) equivalent to 0.1 mol % based on the number of moles of TFE charged during polymerization was continuously charged into the polymerization tank. The temperature inside the polymerization tank was lowered to room temperature and the tank was purged to return the pressure to normal pressure at the point 8.5 kg of TFE had been charged into the tank 5 hours after the start of polymerization. The resulting slurry-like fluorine-containing polymer was placed in a 200 L granulation tank charged with 75.0 kg of water followed by granulating while distilling off the solvent by raising the temperature to 105° C. and stirring. The resulting granules were then dried for 5 hours at 150° C. to obtain 7.5 kg of granules of a fluorine-containing polymer.

The composition of the fluorine-containing polymer was such that the ratio of a polymer unit based on TFE, a polymer unit based on PPVE, a polymer unit based on HFP and a polymer unit based on NAH was 91.2:1.5:7.2:0.1 (mol %), and the melting point thereof was 262° C. These granules were melted at 300° C. and residence time of 2 minutes using an extruder to obtain pellets of the fluorine-containing polymer (this fluorine-containing polymer is hereinafter referred to as (E-5)).

Production of Electrically Conductive Fluorine-Containing Polymer (E-6)

Pellets of an electrically conductive fluorine-containing polymer were obtained using the same method as in the production of electrically conductive fluorine-containing polymer (E-2) with the exception of changing the fluorine-containing polymer (E-1) in the production of electrically conductive fluorine-containing polymer (E-2) to fluorine-containing polymer (E-5), changing the 13 parts by mass of carbon black to 11 parts by mass, and changing the cylinder temperature from 300° C. to 320° C. (this electrically conductive fluorine-containing polymer is hereinafter referred to as (E-6)).

Production of Fluorine-Containing Polymer (E-7)

7.6 kg of fluorine-containing polymer were obtained using the same method as in the production of fluorine-containing polymer (E-5) with the exception of not charging the 1,3-dichloro-1,1,2,2,3-pentafluoropropane solution containing 0.3% by mass of 5-norbornene-2,3-dicarboxylic anhydride (NAH) in the production of fluorine-containing polymer (E-5).

The composition of the fluorine-containing polymer was such that the ratio of a polymer unit based on TFE, a polymer unit based on PPVE, and a polymer unit based on HFP was 91.5:1.5:7.0 (mol %), and the melting point thereof was 257° C. These granules were melted at 300° C. and residence time of 2 minutes using an extruder to obtain pellets of the fluorine-containing polymer (this fluorine-containing polymer is hereinafter referred to as (E-7)).

Production of Fluorine-Containing Polymer (E-8)

After charging 51.5 kg of demineralized pure water into a jacketed polymerization tank equipped with a stirrer and able to house 174 kg of water, and adequately replacing the space inside the tank with pure nitrogen gas, the nitrogen gas was removed by drawing a vacuum. Next, 40.6 kg of octafluorocyclobutane, 1.6 kg of chlorotrifluoroethylene (CTFE), 4.5 kg of tetrafluoroethylene (TFE) and 2.8 kg of perfluoro(propylvinylether) (PPVE) were injected under pressure. 0.090 kg of a chain transfer agent in the form of n-propyl alcohol was added followed by adjusting the temperature to 35° C. and beginning stirring. 0.44 kg of a methanol solution containing 50% by mass of a polymerization initiator in the form of di-n-propylperoxydicarbonate was added thereto to initiate polymerization. During polymerization, after polymerizing while additionally charging a mixed monomer prepared to have the same composition as the desired copolymer composition so as to maintain the pressure inside the tank at 0.66 MPa, residual gas in the tank was evacuated and the polymer formed was removed, washed with demineralized pure water and dried to obtain 30.5 kg of a fluorine-containing polymer in the form of a granular powder.

The composition of the fluorine-containing polymer was such that the molar ratio of a polymer unit based on CTFE, a polymer unit based on TFE and a polymer unit based on PPVE was 24.4:73.1:2.5, and the number of carbonate terminal groups derived from the polymerization initiator of the fluorine-containing polymer was 170. In addition, the melting point was 241° C. These granules were melted at 290° C. and residence time of 2 minutes using an extruder to obtain pellets of the fluorine-containing polymer (this fluorine-containing polymer is hereinafter referred to as (E-8)).

Production of Electrically Conductive Fluorine-Containing Polymer (E-9)

Pellets of an electrically conductive fluorine-containing polymer were obtained using the same method as in the production of electrically conductive fluorine-containing polymer (E-6) with the exception of changing the fluorine-containing polymer (E-5) in the production of electrically conductive fluorine-containing polymer (E-6) to fluorine-containing polymer (E-8) (this electrically conductive fluorine-containing polymer is hereinafter referred to as (E-9)).

Production of Fluorine-Containing Polymer (E-10)

29.8 kg of fluorine-containing polymer were obtained using the same method as in the production of fluorine-containing polymer (E-8) with the exception of not charging the methanol solution containing 50% by mass of di-n-propylperoxydicarbonate in the production of fluorine-containing polymer (E-8).

The composition of the fluorine-containing polymer was such that the molar ratio of a polymer unit based on CTFE, a polymer unit based on TFE, a polymer unit based on PPVE was 24.4/73.1/2.5 and the melting point thereof was 241° C. These granules were melted at 290° C. and residence time of 2 minutes using an extruder to obtain pellets of the fluorine-containing polymer (this fluorine-containing polymer is hereinafter referred to as (E-10)).

Example 1

Using the previously indicated Polyamide 12 composition (A-1), Polyamide 6 composition (B1-1), Polyamide 6/66/12 composition (B2-1), EVOH (C-1) and semi-aromatic polyamide composition (D1-1), (A-1) was melted at an extrusion temperature of 250° C., (B1-1) was melted at an extrusion temperature of 260° C., (B2-1) was melted at an extrusion temperature of 260° C., (C-1) was melted at an extrusion temperature of 220° C. and (D1-1) was melted at an extrusion temperature of 300° C. using separate Plabor (Research Laboratory of Plastics Technology Co., Ltd.) five-layer tube-forming machines, and the discharged molten resins were joined with an adapter to form a multilayer tubular body. Continuing, the multilayer tubular body was cooled with a sizing die for controlling dimensions followed by drawing the tubular body to obtain a multilayer tube having an inner diameter of 6 mm, outer diameter of 8 mm and layer configuration of (a)/(b)/(c)/(b')/(d) of 0.35/0.15/0.10/0.25/0.15 mm when defining the layer composed of (A-1) (outermost layer) as layer (a), the layer composed of (B2-1) (outer layer) as layer (b), the layer composed of (C-1) (intermediate layer) as layer (c), the layer composed of (B1-1) (inner layer 1) as layer (b'), and the layer composed of (D1-1) (innermost layer) as layer (d). The results of measuring the properties of this multilayer tube are shown in Table 1.

Example 2

A multilayer tube having an inner diameter of 6 mm, outer diameter of 8 mm and layer configuration of (a)/(b)/(c)/(b)/(d) of 0.35/0.15/0.10/0.25/0.15 mm when defining the layer composed of (A-1) (outermost layer) as layer (a), the layer composed of (B2-1) (outer layer, inner layer 1) as layer (b), the layer composed of (C-1) (intermediate layer) as layer (c), and the layer composed of (D1-1) (innermost layer) as layer (d) was obtained using the same method as Example 1 with the exception of changing the Polyamide 6 composition (B1-1) in Example 1 to Polyamide 6/66/12 composition (B2-1). The results of measuring the properties of this multilayer tube are shown in Table 1.

Example 3

Using the previously indicated Polyamide 12 composition (A-2), Polyamide 6 composition (B1-1), EVOH (C-1) and semi-aromatic polyamide composition (D1-1), (A-2) was melted at an extrusion temperature of 250° C., (B1-1) was melted at an extrusion temperature of 260° C., (C-1) was melted at an extrusion temperature of 220° C. and (D1-1) was melted at an extrusion temperature of 300° C. using separate Plabor (Research Laboratory of Plastics Technology Co., Ltd.) six-layer tube-forming machines, and the discharged molten resins were joined with an adapter to form a multilayer tubular body. Continuing, the multilayer tubular body was cooled with a sizing die for controlling dimensions followed by drawing the tubular body to obtain a multilayer tube having an inner diameter of 6 mm, outer diameter of 8 mm and layer configuration of (a)/(d)/(b)/(c)/(b)/(d) of 0.30/0.10/0.15/0.10/0.25/0.10 mm when defining the layer composed of (A-2) (outermost layer) as layer (a), the layer composed of (D1-1) (outer layer, innermost layer) as layer (d), the layer composed of (B1-1) (intermediate layer, inner layer 2) as layer (b), and the layer composed of (C-1) (inner layer 1) as layer (c). The results of measuring the properties of this multilayer tube are shown in Table 1.

Example 4

A multilayer tube having the layer configuration shown in Table 1 was obtained using the same method as Example 1 with the exception of changing the Polyamide 12 composition (A-1) used in Example 1 to Polyamide 610 composition (A-4) and changing the extrusion temperature of (A-4) to 260° C. The results of measuring the properties of this multilayer tube are shown in Table 1.

Example 5

A multilayer tube having the layer configuration shown in Table 1 was obtained using the same method as Example 1 with the exception of changing the Polyamide 12 composition (A-1) used in Example 1 to Polyamide 612 composition (A-5) and changing the extrusion temperature of (A-5) to 260° C. The results of measuring the properties of this multilayer tube are shown in Table 1.

Example 6

A multilayer tube having the layer configuration shown in Table 1 was obtained using the same method as Example 1 with the exception of changing the Polyamide 6/66/12 composition (B2-1) used in Example 1 to (B2-2). The results of measuring the properties of this multilayer tube are shown in Table 1.

Example 7

A multilayer tube having the layer configuration shown in Table 1 was obtained using the same method as Example 1 with the exception of changing the semi-aromatic polyamide composition (D1-1) used in Example 1 to (D1-2) and changing the extrusion temperature of (D1-2) to 330° C. The results of measuring the properties of this multilayer tube are shown in Table 1.

Example 8

A multilayer tube having the layer configuration shown in Table 1 was obtained using the same method as Example 1 with the exception of changing the semi-aromatic polyamide composition (D1-1) used in Example 1 to (D1-3) and changing the extrusion temperature of (D1-3) to 310° C. The results of measuring the properties of this multilayer tube are shown in Table 1.

Example 9

A multilayer tube having the layer configuration shown in Table 1 was obtained using the same method as Example 1 with the exception of changing the semi-aromatic polyamide composition (D1-1) used in Example 1 to (D1-4) and changing the extrusion temperature of (D1-4) to 340° C. The results of measuring the properties of this multilayer tube are shown in Table 1.

Example 10

A multilayer tube having the layer configuration shown in Table 1 was obtained using the same method as Example 2 with the exception of changing the semi-aromatic polyamide composition (D1-1) used in Example 2 to (D1-5) and changing the extrusion temperature of (D1-5) to 290° C. The results of measuring the properties of this multilayer tube are shown in Table 1.

Example 11

A multilayer tube having the layer configuration shown in Table 1 was obtained using the same method as Example 2 with the exception of changing the semi-aromatic polyamide composition (D1-1) used in Example 2 to (D1-6) and changing the extrusion temperature of (D1-6) to 310° C. The results of measuring the properties of this multilayer tube are shown in Table 1.

Example 12

A multilayer tube having the layer configuration shown in Table 1 was obtained using the same method as Example 1 with the exception of changing the semi-aromatic polyamide composition (D1-1) used in Example 1 to electrically conductive semi-aromatic polyamide composition (D1-7) and changing the extrusion temperature of (D1-7) to 310° C. The results of measuring the properties of this multilayer tube are shown in Table 1. In addition, when the electrical conductivity of this multilayer tube was measured in compliance

Example 13

A multilayer tube having the layer configuration shown in Table 1 was obtained using the same method as Example 2 with the exception of changing the semi-aromatic polyamide composition (D1-1) used in Example 2 to (D2-1) and changing the extrusion temperature of (D2-1) to 320° C. The results of measuring the properties of this multilayer tube are shown in Table 1.

Example 14

A multilayer tube having the layer configuration shown in Table 1 was obtained using the same method as Example 2 with the exception of changing the semi-aromatic polyamide composition (D1-1) used in Example 2 to (D2-2) and changing the extrusion temperature of (D2-2) to 310° C. The results of measuring the properties of this multilayer tube are shown in Table 1.

Example 15

A multilayer tube having the layer configuration shown in Table 1 was obtained using the same method as Example 2 with the exception of changing the semi-aromatic polyamide composition (D1-1) used in Example 2 to (D2-3) and changing the extrusion temperature of (D2-3) to 240° C. The results of measuring the properties of this multilayer tube are shown in Table 1.

Example 16

A multilayer tube having the layer configuration shown in Table 1 was obtained using the same method as Example 2 with the exception of changing the semi-aromatic polyamide composition (D1-1) used in Example 2 to (D2-4) and changing the extrusion temperature of (D2-4) to 230° C. The results of measuring the properties of this multilayer tube are shown in Table 1.

Example 17

A multilayer tube having the layer configuration shown in Table 1 was obtained using the same method as Example 2 with the exception of changing the semi-aromatic polyamide composition (D1-1) used in Example 2 to (D2-5) and changing the extrusion temperature of (D2-5) to 260° C. The results of measuring the properties of this multilayer tube are shown in Table 1.

Example 18

A multilayer tube having the layer configuration shown in Table 1 was obtained using the same method as Example 2 with the exception of changing the semi-aromatic polyamide composition (D1-1) used in Example 2 to (D2-6) and changing the extrusion temperature of (D2-6) to 310° C. The results of measuring the properties of this multilayer tube are shown in Table 1.

Example 19

Using the previously indicated Polyamide 12 composition (A-1), the Polyamide 6 composition (B1-1), the Polyamide 6/66/12 composition (B2-1), EVOH (C-1), the semi-aromatic polyamide composition (D1-1) and the electrically conductive semi-aromatic composition (D1-7), (A-1) was melted at an extrusion temperature of 250° C., (B1-1) was melted at an extrusion temperature of 260° C., (B2-1) was melted at an extrusion temperature of 260° C., (C-1) was melted at an extrusion temperature of 220° C., (D1-1) was melted at an extrusion temperature of 300° C. and (D1-7) was melted at an extrusion temperature of 310° C. using separate Plabor (Research Laboratory of Plastics Technology Co., Ltd.) six-layer tube-forming machines, and the discharged molten resins were joined with an adapter to form multilayer tubular body. Continuing, the multilayer tubular body was cooled with a sizing die for controlling dimensions followed by drawing the tubular body to obtain a multilayer tube having an inner diameter of 6 mm, outer diameter of 8 mm and layer configuration of (a)/(b)/(c)/(b')/(d)/(d') of 0.30/0.15/0.10/0.25/0.10/0.10 mm when defining the layer composed of (A-1) (outermost layer) as layer (a), the layer composed of (B2-1) (outer layer) as layer (b), the layer composed of (C-1) (intermediate layer) as layer (c), the layer composed of (B1-1) (inner layer 1) as layer (b'), the layer composed of (D1-1) (inner layer 2) as layer (d), and the layer composed of (D1-7) (innermost layer) as layer (d'). The results of measuring the properties of this multilayer tube are shown in Table 1. In addition, when the electrical conductivity of this multilayer tube was measured in compliance with SAE J-2260, it was determined to be $10^6$ Ω/square or less, thereby confirming superior antistatic performance.

Comparative Example 1

A multilayer tube having the layer configuration shown in Table 1 was obtained using the same method as Example 1 with the exception of not using the EVOH (C-1) and semi-aromatic polyamide composition (D1-1) used in Example 1. The results of measuring the properties of this multilayer tube are shown in Table 1.

Comparative Example 2

A multilayer tube having the layer configuration shown in Table 1 was obtained using the same method as Example 1 with the exception of not using the semi-aromatic polyamide composition (D1-1) used in Example 1. The results of measuring the properties of this multilayer tube are shown in Table 1.

Comparative Example 3

A multilayer tube having the layer configuration shown in Table 1 was obtained using the same method as Example 3 with the exception of not using the semi-aromatic polyamide composition (D1-1) used in Example 3. The results of measuring the properties of this multilayer tube are shown in Table 1.

Comparative Example 4

A multilayer tube having the layer configuration shown in Table 1 was obtained using the same method as Example 1 with the exception of not using the Polyamide 12 composition (A-1), Polyamide 6 composition (B1-1) and Polyamide 6/66/12 composition (B2-1) used in Example 1. The results of measuring the properties of this multilayer tube are shown in Table 1.

Comparative Example 5

A multilayer tube having the layer configuration shown in Table 1 was obtained using the same method as Example 1 with the exception of not using the Polyamide 6 composition (B1-1) and Polyamide 6/66/12 composition (B2-1) used in Example 1. The results of measuring the properties of this multilayer tube are shown in Table 1.

Comparative Example 6

A multilayer tube having the layer configuration shown in Table 1 was obtained using the same method as Example 2 with the exception of changing the Polyamide 6/66/12 composition (B2-1) used in Example 2 to (B2-3). The results of measuring the properties of this multilayer tube are shown in Table 1.

Comparative Example 7

A multilayer tube having the layer configuration shown in Table 1 was obtained using the same method as Example 2 with the exception of changing the Polyamide 6/66/12 composition (B2-1) used in Example 2 to (B2-4). The results of measuring the properties of this multilayer tube are shown in Table 1.

Comparative Example 8

A multilayer tube having the layer configuration shown in Table 1 was obtained using the same method as Example 2 with the exception of changing the Polyamide 6/66/12 composition (B2-1) used in Example 2 to (B2-5). The results of measuring the properties of this multilayer tube are shown in Table 1.

Comparative Example 9

A multilayer tube having the layer configuration shown in Table 1 was obtained using the same method as Example 1 with the exception of changing the semi-aromatic polyamide composition (D1-1) used in Example 1 to (D1-8) and changing the extrusion temperature of (D1-8) to 330° C. The results of measuring the properties of this multilayer tube are shown in Table 1.

Comparative Example 10

A multilayer tube having the layer configuration shown in Table 1 was obtained using the same method as Example 1 with the exception of changing the semi-aromatic polyamide composition (D1-1) used in Example 1 to (D2-7) and changing the extrusion temperature of (D2-7) to 280° C. The results of measuring the properties of this multilayer tube are shown in Table 1.

Comparative Example 11

A multilayer tube having the layer configuration shown in Table 1 was obtained using the same method as Example 3 with the exception of changing the semi-aromatic polyamide composition (D1-1) used in Example 3 to (D1-8) and changing the extrusion temperature of (D1-8) to 330° C. The results of measuring the properties of this multilayer tube are shown in Table 1.

Comparative Example 12

A multilayer tube having the layer configuration shown in Table 1 was obtained using the same method as Example 3 with the exception of changing the semi-aromatic polyamide composition (D1-1) used in Example 3 to (D2-7) and changing the extrusion temperature of (D2-7) to 280° C. The results of measuring the properties of this multilayer tube are shown in Table 1.

Comparative Example 13

A multilayer tube having the layer configuration shown in Table 1 was obtained using the same method as Example 1 with the exception of changing the semi-aromatic polyamide composition (D1-1) used in Example 1 to Polyamide 12 composition (A-2) and changing the extrusion temperature of (A-2) to 250° C. The results of measuring the properties of this multilayer tube are shown in Table 1.

Comparative Example 14

A multilayer tube having the layer configuration shown in Table 1 was obtained using the same method as Example 1 with the exception of changing the semi-aromatic polyamide composition (D1-1) used in Example 1 to electrically conductive Polyamide 12 composition (A-3) and changing the extrusion temperature of (A-3) to 270° C. The results of measuring the properties of this multilayer tube are shown in Table 1. In addition, when the electrical conductivity of this multilayer tube was measured in compliance with SAE J-2260, it was determined to be $10^6$ Ω/square or less, thereby confirming superior antistatic performance.

TABLE 1

| | Outermost layer | | Outer layer | | Intermediate layer | | Inner layer 1 | | Inner layer 2 | | Innermost layer | |
|---|---|---|---|---|---|---|---|---|---|---|---|---|
| | Type | Thickness (mm) | Type | Thickness (mm) | Type | Thickness (mm) | Type | Thickness (mm) | Type | Thickness (mm) | Type | Thickness (mm) |
| Example 1 | A-1 | 0.35 | B2-1 | 0.15 | C-1 | 0.10 | B1-1 | 0.25 | — | — | D1-1 | 0.15 |
| Example 2 | A-1 | 0.35 | B2-1 | 0.15 | C-1 | 0.10 | B2-1 | 0.25 | — | — | D1-1 | 0.15 |
| Example 3 | A-2 | 0.30 | D1-1 | 0.10 | B1-1 | 0.10 | C-1 | 0.10 | B1-1 | 0.25 | D1-1 | 0.15 |
| Example 4 | A-4 | 0.35 | B2-1 | 0.15 | C-1 | 0.10 | B1-1 | 0.25 | — | — | D1-1 | 0.15 |
| Example 5 | A-5 | 0.35 | B2-1 | 0.15 | C-1 | 0.10 | B1-1 | 0.25 | — | — | D1-1 | 0.15 |
| Example 6 | A-1 | 0.35 | B2-2 | 0.15 | C-1 | 0.10 | B1-1 | 0.25 | — | — | D1-1 | 0.15 |
| Example 7 | A-1 | 0.35 | B2-1 | 0.15 | C-1 | 0.10 | B1-1 | 0.25 | — | — | D1-2 | 0.15 |
| Example 8 | A-1 | 0.35 | B2-1 | 0.15 | C-1 | 0.10 | B1-1 | 0.25 | — | — | D1-3 | 0.15 |
| Example 9 | A-1 | 0.35 | B2-1 | 0.15 | C-1 | 0.10 | B2-1 | 0.25 | — | — | D1-4 | 0.15 |
| Example 10 | A-1 | 0.35 | B2-1 | 0.15 | C-1 | 0.10 | B2-1 | 0.25 | — | — | D1-5 | 0.15 |
| Example 11 | A-1 | 0.35 | B2-1 | 0.15 | C-1 | 0.10 | B2-1 | 0.25 | — | — | D1-6 | 0.15 |
| Example 12 | A-1 | 0.35 | B2-1 | 0.15 | C-1 | 0.10 | B1-1 | 0.25 | — | — | D1-7 | 0.15 |

TABLE 1-continued

| | | | | | | | | | | | | |
|---|---|---|---|---|---|---|---|---|---|---|---|---|
| Example 13 | A-1 | 0.35 | B2-1 | 0.15 | C-1 | 0.10 | B2-1 | 0.25 | — | — | D2-1 | 0.15 |
| Example 14 | A-1 | 0.35 | B2-1 | 0.15 | C-1 | 0.10 | B2-1 | 0.25 | — | — | D2-2 | 0.15 |
| Example 15 | A-1 | 0.35 | B2-1 | 0.15 | C-1 | 0.10 | B2-1 | 0.25 | — | — | D2-3 | 0.15 |
| Example 16 | A-1 | 0.35 | B2-1 | 0.15 | C-1 | 0.10 | B2-1 | 0.25 | — | — | D2-4 | 0.15 |
| Example 17 | A-1 | 0.35 | B2-1 | 0.15 | C-1 | 0.10 | B2-1 | 0.25 | — | — | D2-5 | 0.15 |
| Example 18 | A-1 | 0.35 | B2-1 | 0.15 | C-1 | 0.10 | B2-1 | 0.25 | — | — | D2-6 | 0.15 |
| Example 19 | A-1 | 0.30 | B2-1 | 0.15 | C-1 | 0.10 | B1-1 | 0.25 | D1-1 | 0.10 | D1-7 | 0.10 |
| Comparative Example 1 | A-1 | 0.45 | B2-1 | 0.15 | — | — | B1-1 | 0.40 | — | — | — | — |
| Comparative Example 2 | A-1 | 0.45 | B2-1 | 0.15 | C-1 | 0.10 | B1-1 | 0.30 | — | — | — | — |
| Comparative Example 3 | A-1 | 0.45 | — | — | B1-1 | 0.10 | C-1 | 0.10 | B1-1 | 0.35 | — | — |
| Comparative Example 4 | — | — | — | — | C-1 | 0.50 | — | — | — | — | D1-1 | 0.50 |
| Comparative Example 5 | A-1 | 0.75 | — | — | C-1 | 0.10 | — | — | — | — | D1-1 | 0.15 |
| Comparative Example 6 | A-1 | 0.35 | B2-3 | 0.15 | C-1 | 0.10 | B2-3 | 0.25 | — | — | D1-1 | 0.15 |
| Comparative Example 7 | A-1 | 0.35 | B2-4 | 0.15 | C-1 | 0.10 | B2-4 | 0.25 | — | — | D1-1 | 0.15 |
| Comparative Example 8 | A-1 | 0.35 | B2-5 | 0.15 | C-1 | 0.10 | B2-5 | 0.25 | — | — | D1-1 | 0.15 |
| Comparative Example 9 | A-1 | 0.35 | B2-1 | 0.15 | C-1 | 0.10 | B1-1 | 0.25 | — | — | D1-8 | 0.15 |
| Comparative Example 10 | A-1 | 0.35 | B2-1 | 0.15 | C-1 | 0.10 | B1-1 | 0.25 | — | — | D2-7 | 0.15 |
| Comparative Example 11 | A-2 | 0.30 | D1-8 | 0.10 | B1-1 | 0.10 | C-1 | 0.10 | B1-1 | 0.25 | D1-8 | 0.15 |
| Comparative Example 12 | A-2 | 0.30 | D2-7 | 0.10 | B1-1 | 0.10 | C-1 | 0.10 | B1-1 | 0.25 | D2-7 | 0.15 |
| Comparative Example 13 | A-1 | 0.35 | B2-1 | 0.15 | C-1 | 0.10 | B2-1 | 0.15 | — | — | A-2 | 0.25 |
| Comparative Example 14 | A-1 | 0.35 | B2-1 | 0.15 | C-1 | 0.10 | B2-1 | 0.15 | — | — | A-3 | 0.25 |

| | Low-temperature impact resistance (no. of test tubes ruptured/no. of test tubes) | Deteriorated fuel resistance (no. of test tubes ruptured/no. of test tubes) | Alcohol-containing gasoline permeation (CE10) (g/m² · day) | Peel strength (N/cm) Initial | Peel strength (N/cm) After heat treatment | Monomer/oligomer elution test Eluted amount (g/m² · day) | Fuel color after treatment |
|---|---|---|---|---|---|---|---|
| Example 1 | 0/10 | 0/10 | 1.7 | 83 | 50 | 0.03 | Transparent |
| Example 2 | 0/10 | 0/10 | 1.7 | 84 | 51 | 0.03 | Transparent |
| Example 3 | 0/10 | 0/10 | 1.6 | 51 | 35 | 0.03 | Transparent |
| Example 4 | 0/10 | 0/10 | 1.6 | Unable to be peeled | 56 | 0.03 | Transparent |
| Example 5 | 0/10 | 0/10 | 1.6 | Unable to be peeled | 57 | 0.03 | Transparent |
| Example 6 | 0/10 | 0/10 | 1.7 | 82 | 51 | 0.03 | Transparent |
| Example 7 | 0/10 | 0/10 | 1.6 | 80 | 50 | 0.03 | Transparent |
| Example 8 | 0/10 | 0/10 | 1.3 | 79 | 49 | 0.03 | Transparent |
| Example 9 | 0/10 | 0/10 | 1.8 | 78 | 50 | 0.03 | Transparent |
| Example 10 | 0/10 | 0/10 | 1.9 | 76 | 48 | 0.06 | Transparent |
| Example 11 | 0/10 | 0/10 | 1.9 | 83 | 52 | 0.04 | Transparent |
| Example 12 | 0/10 | 0/10 | 1.7 | 80 | 51 | 0.03 | Transparent |
| Example 13 | 0/10 | 0/10 | 1.9 | 76 | 45 | 0.03 | Transparent |
| Example 14 | 0/10 | 0/10 | 1.8 | 75 | 47 | 0.03 | Transparent |
| Example 15 | 0/10 | 0/10 | 1.9 | 69 | 43 | 0.03 | Transparent |
| Example 16 | 0/10 | 0/10 | 2.1 | 58 | 42 | 0.03 | Transparent |
| Example 17 | 0/10 | 0/10 | 2.0 | 65 | 43 | 0.03 | Transparent |
| Example 18 | 0/10 | 0/10 | 1.4 | 56 | 40 | 0.03 | Transparent |
| Example 19 | 0/10 | 0/10 | 1.6 | 75 | 48 | 0.03 | Transparent |
| Comparative Example 1 | 0/10 | 5/10 | 65 | 80 | 49 | 0.08 | Transparent |
| Comparative Example 2 | 0/10 | 7/10 | 1.9 | 79 | 47 | 0.08 | Transparent |
| Comparative Example 3 | 0/10 | 8/10 | 1.9 | 3 | 0 | 0.08 | Transparent |
| Comparative Example 4 | 10/10 | 10/10 | 0.4 | 35 | 10 | 0.03 | Transparent |
| Comparative Example 5 | 0/10 | 0/10 | 1.7 | 5 | 0 | 0.03 | Transparent |
| Comparative Example 6 | 0/10 | 0/10 | 1.7 | 42 | 8 | 0.03 | Transparent |
| Comparative Example 7 | 0/10 | 0/10 | 1.7 | 55 | 3 | 0.03 | Transparent |
| Comparative Example 8 | 0/10 | 0/10 | 1.7 | 45 | 11 | 0.03 | Transparent |
| Comparative Example 9 | 2/10 | 10/10 | 1.6 | 76 | 43 | 0.03 | Transparent |
| Comparative Example 10 | 3/10 | 10/10 | 1.6 | 78 | 45 | 0.03 | Transparent |
| Comparative Example 11 | 5/10 | 10/10 | 1.4 | 3 | 0 | 0.03 | Transparent |
| Comparative Example 12 | 4/10 | 10/10 | 1.4 | 4 | 0 | 0.03 | Transparent |
| Comparative Example 13 | 0/10 | 0/10 | 2.1 | 79 | 45 | 0.50 | Cloudy |
| Comparative Example 14 | 0/10 | 0/10 | 2.2 | 78 | 42 | 0.50 | Cloudy |

As is clear from Table 1, the multilayer tube of Comparative Example 1, which does not have a layer comprising the saponified ethylene-vinyl acetate copolymer or layer comprising the semi-aromatic polyamide composition defined in the present invention, demonstrated inferior deteriorated fuel resistance and chemical impermeability, the multilayer tube of Comparative Example 2, which does not have a layer comprising the semi-aromatic polyamide composition defined in the present invention but does have a layer comprising Polyamide 6 for the innermost layer, demonstrated inferior deteriorated fuel resistance, and the multilayer tube of Comparative Example 3, which does not have a layer comprising the semi-aromatic polyamide composition defined in the present invention but does have a Polyamide 6 composition for the innermost layer, demonstrated inferior deteriorated fuel resistance and interlayer adhesion. The multilayer tube of Comparative Example 4, which does not have a layer comprising the aliphatic polyamide or layer comprising the Polyamide 6 composition or Polyamide 6/66/12 composition defined in the present invention, demonstrated inferior low-temperature impact resistance, deteriorated fuel resistance and post-heat treatment interlayer adhesion. The multilayer tube of Comparative Example 5, which does not have a layer comprising the Polyamide 6 composition or Polyamide 6/66/12 composition defined in the present invention, demonstrated inferior interlayer adhesion. The multilayer tubes of Comparative Examples 6 to 8, which have layers comprising a Polyamide 6/66/12 composition other than that defined in the present invention or a Polyamide 6/12 composition, demonstrated inferior post-heat treatment interlayer adhesion. The multilayer tubes of Comparative Examples 9 and 10, which have layers comprising a semi-aromatic polyamide composition other than that defined in the present invention, demonstrated inferior low-temperature impact resistance and deteriorated fuel resistance. The multilayer tubes of Comparative Examples 11 and 12, which have layers comprising a semi-aromatic polyamide composition other than that defined in the present invention, demonstrated inferior low-temperature impact resistance, deteriorated fuel resistance and interlayer adhesion. The multilayer tubes of Comparative Examples 13 and 14, which do not have layers comprising the semi-aromatic polyamide composition defined in the present invention, but do have layers comprising a Polyamide 12 composition for the innermost layer, demonstrated inferior monomer and oligomer elution resistance.

On the other hand, the multilayer tubes of Examples 1 to 19 defined in the present invention clearly demonstrated favorable properties with respect to low-temperature impact resistance, deteriorated fuel resistance, chemical impermeability, interlayer adhesion and durability thereof, and monomer and oligomer elution resistance.

Example 21

Using the previously indicated Polyamide 12 composition (A-1), Polyamide 6 composition (B1-1), Polyamide 6/66/12 composition (B2-1), EVOH (C-1), semi-aromatic polyamide composition (D1-1) and fluorine-containing polymer (E-1), (A-1) was melted at an extrusion temperature of 250° C., (B1-1) was melted at an extrusion temperature of 260° C., (B2-1) was melted at an extrusion temperature of 260° C., (C-1) was melted at an extrusion temperature of 220° C., (D1-1) was melted at an extrusion temperature of 300° C. and (E-1) was melted at an extrusion temperature of 300° C. using separate Plabor (Research Laboratory of Plastics Technology Co., Ltd.) six-layer tube-forming machines, and the discharged molten resins were joined with an adapter to form a multilayer tubular body. Continuing, the multilayer tubular body was cooled with a sizing die for controlling dimensions followed by drawing the tubular body to obtain a multilayer tube having an inner diameter of 6 mm, outer diameter of 8 mm and layer configuration of (a)/(b)/(c)/(b')/(d)/(e) of 0.30/0.15/0.10/0.25/0.10/0.10 mm when defining the layer composed of (A-1) (outermost layer) as layer (a), the layer composed of (B2-1) (outer layer) as layer (b), the layer composed of (C-1) (intermediate layer) as layer (c), the layer composed of (B1-1) (inner layer 1) as layer (b'), and the layer composed of (D1-1) (inner layer 2) as layer (d), and the layer composed of (E-1) (innermost layer) as layer (e). The results of measuring the properties of this multilayer tube are shown in Table 2.

Example 22

A multilayer tube having an inner diameter of 6 mm, outer diameter of 8 mm and layer configuration of (a)/(b)/(c)/(b)/(d)/(e) of 0.30/0.15/0.10/0.25/0.10/0.10 mm when defining the layer composed of (A-1) (outermost layer) as layer (a), the layer composed of (B2-1) (outer layer, inner layer 1) as layer (b), the layer composed of (C-1) (intermediate layer) as layer (c), the layer composed of (D1-1) (inner layer 2) as layer (d), and the layer composed of (E-1) (innermost layer) as layer (e) was obtained using the same method as Example 21 with the exception of changing the Polyamide 6 composition (B1-1) in Example 21 to Polyamide 6/66/12 composition (B2-1). The results of measuring the properties of this multilayer tube are shown in Table 2.

Example 23

A multilayer tube having an inner diameter of 6 mm, outer diameter of 8 mm and layer configuration of (a)/(d)/(b)/(c)/(b)/(e) of 0.30/0.10/0.15/0.10/0.25/0.10 mm when defining the layer composed of (A-1) (outermost layer) as layer (a), the layer composed of (D1-1) (outer layer) as layer (d), the layer composed of (B1-1) (intermediate layer, inner layer 2) as layer (b), the layer composed of (C-1) (inner layer 1) as layer (c), and the layer composed of (E-1) (innermost layer) as layer (e) was obtained using the same method as Example 21 with the exception of changing the Polyamide composition 12 (A-1) used in Example 21 to (A-2) and not using the Polyamide 6/66/12 composition (B2-1). The results of measuring the properties of this multilayer tube are shown in Table 2.

Example 24

A multilayer tube having the layer configuration shown in Table 2 was obtained using the same method as Example 23 with the exception of changing the Polyamide 12 composition (A-2) used in Example 23 to (A-4) and changing the extrusion temperature of (A-4) to 260° C. The results of measuring the properties of this multilayer tube are shown in Table 2.

Example 25

A multilayer tube having the layer configuration shown in Table 2 was obtained using the same method as Example 23 with the exception of changing the Polyamide 12 composition (A-2) used in Example 23 to (A-5) and changing the extrusion temperature of (A-5) to 260° C. The results of measuring the properties of this multilayer tube are shown in Table 2.

Example 26

A multilayer tube having the layer configuration shown in Table 2 was obtained using the same method as Example 21 with the exception of changing the Polyamide 6/66/12 composition (B2-1) used in Example 21 to (B2-2). The results of measuring the properties of this multilayer tube are shown in Table 2.

Example 27

A multilayer tube having the layer configuration shown in Table 2 was obtained using the same method as Example 21 with the exception of changing the semi-aromatic polyamide composition (D1-1) used in Example 21 to (D1-2) and changing the extrusion temperature of (D1-2) to 330° C. The results of measuring the properties of this multilayer tube are shown in Table 2.

Example 28

A multilayer tube having the layer configuration shown in Table 2 was obtained using the same method as Example 21 with the exception of changing the semi-aromatic polyamide composition (D1-1) used in Example 21 to (D1-3) and changing the extrusion temperature of (D1-3) to 310° C. The results of measuring the properties of this multilayer tube are shown in Table 2.

Example 29

A multilayer tube having the layer configuration shown in Table 2 was obtained using the same method as Example 22 with the exception of changing the semi-aromatic polyamide composition (D1-1) used in Example 22 to (D1-4) and changing the extrusion temperature of (D1-4) to 340° C. The results of measuring the properties of this multilayer tube are shown in Table 2.

Example 30

A multilayer tube having the layer configuration shown in Table 2 was obtained using the same method as Example 22 with the exception of changing the semi-aromatic polyamide composition (D1-1) used in Example 22 to (D1-5) and changing the extrusion temperature of (D1-5) to 290° C. The results of measuring the properties of this multilayer tube are shown in Table 2.

Example 31

A multilayer tube having the layer configuration shown in Table 2 was obtained using the same method as Example 22 with the exception of changing the semi-aromatic polyamide composition (D1-1) used in Example 22 to (D1-6) and changing the extrusion temperature of (D1-6) to 310° C. The results of measuring the properties of this multilayer tube are shown in Table 2.

Example 32

A multilayer tube having the layer configuration shown in Table 2 was obtained using the same method as Example 22 with the exception of changing the semi-aromatic polyamide composition (D1-1) used in Example 22 to (D2-1) and changing the extrusion temperature of (D2-1) to 320° C. The results of measuring the properties of this multilayer tube are shown in Table 2.

Example 33

A multilayer tube having the layer configuration shown in Table 2 was obtained using the same method as Example 22 with the exception of changing the semi-aromatic polyamide composition (D1-1) used in Example 22 to (D2-2) and changing the extrusion temperature of (D2-2) to 310° C. The results of measuring the properties of this multilayer tube are shown in Table 2.

Example 34

A multilayer tube having the layer configuration shown in Table 2 was obtained using the same method as Example 22 with the exception of changing the semi-aromatic polyamide composition (D1-1) used in Example 22 to (D2-3) and changing the extrusion temperature of (D2-3) to 240° C. The results of measuring the properties of this multilayer tube are shown in Table 2.

Example 35

A multilayer tube having the layer configuration shown in Table 2 was obtained using the same method as Example 22 with the exception of changing the semi-aromatic polyamide composition (D1-1) used in Example 22 to (D2-4) and changing the extrusion temperature of (D2-4) to 230° C. The results of measuring the properties of this multilayer tube are shown in Table 2.

Example 36

A multilayer tube having the layer configuration shown in Table 2 was obtained using the same method as Example 22 with the exception of changing the semi-aromatic polyamide composition (D1-1) used in Example 22 to (D2-5) and changing the extrusion temperature of (D2-5) to 260° C. The results of measuring the properties of this multilayer tube are shown in Table 2.

Example 37

A multilayer tube having the layer configuration shown in Table 2 was obtained using the same method as Example 22 with the exception of changing the semi-aromatic polyamide composition (D1-1) used in Example 22 to (D2-6) and changing the extrusion temperature of (D2-6) to 310° C. The results of measuring the properties of this multilayer tube are shown in Table 2.

Example 38

A multilayer tube having the layer configuration shown in Table 2 was obtained using the same method as Example 21 with the exception of changing the fluorine-containing polymer (E-1) used in Example 21 to electrically conductive fluorine-containing polymer (E-2) and changing the extrusion temperature of (E-2) to 310° C. The results of measuring the properties of this multilayer tube are shown in Table 2. In addition, when the electrical conductivity of this multilayer tube was measured in compliance with SAE J-2260, it was determined to be $10^6$ Ω/square or less, thereby confirming superior antistatic performance.

Example 39

A multilayer tube having the layer configuration shown in Table 2 was obtained using the same method as Example 21 with the exception of changing the fluorine-containing polymer (E-1) used in Example 21 to (E-5) and changing the extrusion temperature of (E-5) to 310° C. The results of measuring the properties of this multilayer tube are shown in Table 2.

Example 40

A multilayer tube having the layer configuration shown in Table 2 was obtained using the same method as Example 21 with the exception of changing the fluorine-containing polymer (E-1) used in Example 21 to electrically conductive fluorine-containing polymer (E-6) and changing the extrusion temperature of (E-6) to 320° C. The results of measuring the properties of this multilayer tube are shown in Table 2. In addition, when the electrical conductivity of this multilayer tube was measured in compliance with SAE J-2260, it was determined to be $10^6$ Ω/square or less, thereby confirming superior antistatic performance.

Example 41

A multilayer tube having the layer configuration shown in Table 2 was obtained using the same method as Example 21 with the exception of changing the fluorine-containing polymer (E-1) used in Example 21 to (E-8) and changing the extrusion temperature of (E-8) to 290° C. The results of measuring the properties of this multilayer tube are shown in Table 2.

Example 42

A multilayer tube having the layer configuration shown in Table 2 was obtained using the same method as Example 21 with the exception of changing the fluorine-containing polymer (E-1) used in Example 21 to electrically conductive fluorine-containing polymer (E-9). The results of measuring the properties of this multilayer tube are shown in Table 2. In addition, when the electrical conductivity of this multilayer tube was measured in compliance with SAE J-2260, it was determined to be $10^6$ Ω/square or less, thereby confirming superior antistatic performance.

Comparative Example 21

A multilayer tube having the layer configuration shown in Table 2 was obtained using the same method as Example 21 with the exception of not using the EVOH (C-1), semi-aromatic polyamide composition (D1-1) and fluorine-containing polymer (E-1) used in Example 21. The results of measuring the properties of this multilayer tube are shown in Table 2.

Comparative Example 22

A multilayer tube having the layer configuration shown in Table 2 was obtained using the same method as Example 23 with the exception of not using the semi-aromatic polyamide composition (D1-1) used in Example 23. The results of measuring the properties of this multilayer tube are shown in Table 2.

Comparative Example 23

A multilayer tube having the layer configuration shown in Table 2 was obtained using the same method as Example 23 with the exception of not using the Polyamide 12 composition (A-2) and Polyamide 6 composition (B1-1) used in Example 23. The results of measuring the properties of this multilayer tube are shown in Table 2.

Comparative Example 24

A multilayer tube having the layer configuration shown in Table 2 was obtained using the same method as Example 21 with the exception of not using the Polyamide 6 composition (B1-1) and Polyamide 6/66/12 composition (B2-1) used in Example 21. The results of measuring the properties of this multilayer tube are shown in Table 2.

Comparative Example 25

A multilayer tube having the layer configuration shown in Table 2 was obtained using the same method as Example 22 with the exception of changing the Polyamide 6/66/12 composition (B2-1) used in Example 22 to (B2-3). The results of measuring the properties of this multilayer tube are shown in Table 2.

Comparative Example 26

A multilayer tube having the layer configuration shown in Table 2 was obtained using the same method as Example 22 with the exception of changing the Polyamide 6/66/12 composition (B2-1) used in Example 22 to (B2-4). The results of measuring the properties of this multilayer tube are shown in Table 2.

Comparative Example 27

A multilayer tube having the layer configuration shown in Table 2 was obtained using the same method as Example 22 with the exception of changing the Polyamide 6/66/12 composition (B2-1) used in Example 22 to Polyamide 6/12 composition (B2-5). The results of measuring the properties of this multilayer tube are shown in Table 2.

Comparative Example 28

A multilayer tube having the layer configuration shown in Table 2 was obtained using the same method as Example 23 with the exception of changing the semi-aromatic polyamide composition (D1-1) used in Example 23 to (D1-8) and changing the extrusion temperature of (D1-8) to 330° C. The results of measuring the properties of this multilayer tube are shown in Table 2.

Comparative Example 29

A multilayer tube having the layer configuration shown in Table 2 was obtained using the same method as Example 23 with the exception of changing the semi-aromatic polyamide composition (D1-1) used in Example 23 to (D2-7) and changing the extrusion temperature of (D2-7) to 280° C. The results of measuring the properties of this multilayer tube are shown in Table 2.

Comparative Example 30

A multilayer tube having the layer configuration shown in Table 2 was obtained using the same method as Example 21 with the exception of changing the fluorine-containing polymer (E-1) used in Example 21 to (E-3). The results of measuring the properties of this multilayer tube are shown in Table 2.

Comparative Example 31

A multilayer tube having the layer configuration shown in Table 2 was obtained using the same method as Example 21 with the exception of changing the fluorine-containing polymer (E-1) used in Example 21 to electrically conductive fluorine-containing polymer (E-4) and changing the extrusion temperature of (E-4) to 310° C. The results of measuring the properties of this multilayer tube are shown in Table 2. In addition, when the electrical conductivity of this multilayer tube was measured in compliance with SAE J-2260, it was determined to be $10^6$ Ω/square or less, thereby confirming superior antistatic performance.

Comparative Example 32

A multilayer tube having the layer configuration shown in Table 2 was obtained using the same method as Example 21 with the exception of changing the fluorine-containing polymer (E-1) used in Example 21 to (E-7) and changing the extrusion temperature of (E-7) to 310° C. The results of measuring the properties of this multilayer tube are shown in Table 2.

Comparative Example 33

A multilayer tube having the layer configuration shown in Table 2 was obtained using the same method as Example 21 with the exception of changing the fluorine-containing polymer (E-1) used in Example 21 to (E-10). The results of measuring the properties of this multilayer tube are shown in Table 2.

Comparative Example 34

A multilayer tube having the layer configuration shown in Table 2 was obtained using the same method as Example 21 with the exception of changing the fluorine-containing polymer (E-1) used in Example 21 to Polyamide 12 composition (A-2) and changing the extrusion temperature of (A-2) to 250° C. The results of measuring the properties of this multilayer tube are shown in Table 2.

Comparative Example 35

A multilayer tube having the layer configuration shown in Table 2 was obtained using the same method as Example 21 with the exception of changing the fluorine-containing polymer (E-2) used in Example 21 to electrically conductive Polyamide 12 composition (A-3) and changing the extrusion temperature of (A-3) to 270° C. The results of measuring the properties of this multilayer tube are shown in Table 2. In addition, when the electrical conductivity of this multilayer tube was measured in compliance with SAE J-2260, it was determined to be $10^6$ Ω/square or less, thereby confirming superior antistatic performance.

TABLE 2

| | Outermost layer | | Outer layer | | Intermediate layer | | Inner layer 1 | | Inner layer 2 | | Innermost layer | |
|---|---|---|---|---|---|---|---|---|---|---|---|---|
| | Type | Thickness (mm) | Type | Thickness (mm) | Type | Thickness (mm) | Type | Thickness (mm) | Type | Thickness (mm) | Type | Thickness (mm) |
| Example 21 | A-1 | 0.30 | B2-1 | 0.15 | C-1 | 0.10 | B1-1 | 0.25 | D1-1 | 0.10 | E-1 | 0.10 |
| Example 22 | A-1 | 0.30 | B2-1 | 0.15 | C-1 | 0.10 | B2-1 | 0.25 | D1-1 | 0.10 | E-1 | 0.10 |
| Example 23 | A-2 | 0.30 | D1-1 | 0.10 | B1-1 | 0.15 | C-1 | 0.10 | B1-1 | 0.25 | E-1 | 0.10 |
| Example 24 | A-4 | 0.30 | D1-1 | 0.10 | B1-1 | 0.15 | C-1 | 0.10 | B1-1 | 0.25 | E-1 | 0.10 |
| Example 25 | A-5 | 0.30 | D1-1 | 0.10 | B1-1 | 0.15 | C-1 | 0.10 | B1-1 | 0.25 | E-1 | 0.10 |
| Example 26 | A-1 | 0.30 | B2-2 | 0.15 | C-1 | 0.10 | B1-1 | 0.25 | D1-1 | 0.10 | E-1 | 0.10 |
| Example 27 | A-1 | 0.30 | B2-1 | 0.15 | C-1 | 0.10 | B1-1 | 0.25 | D1-2 | 0.10 | E-1 | 0.10 |
| Example 28 | A-1 | 0.30 | B2-1 | 0.15 | C-1 | 0.10 | B1-1 | 0.25 | D1-3 | 0.10 | E-1 | 0.10 |
| Example 29 | A-1 | 0.30 | B2-1 | 0.15 | C-1 | 0.10 | B2-1 | 0.25 | D1-4 | 0.10 | E-1 | 0.10 |
| Example 30 | A-1 | 0.30 | B2-1 | 0.15 | C-1 | 0.10 | B2-1 | 0.25 | D1-5 | 0.10 | E-1 | 0.10 |
| Example 31 | A-1 | 0.30 | B2-1 | 0.15 | C-1 | 0.10 | B2-1 | 0.25 | D1-6 | 0.10 | E-1 | 0.10 |
| Example 32 | A-1 | 0.30 | B2-1 | 0.15 | C-1 | 0.10 | B2-1 | 0.25 | D2-1 | 0.10 | E-1 | 0.10 |
| Example 33 | A-1 | 0.30 | B2-1 | 0.15 | C-1 | 0.10 | B2-1 | 0.25 | D2-2 | 0.10 | E-1 | 0.10 |
| Example 34 | A-1 | 0.30 | B2-1 | 0.15 | C-1 | 0.10 | B2-1 | 0.25 | D2-3 | 0.10 | E-1 | 0.10 |
| Example 35 | A-1 | 0.30 | B2-1 | 0.15 | C-1 | 0.10 | B2-1 | 0.25 | D2-4 | 0.10 | E-1 | 0.10 |
| Example 36 | A-1 | 0.30 | B2-1 | 0.15 | C-1 | 0.10 | B2-1 | 0.25 | D2-5 | 0.10 | E-1 | 0.10 |
| Example 37 | A-1 | 0.30 | B2-1 | 0.15 | C-1 | 0.10 | B2-1 | 0.25 | D2-6 | 0.10 | E-1 | 0.10 |
| Example 38 | A-1 | 0.30 | B2-1 | 0.15 | C-1 | 0.10 | B1-1 | 0.25 | D1-1 | 0.10 | E-2 | 0.10 |
| Example 39 | A-1 | 0.30 | B2-1 | 0.15 | C-1 | 0.10 | B1-1 | 0.25 | D1-1 | 0.10 | E-5 | 0.10 |
| Example 40 | A-1 | 0.30 | B2-1 | 0.15 | C-1 | 0.10 | B1-1 | 0.25 | D1-1 | 0.10 | E-6 | 0.10 |
| Example 41 | A-1 | 0.30 | B2-1 | 0.15 | C-1 | 0.10 | B1-1 | 0.25 | D1-1 | 0.10 | E-8 | 0.10 |
| Example 42 | A-1 | 0.30 | B2-1 | 0.15 | C-1 | 0.10 | B1-1 | 0.25 | D1-1 | 0.10 | E-9 | 0.10 |
| Comparative Example 21 | A-1 | 0.45 | B2-1 | 0.15 | — | — | B1-1 | 0.40 | — | — | — | — |
| Comparative Example 22 | A-2 | 0.40 | — | — | B1-1 | 0.15 | C-1 | 0.10 | B1-1 | 0.25 | E-1 | 0.1 |
| Comparative Example 23 | — | — | D1-1 | 0.60 | — | — | C-1 | 0.20 | — | — | E-1 | 0.20 |
| Comparative Example 24 | A-1 | 0.70 | — | — | C-1 | 0.10 | — | — | D1-1 | 0.10 | E-1 | 0.10 |
| Comparative Example 25 | A-1 | 0.30 | B2-3 | 0.15 | C-1 | 0.10 | B2-3 | 0.25 | D1-1 | 0.10 | E-1 | 0.10 |
| Comparative Example 26 | A-1 | 0.30 | B2-4 | 0.15 | C-1 | 0.10 | B2-4 | 0.25 | D1-1 | 0.10 | E-1 | 0.10 |
| Comparative Example 27 | A-1 | 0.30 | B2-5 | 0.15 | C-1 | 0.10 | B2-5 | 0.25 | D1-1 | 0.10 | E-1 | 0.10 |
| Comparative Example 28 | A-2 | 0.30 | D1-8 | 0.10 | B1-1 | 0.15 | C-1 | 0.10 | B1-1 | 0.25 | E-1 | 0.10 |
| Comparative Example 29 | A-2 | 0.30 | D2-7 | 0.10 | B1-1 | 0.15 | C-1 | 0.10 | B1-1 | 0.25 | E-1 | 0.10 |
| Comparative Example 30 | A-1 | 0.30 | B2-1 | 0.15 | C-1 | 0.10 | B1-1 | 0.25 | D1-1 | 0.10 | E-3 | 0.10 |
| Comparative Example 31 | A-1 | 0.30 | B2-1 | 0.15 | C-1 | 0.10 | B1-1 | 0.25 | D1-1 | 0.10 | E-4 | 0.10 |
| Comparative Example 32 | A-1 | 0.30 | B2-1 | 0.15 | C-1 | 0.10 | B1-1 | 0.25 | D1-1 | 0.10 | E-7 | 0.10 |
| Comparative Example 33 | A-1 | 0.30 | B2-1 | 0.15 | C-1 | 0.10 | B1-1 | 0.25 | D1-1 | 0.10 | E-10 | 0.10 |
| Comparative Example 34 | A-1 | 0.30 | B2-1 | 0.15 | C-1 | 0.10 | B1-1 | 0.25 | D1-1 | 0.10 | A-2 | 0.10 |
| Comparative Example 35 | A-1 | 0.30 | B2-1 | 0.15 | C-1 | 0.10 | B1-1 | 0.25 | D1-1 | 0.10 | A-3 | 0.10 |

| | Low-temperature impact resistance (no. of test tubes ruptured/no. of test tubes) | Deteriorated fuel resistance (no. of test tubes ruptured/no. of test tubes) | Alcohol-containing gasoline permeation (CE85) (g/m²·day) | Peel strength (N/cm) | | Monomer/oligomer elution test | |
|---|---|---|---|---|---|---|---|
| | | | | Initial | After heat treatment | Eluted amount (g/m²·day) | Fuel color after treatment |
| Example 21 | 0/10 | 0/10 | 4.1 | 85 | 51 | <0.01 | Transparent |
| Example 22 | 0/10 | 0/10 | 4.2 | 82 | 50 | <0.01 | Transparent |
| Example 23 | 0/10 | 0/10 | 4.0 | 50 | 34 | <0.01 | Transparent |
| Example 24 | 0/10 | 0/10 | 3.9 | 59 | 42 | <0.01 | Transparent |
| Example 25 | 0/10 | 0/10 | 4.0 | 58 | 40 | <0.01 | Transparent |
| Example 26 | 0/10 | 0/10 | 4.1 | 83 | 50 | <0.01 | Transparent |

TABLE 2-continued

| | | | | | | | |
|---|---|---|---|---|---|---|---|
| Example 27 | 0/10 | 0/10 | 4.0 | 42 | 30 | <0.01 | Transparent |
| Example 28 | 0/10 | 0/10 | 3.4 | 82 | 49 | <0.01 | Transparent |
| Example 29 | 0/10 | 0/10 | 4.2 | 80 | 49 | <0.01 | Transparent |
| Example 30 | 0/10 | 0/10 | 4.4 | 78 | 48 | <0.01 | Transparent |
| Example 31 | 0/10 | 0/10 | 4.4 | 86 | 54 | <0.01 | Transparent |
| Example 32 | 0/10 | 0/10 | 4.5 | 75 | 48 | <0.01 | Transparent |
| Example 33 | 0/10 | 0/10 | 4.3 | 73 | 45 | <0.01 | Transparent |
| Example 34 | 0/10 | 0/10 | 4.4 | 68 | 43 | <0.01 | Transparent |
| Example 35 | 0/10 | 0/10 | 4.7 | 58 | 37 | <0.01 | Transparent |
| Example 36 | 0/10 | 0/10 | 4.4 | 69 | 45 | <0.01 | Transparent |
| Example 37 | 0/10 | 0/10 | 3.5 | 56 | 40 | <0.01 | Transparent |
| Example 38 | 0/10 | 0/10 | 4.0 | 83 | 48 | <0.01 | Transparent |
| Example 39 | 0/10 | 0/10 | 1.7 | 86 | 54 | <0.01 | Transparent |
| Example 40 | 0/10 | 0/10 | 1.6 | 80 | 47 | <0.01 | Transparent |
| Example 41 | 0/10 | 0/10 | 1.7 | 84 | 48 | <0.01 | Transparent |
| Example 42 | 0/10 | 0/10 | 1.6 | 81 | 46 | <0.01 | Transparent |
| Comparative Example 21 | 0/10 | 7/10 | >200 | 80 | 49 | 0.08 | Transparent |
| Comparative Example 22 | 0/10 | 0/10 | 4.5 | 3 | 0 | <0.01 | Transparent |
| Comparative Example 23 | 5/10 | 10/10 | 1.7 | 10 | 0 | <0.01 | Transparent |
| Comparative Example 24 | 0/10 | 0/10 | 4.2 | 2 | 0 | <0.01 | Transparent |
| Comparative Example 25 | 0/10 | 0/10 | 4.3 | 39 | 7 | <0.01 | Transparent |
| Comparative Example 26 | 0/10 | 0/10 | 4.3 | 54 | 3 | <0.01 | Transparent |
| Comparative Example 27 | 0/10 | 0/10 | 4.3 | 41 | 11 | <0.01 | Transparent |
| Comparative Example 28 | 0/10 | 0/10 | 4.0 | 4 | 0 | <0.01 | Transparent |
| Comparative Example 29 | 0/10 | 0/10 | 4.0 | 5 | 0 | <0.01 | Transparent |
| Comparative Example 30 | 0/10 | 0/10 | 4.1 | 3 | 0 | <0.01 | Transparent |
| Comparative Example 31 | 0/10 | 0/10 | 4.0 | 4 | 0 | <0.01 | Transparent |
| Comparative Example 32 | 0/10 | 0/10 | 4.1 | 4 | 0 | <0.01 | Transparent |
| Comparative Example 33 | 0/10 | 0/10 | 4.1 | 2 | 0 | <0.01 | Transparent |
| Comparative Example 34 | 0/10 | 0/10 | 27 | 45 | 32 | 0.50 | Cloudy |
| Comparative Example 35 | 0/10 | 0/10 | 29 | 43 | 30 | 0.50 | Cloudy |

As is clear from Table 2, the multilayer tube of Comparative Example 21, which does not have a layer comprising the saponified ethylene-vinyl acetate copolymer, layer comprising the semi-aromatic polyamide composition or layer comprising the fluorine-containing polymer defined in the present invention, demonstrated inferior deteriorated fuel resistance and resistance to permeation of highly concentrated alcohol-containing gasoline, while the multilayer tube of Comparative Example 22, which does not have a layer comprising the semi-aromatic polyamide composition defined in the present invention, demonstrated inferior interlayer adhesion. The multilayer tube of Comparative Example 23, which does not have a layer comprising the layer comprising the aliphatic polyamide or layer comprising the Polyamide 6 composition or Polyamide 6/66/12 composition defined in the present invention, demonstrated inferior low-temperature impact resistance, deteriorated fuel resistance and interlayer adhesion. The multilayer tube of Comparative Example 24, which does not have a layer comprising the Polyamide 6 composition or Polyamide 6/66/12 composition defined in the present invention, demonstrated inferior interlayer adhesion. The multilayer tubes of Comparative Examples 25 to 27, which have a layer comprising a Polyamide 6/66/12 composition other than that defined in the present invention or a Polyamide 6/12 composition, demonstrated inferior post-heat treatment interlayer adhesion. The multilayer tubes of Comparative Examples 28 and 29, which have a layer comprising a semi-aromatic polyamide composition other than that defined in the present invention, demonstrated inferior interlayer adhesion. The multilayer tubes of Comparative Examples 30 to 33, which have layers comprising a fluorine-containing polymer other than that defined in the present invention, demonstrated inferior interlayer adhesion. The multilayer tubes of Comparative Examples 34 and 35, which do not have layers comprising the fluorine-containing polymer defined in the present invention but have a layer comprising a Polyamide 12 composition for the innermost layer thereof, demonstrated inferior resistance to permeation of highly concentrated alcohol-containing gasoline and inferior monomer and oligomer elution resistance.

On the other hand, the multilayer tubes of Examples 21 to 42 defined in the present invention clearly demonstrated favorable properties with respect to low-temperature impact resistance, deteriorated fuel resistance, chemical impermeability and particularly resistance to permeation of highly concentrated alcohol-containing gasoline, interlayer adhesion and durability thereof, and monomer and oligomer elution resistance.

The entire contents of the disclosures of Japanese Patent Application No. 2014-185784 (filing date: Sep. 12, 2014) and Japanese Patent Application No. 2014-185787 (filing date: Sep. 12, 2014) are incorporated in the present description by reference.

All documents, patent applications and technical standards described in the present description are incorporated in the present description by reference to the same degree as in the case the incorporation of individual documents, patent applications and technical standards are specifically and individually described as being incorporated by reference.

The invention claimed is:

1. A multilayer tube comprising at least four layers, having a layer (a), a layer (b), a layer (c), and a layer (d); wherein,
the layer (a) contains an aliphatic polyamide (A),
the layer (b) contains a polyamide 6/66/12 composition (B2), the layer (c) contains a saponified ethylene-vinyl acetate copolymer (C), and the layer (d) contains a semi-aromatic polyamide composition (D1) or a semi-aromatic polyamide composition (D2); and,
the aliphatic polyamide (A) does not contain polycaproamide or poly(caproamide/hexamethylene adipamide/dodecanamide)
the Polyamide 6/66/12 composition (B2) contains at least 50% by mass to 98% by mass of a mixtures containing Polyamide 6/66/12 and at least one type of polyamide selected from the group consisting of polyhexamethylene sebacamide (Polyamide 610), polyhexamethylene dodecanamide (Polyamide 612), polynonamethylene decamide (Polyamide 910), polynonamethylene dodecamide (polyamide 912), polydecamethylene decamide (Polyamide 1010), polydecamethylene dodecamide (Polyamide 1012) and polydodecamethylene dodecamide (Polyamide 1212), 1% by mass to 20% by mass of a plasticizer (B3), and 1% by mass to 30% by mass of an olefin polymer (B4) having a bending elastic modulus of 500 MPa or less as measured in compliance with ISO 178, wherein the Polyamide 6/66/12 of the Polyamide 6/66/12 composition (B2) the mass ratio of the total number of caproamide units and hexamethylene units to the number of dodecaneamide units is 81:19 percent by mass to 95:5 percent by mass based on 100 percent by mass of the total number of caproamide units, hexamethylene adipamide units and dodecaneamide units, the semi-aromatic polyamide composition (D1) contains a semi-aromatic polyamide (d1) and the semi-aromatic polyamide (d1) has a diamine units containing 50 mol % or more of an aliphatic diamine unit having 9 to 13 carbon atoms based on the total number of diamine units, and a carboxylic acid unit containing 50 mol % or more of a terephthalic acid unit and/or naphthalene dicarboxylic acid unit based on the total number of carboxylic acid units, and the semi-aromatic polyamide composition (D2) contains a semi-aromatic polyamide (d2) and the semi-aromatic polyamide (d2) has a diamine unit containing 50 mol % or more of a xylylenediamine unit and/or bis(aminomethyl)naphthalene unit based on the total number of diamine units and a carboxylic acid unit containing 50 mol % or more of an aliphatic dicarboxylic acid unit having 8 to 13 carbon atoms based on the total number of dicarboxylic acid units.

2. The multilayer tube according to claim 1, wherein the aliphatic polyamide (A) is at least one type of homopolymer selected from the group consisting of polyundecanamide (Polyamide 11), polydodecanamide (Polyamide 12), polyhexamethylene adipamide (Polyamide 66), polyhexamethylene decamide (Polyamide 610), polyhexamethylene dodecamide (Polyamide 612), polydecamethylene decamide (Polyamide 1010), polydecamethylene dodecamide (Polyamide 1012) and polydodecamethylene dodecamide (Polyamide 1212), and/or a copolymer using a plurality of types of raw material monomers that form these.

3. The multilayer tube according to claim 1, wherein the ethylene content of the saponified ethylene-vinyl acetate copolymer (C) is 15 mol % to 60 mol % and the degree of saponification is 90 mol % or more.

4. The multilayer tube according to claim 1, wherein the layer (a) is arranged in the outermost layer and the layer (c) is arranged between the layer (a) and the layer (d).

5. The multilayer tube according to claim 1, wherein the layer (b) is arranged on at least one side that contacts the layer (c).

6. The multilayer tube according to claim 1, wherein an electrically conductive layer comprising the semi-aromatic polyamide composition (D) containing an electrically conductive filler is arranged in the innermost layer of the multilayer tube.

7. The multilayer tube according to claim 1, which is produced by a co-extrusion processing method.

8. The multilayer tube according to claim 1, which is used as a fuel tube.

9. A multilayer tube comprising at least five layers, having a layer (a), a layer (b), a layer (c), a layer (d) and a layer (e), wherein,
   the layer (a) contains an aliphatic polyamide (A),
   the layer (b) contains a Polyamide 6 composition (B1) and/or a Polyamide 6/66/12 composition (B2),
   the layer (c) contains a saponified ethylene-vinyl acetate copolymer (C),
   the layer (d) contains a semi-aromatic polyamide composition (D1) or a semi-aromatic polyamide composition (D2), and
   the layer (e) contains a fluorine-containing polymer (E) in which a functional group having reactivity with an amino group is introduced into the molecular chain thereof and,
   the aliphatic polyamide (A) does not contain polycaproamide (Polyamide 6) or poly(caproamide/hexamethylene adipamide/dodecanamide),
   the Polyamide 6 composition (B1) contains 50% by mass to 98% by mass of polycaproamide (Polyamide 6), 1% by mass to 20% by mass of a plasticizer (B3), and 1% by mass to 30% by mass of an olefin polymer (B4) having a bending elastic modulus of 500 MPa or less as measured in compliance with ISO 178,
   the Polyamide 6/66/12 composition (B2) contains 50% by mass to 98% by mass of a polyamide mixture containing Polyamide 6/66/12 and at least one type of polyamide selected from the group consisting of polyhexamethylene sebacamide (Polyamide 610), polyhexamethylene dodecanamide (Polyamide 612), polynonamethylene decamide (Polyamide 910), polynonamethylene dodecamide (Polyamide 912), polydecamethylene decamide (Polyamide 1010), polydecamethylene dodecamide (Polyamide 1012) and polydodecamethylene dodecamide (polyamide 1212), 1% by mass to 20% by mass of a plasticizer (B3), and 1% by mass to 30% by mass of an olefin polymer (B4) having a bending elastic modulus of 500 MPa or less as measured in compliance with ISO 178,
   the semi-aromatic polyamide composition (D1) contains a semi-aromatic polyamide (d1), and the semi-aromatic polyamide (d1) has a diamine unit containing 50 mol % or more of an aliphatic diamine unit having 9 to 13 carbon atoms based on the total number of diamine units, and a carboxylic acid unit containing 50 mol % or more of a terephthalic acid unit and/or naphthalene dicarboxylic acid unit based on the total number of carboxylic acid units, and
   the semi-aromatic polyamide composition (D2) contains a semi-aromatic polyamide (d2), and the semi-aromatic polyamide (d2) has a diamine unit containing 50 mol % or more of a xylylenediamine unit and/or bis(aminomethyl)naphthalene unit based on the total number of diamine units and a carboxylic acid unit containing 50 mol % or more of an aliphatic dicarboxylic acid unit having 8 to 13 carbon atoms based on the total number of dicarboxylic acid units.

10. The multilayer tube according to claim 9, wherein the layer (a) is arranged in the outermost layer, and the layer (c) and the layer (d) are arranged between the layer (a) and the layer (e).

11. The multilayer tube according to claim 9, wherein the layer (b) is arranged on at least one side in contact with the layer (c).

12. The multilayer tube according to claim 9, wherein an electrically conductive layer comprising a fluorine-containing polymer composition containing an electrically conductive filler is arranged in the innermost layer of the multilayer tube.

13. The multilayer tube according to claim 9, which is produced by a co-extrusion processing method.

14. The multilayer tube according to claim 9, which is used as a fuel tube.

15. A method for producing the multilayer tube according to claim 1, which comprises co-extrusion processing.

16. A method for producing the multilayer tube according to claim 9, which comprises co-extrusion processing.

* * * * *